US008650377B2

(12) United States Patent
Maniwa et al.

(10) Patent No.: US 8,650,377 B2
(45) Date of Patent: Feb. 11, 2014

(54) STORAGE MANAGING SYSTEM, COMPUTER SYSTEM, AND STORAGE MANAGING METHOD

(75) Inventors: Naoshi Maniwa, Yokohama (JP); Hideo Ohata, Fujisawa (JP)

(73) Assignee: Hitachi, Ltd., Tokyo (JP)

( * ) Notice: Subject to any disclaimer, the term of this patent is extended or adjusted under 35 U.S.C. 154(b) by 203 days.

(21) Appl. No.: 13/384,906

(22) PCT Filed: Jun. 2, 2011

(86) PCT No.: PCT/JP2011/062691
§ 371 (c)(1),
(2), (4) Date: Jan. 19, 2012

(87) PCT Pub. No.: WO2012/164718
PCT Pub. Date: Dec. 6, 2012

(65) Prior Publication Data
US 2012/0311292 A1 Dec. 6, 2012

(51) Int. Cl.
G06F 12/00 (2006.01)
(52) U.S. Cl.
USPC .......................................... 711/170; 711/165
(58) Field of Classification Search
USPC .................................................. 711/165, 170
See application file for complete search history.

(56) References Cited

U.S. PATENT DOCUMENTS

| 2009/0006799 | A1* | 1/2009 | Korupolu et al. ............. 711/170 |
| 2009/0119529 | A1* | 5/2009 | Kono et al. .................... 713/324 |
| 2009/0300285 | A1 | 12/2009 | Nagai et al. |
| 2010/0125715 | A1 | 5/2010 | Takamatsu et al. |
| 2010/0235573 | A1 | 9/2010 | Asano et al. |
| 2011/0271071 | A1* | 11/2011 | Nakatogawa ................. 711/165 |
| 2012/0131196 | A1 | 5/2012 | Yamada |
| 2013/0080727 | A1* | 3/2013 | Naito et al. ................... 711/165 |
| 2013/0179657 | A1* | 7/2013 | Isomura et al. ............... 711/165 |
| 2013/0212345 | A1* | 8/2013 | Nakajima ..................... 711/161 |

FOREIGN PATENT DOCUMENTS

| JP | 2007066259 A2 | 3/2007 |
| JP | 2010122814 A2 | 6/2010 |
| JP | 2010211743 A2 | 9/2010 |
| JP | 2011070628 A2 | 4/2011 |

* cited by examiner

Primary Examiner — John Lane
(74) Attorney, Agent, or Firm — Volpe and Koenig, P.C.

(57) ABSTRACT

The present invention provides a technique for arranging a virtual logical volume group for satisfying target response performance and realizing a cost reduction. For this purpose, in the present invention, in a storage managing system which manages a storage subsystem comprising in a pool using plural storage devices (hierarchies) having different performances and provides plural virtual logical volumes from the pool, the plural virtual logical volumes are classified into plural groups on the basis of information concerning target response performance concerning each of the plural virtual logical volumes such that each of the plural virtual logical volumes satisfies the target response performance. A new pool is allocated to each of the plural groups of the virtual logical volumes. Further, information indicating a correspondence relation between the pool and the virtual logical volumes included in the groups is generated and the information is output.

15 Claims, 29 Drawing Sheets

| Virtual logical volume identifier | Arrangement destination pool identifier |
|---|---|
| V Vol 1 | Pool 10 |
| V Vol 2 | Pool 10 |
| V Vol 3 | Pool 11 |
| V Vol 4 | Pool 12 |
| V Vol 5 | Pool 11 |
| ... | ... |

| Pool identifier | Total capacity of pool [GB] | High-order hierarchy capacity [GB] | Intermediate-order hierarchy capacity [GB] | Low-order hierarchy capacity [GB] |
|---|---|---|---|---|
| Pool 10 | 1200 | 300 | 600 | 300 |
| Pool 11 | 3300 | 800 | 1500 | 1000 |
| Pool 12 | 5600 | 600 | 3500 | 1500 |
| Pool 13 | 2000 | 800 | 1000 | 200 |
| ... | ... | ... | ... | ... |

Fig. 16

| Pool identifier | Cost [$] |
|---|---|
| Pool 10 | 3600 |
| Pool 11 | 9500 |
| Pool 12 | 15000 |
| Pool 13 | 7200 |
| ... | ... |

Fig. 17

| Pool identifier | Total capacity of pool [GB] | High-order hierarchy capacity [GB] | Intermediate-order hierarchy capacity [GB] | Low-order hierarchy capacity [GB] |
|---|---|---|---|---|
| Pool 10 | 1200 | 300 | 600 | 300 |
| Pool 11 | 3300 | 800 | 1500 | 1000 |

| # | Creation target pool identifier 1901 | Hierarchy configuration 1902 ||| Arrangement target virtual logical volume identifier 1903 | Required cost [$] 1904 | Pool creation selection 1905 | Arrangement execution selection 1906 |
|---|---|---|---|---|---|---|---|---|
| | | High-order hierarchy [GB] | Intermediate-order hierarchy [GB] | Low-order hierarchy [GB] | | | | |
| 1 | Pool 10 | 300 | 600 | 300 | V Vol1<br>V Vol2 | 3600 | ☑ | ☑ |
| 2 | Pool 11 | 800 | 1500 | 1000 | V Vol3<br>V Vol5 | 9500 | ☑ | ☑ |
| 3 | Pool 12 | 600 | 3500 | 1500 | V Vol4 | 15000 | ☐ | ☐ |
| ... | ... | ... | ... | ... | ... | ... | ... | ... |

Execute — 1907

Fig. 28

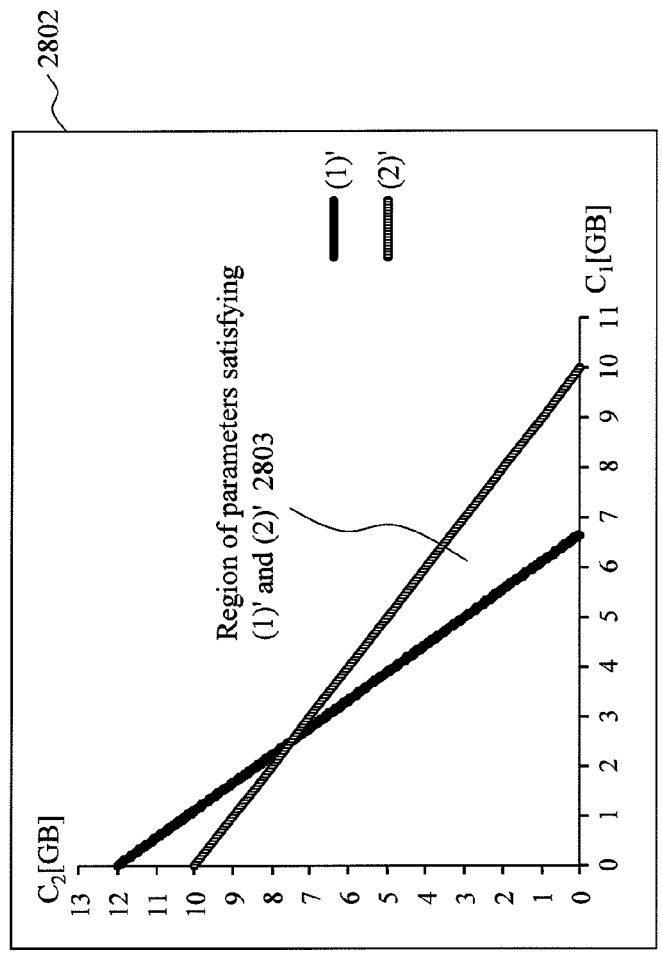

Parameters $S = 4$ [msec]
$T_1 = 1$ [msec]
$T_2 = 5$ [msec]
$T_3 = 10$ [msec]
$N = 250$ [PCS.]
$C_p = 0.04$ [GB]

— 2801

(1) $\dfrac{C_1 \times T_1 + C_2 \times T_2 + C_3 \times T_3}{N \times C_p} \leq S$ (2) $C_1 + C_2 \leq N \times C_p$ (3) $C_3 = N \times C_p - (C_1 + C_2)$ Substitute parameters in expressions and transform expressions (1)' $C_2 \geq -\dfrac{9}{5} C_1 + 12$ (2)' $C_2 \leq 10 - C_1$ Storage device information by pool hierarchy (table) 418

| Storage device type | Basic response performance [msec] | Capacity unit price [$/GB] |
|---|---|---|
| SSD | 1 | 5 |
| SAS | 5 | 3 |
| SATA | 10 | 1 |

STORAGE MANAGING SYSTEM, COMPUTER SYSTEM, AND STORAGE MANAGING METHOD

TECHNICAL FIELD

The present invention relates to a storage managing system, a computer system, and a storage managing method and relates to, for example, a technique for creating a pool (a hierarchical pool) using plural kinds of storage devices having different performances and providing a virtual logical volume.

BACKGROUND ART

As a virtual technique for a storage device, there is a storage device which creates a pool (a hierarchical pool) using plural kinds of storage devices having different performances (see, for example, Patent Literature 1). In the hierarchical pool, a storage region of a virtual logical volume is allocated in a data unit called a page and a storage device in which the page is arranged is periodically switched according to an access characteristic (I/O number (IOPS), etc.) per unit time in the page unit. Specifically, a storage region of a high-performance storage device (disk device) is preferentially allocated to a page having a high access characteristic. Consequently, compared with a case in which data is allocated from a single type of a storage device in a virtual logical volume unit, in a case in which a virtual logical volume in a hierarchical pool is configured, when a configuration satisfying a performance requirement and a capacity requirement of a system is designed, a necessary capacity of a high-performance storage device decreases and it is possible to reduce storage cost.

As a technique for reducing storage cost, there is a technique for defining an application condition for a pool and removing a volume configuring the pool while the condition is satisfied (a technique for collecting an excess storage region of the pool) (see, for example, Patent Document 2). According to the technique, it is possible to change a configuration to a pool which can satisfy the performance requirement and the capacity requirement at low cost.

CITATION LIST

Patent Literature

Patent Literature 1: JP Patent Publication (Kokai) No. 2007-066259A
Patent Literature 2: JP Patent Publication (Kokai) No. 2010-211743A

SUMMARY OF THE INVENTION

Technical Problem

However, if a storage region is allocated to a page using only information concerning an access characteristic to configure a virtual volume, a storage region is excessively allocated to a virtual volume from a storage device which can show response performance more than necessary. On the other hand, even if a virtual logical volume is requested to have high response performance, if an access characteristic is low, a storage region is allocated from a storage device having low response performance. In this way, a shift occurs between response performance desired by a user for each virtual logical volume and response performance of a virtual logical volume configured with a storage region allocated according to an access characteristic.

According to the related art, in the case of a virtual logical volume having a high access characteristic but not requested to have very high response performance, a storage region is allocated from the storage device having high response performance, i.e., a high-cost storage device, as mentioned above. Therefore, when a virtual logical volume group is arranged on a hierarchical pool on the basis of such a control method, an appropriate storage region is not allocated and a virtual logical volume requiring cost more than necessary is configured. Therefore, a situation occurs in which storage cost more than necessary minimum storage cost is necessary. On the other hand in the related art, it is attempted to reduce storage cost by collecting an excess storage region of a pool while an application condition defined in advance is satisfied (Patent Literature 2). However, a method of reducing storage cost (cost depending on a capacity of a storage region in use) in arrangement of a virtual logical volume group in a hierarchical pool is not established. This is because, in the related art, allocation of a storage region to a virtual logical volume is controlled only with an access characteristic.

The present invention has been devised in view of such a situation and provides a technique for determining an arrangement pool of a virtual logical volume for satisfying target response performance and realizing a cost reduction in a storage system in which a hierarchical pool is used.

Solution to Problem

In order to solve the problem, the present invention provides a technique for managing a storage subsystem that comprises a pool using plural storage devices (hierarchies) having different performances and provides plural virtual logical volumes from the pool. In a storage management system, the plural virtual logical volumes are classified into plural groups on the basis of information concerning target response performance concerning each of the plural virtual logical volumes such that each of the plural virtual logical volumes satisfies target response performance A new pool is allocated to each of the plural groups of the virtual logical volumes. Further, information indicating a correspondence relation between the pool and the virtual logical volumes included in each of the groups is generated and the information is output.

Further characteristics related to the present invention will be made apparent from the description of this specification and the accompanying drawings. A form of the present invention is attained and realized by elements, a combination of various elements, the following detailed description, and a form of the appended claims.

It is necessary to understand that the description of this specification is merely a typical illustration and by no means limits the claims or application examples of the present invention.

Advantageous Effects of Invention

According to the present invention, in a storage system in which a hierarchical pool is used, it is possible to arrange a virtual logical volume group to satisfy target response performance and realize a cost reduction.

BRIEF DESCRIPTION OF DRAWINGS

FIG. 14 is a diagram showing a configuration example of shift target virtual logical volume group information 415.

FIG. 15 is a diagram showing a configuration example of pool hierarchy configuration information 416.

FIG. 16 is a diagram showing a configuration example of pool hierarchy configuration cost information 419.

FIG. 17 is a diagram showing a configuration example of creation execution target pool hierarchy configuration information 420.

FIG. 28 is a diagram for explaining a specific example of number of pages calculation processing for hierarchies necessary for a virtual logical volume to satisfy target response performance (S2709).

DESCRIPTION OF EMBODIMENTS

Figure 1:
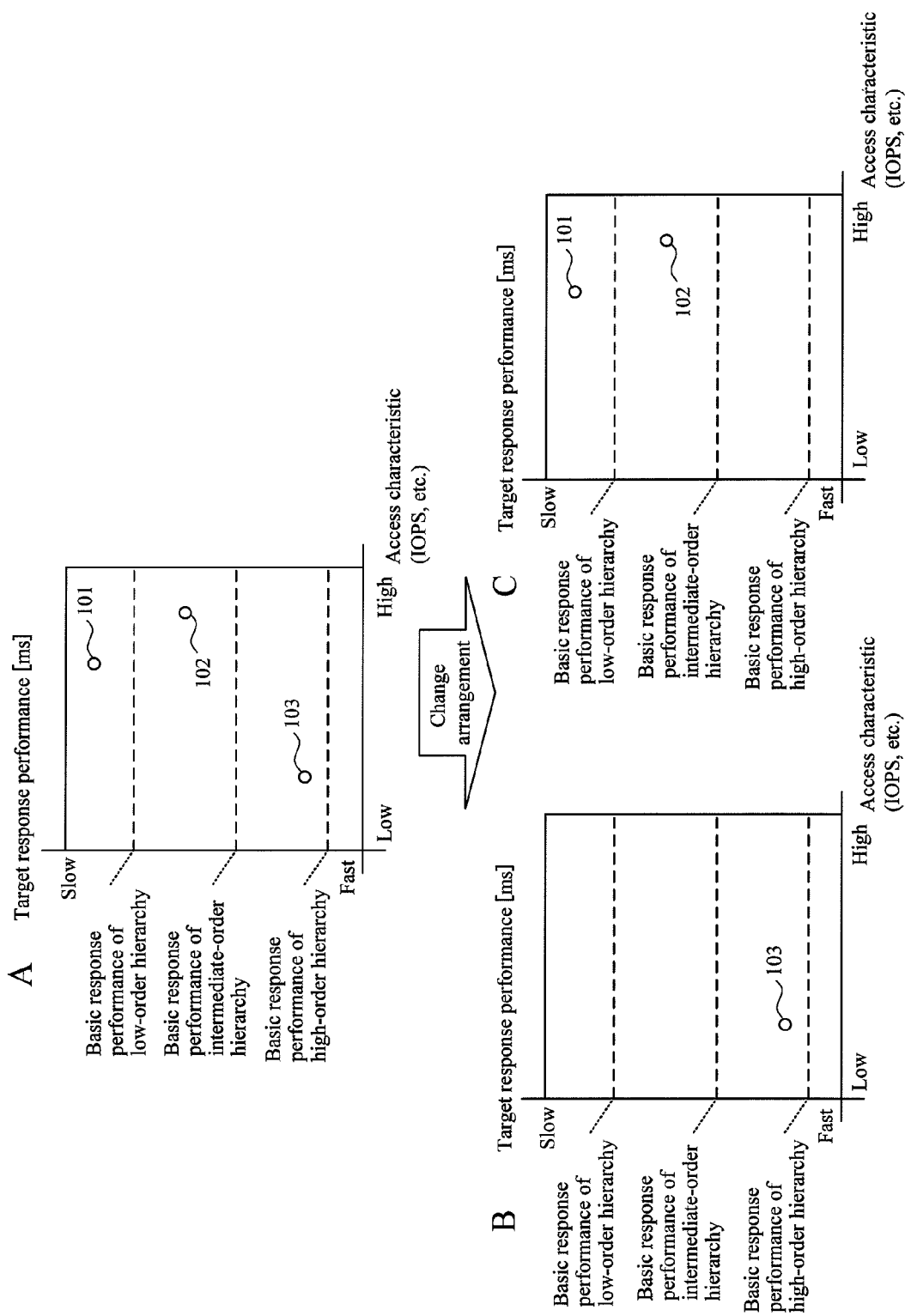
FIG. 1 is a diagram for explaining a basic concept of the present invention.

Embodiments of the present invention are explained below with reference to the accompanying drawings. In the accompanying drawings, in some case, functionally same elements are denoted by the same numbers. The accompanying drawings show specific embodiments and implementation examples conforming to the principle of the present invention. However, these drawings are for understanding of the present invention and are by no means used for limitedly interpreting the present invention.

In the embodiments, the embodiments are explained in detail sufficiently for those skilled in the art to carry out the present invention. However, it is necessary to understand that other implementations and forms are possible and changes of configurations and structures and replacement of various elements are possible without departing from the scope and the spirit of the technical idea of the present invention. Therefore, the following description should not be interpreted to be limited to the embodiments.

Further, as explained later, the embodiments of the present invention may be implemented by software running on a general-purpose computer or may be implemented by dedicated hardware or a combination of the software and the hardware.

In the following explanation, various kinds of information of the present invention are explained in a "table" format. These kinds of information do not always have to be represented in a data structure by a table and may be represented in a data structure of a list, a DB, a queue, or the like or other data structures. Therefore, to indicate that the information does not rely on a data structure, "table", "list", "DB", "queue", and the like could be simply referred to as "information".

When contents of the information are explained, it is possible to use expressions "identification information", "identifier", "title", "name", and "ID". These can be replaced with one another.

In the following explanation, processing in the embodiments of the present invention is explained with "program" set as a subject (an operation entity). However, the program is executed by a processor to perform set processing using a memory and a communication port (a communication control device). Therefore, the processor may be a subject in the explanation. Processing disclosed with the program set as the subject may be processing performed by a computer or an information processing apparatus such as a management server. A part or all of the program may be realized by dedicated hardware or may be formed as a module. Various programs may be installed in computers by a program distribution server or storage media.

(1) First Embodiment

<Overview>

The present invention discloses a technique for initially allocating storage regions of storage devices to virtual logical volumes configured in pools and, after a predetermined period elapses, appropriately allocating the storage regions to the virtual logical volumes present in the same pools from the storage devices in hierarchies.

Figure 2:
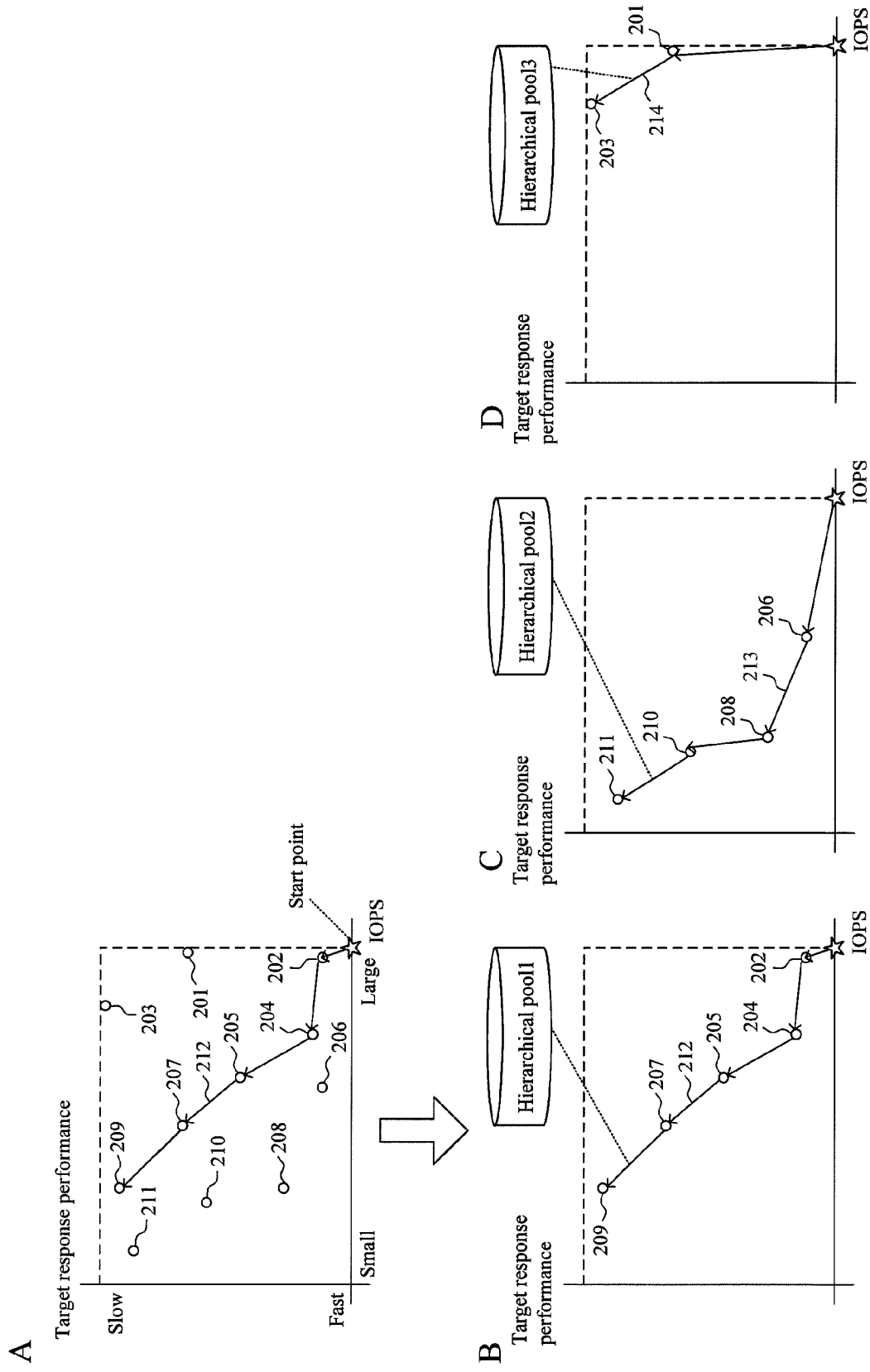
FIG. 2 is a diagram for explaining an overview of an arrangement determination processing procedure for a virtual logical volume according to a first embodiment.

FIGS. 1 and 2 are diagrams for explaining a basic idea of processing according to a first embodiment (determination of arrangement of virtual logical volumes). FIG. 1 is a diagram for explaining a basic concept of the present invention. FIG. 2 is a diagram for explaining an overview (a specific example) of an arrangement determination processing procedure for a virtual logical volume according to the first embodiment.

As shown in FIG. 1A, an arrangement situation of virtual logical volumes (three in FIG. 1) arranged in one of plural configured hierarchical pools is grasped and plotted in a two-dimensional plane including an access characteristic and target response performance as actually measured values. Values of access characteristics in virtual logical volumes 101 to 103 are averages of access characteristics to pages included in the virtual logical volumes. Values of target response performances of the virtual logical volumes are, for example, values set by a user as desired values. As the access characteristics, in the embodiments, processing and operations are explained using an IO number (IOPS) as an example. However, the access characteristics are not limited to this. The access characteristics are a concept including a data transfer amount, access time (a volume accessed recently is a maximum access load and a volume not accessed for a while is a low load), and a level of a cache access load.

In a hierarchical storage device, storage regions are allocated to virtual logical volumes from a storage device having high response performance in order from one having a highest IOPS. Therefore, in the case of the situation shown in FIG. 1A, storage regions are allocated from a storage device (Tier 1) having high response performance to virtual volumes in order of virtual logical volumes 102, 101, and 103. However, according to FIG. 1A, a virtual logical volume originally requested to have high response performance is the virtual logical volume 103. Therefore, if allocation order is determined only from the TOPS, storing regions are allocated to the virtual logical volume 103 from Tier1 after allocating storing regions to the virtual logical volumes 101 and 102. In some case, sufficient response performance cannot be guaranteed. Therefore, in this case, in order to satisfy target response performance of the virtual logical volume 103, storage devices having a capacity more than necessary are necessary as storage devices in a high-order hierarchy (Tier1) and a intermediate-order hierarchy (Tier2) at least necessary for the virtual logical volume 103.

Therefore, in this embodiment, the virtual logical volumes 101 to 103 are classified (grouped) on the basis of target response performance, whereby storage devices are efficiently allocated to virtual logical volumes. For example, the virtual logical volumes shown in FIG. 1A are classified into two groups shown in FIGS. 1B and 1C. Each of the groups configures one pool. Consequently, storage regions only have to be allocated from the storage devices in the high-order and intermediate-order hierarchies to the virtual logical volumes in order from the virtual logical volume 103. It is unnecessary to allocate the storage region in the high-order hierarchy to the virtual logical volumes 101 and 102.

Specifically, basic allocation processing for storage regions to virtual logical volumes in a storage device is executed in order from a virtual logical volume having a highest IOPS. Therefore, in the present invention, while this processing content is maintained, virtual logical volumes are grouped according to target response performances, each of groups configures one pool, and storage regions are allocated in order of TOPS in the pool.

More specific allocation processing for storage regions to virtual logical volumes is explained with reference to FIG. 2. In the first embodiment, grouping processing is executed on the basis of target response performances and IOPSs of virtual logical volumes. As shown in FIG. 2A, when virtual logical volumes 201 to 211 are configured, the virtual logical volumes are plotted on an average IOPS-target response performance plane (a plane in which an X axis represents an TOPS and a Y axis represents target response performance). In the plane, a largest IPOS value and a fastest configurable target response performance value are set at a start point (a point indicated by a star mark in FIG. 2) of grouping processing for virtual logical volumes. First, a plot point (the virtual logical volume 202) present at a shortest distance from the start point is selected (processing 1). A plot point closest to the point selected by the processing 1 among plot points having a lower IOPS than that of the plot point selected in processing 1 and having late target response performance values is selected next (processing 2). Processing same as the processing 2 is repeated until no selectable plot point is left (processing 3). Points selected in order by the processing 1 to the processing 3 form a group 212 of virtual logical volumes included in one hierarchical pool 1. When the processing 1 to the processing 3 are repeated among other volumes excluding virtual logical volumes included in the group 212, groups 213 and 214 are generated. The group 213 configures a hierarchical pool 2 and the group 214 configures a hierarchical pool 3. Finally, in the groups, storage regions are allocated to virtual logical volumes in the same groups from storage devices included in the hierarchies in order of IOPS. In this way, in a hierarchical pool in which storage regions are allocated in order from one having highest performance to pages having high IOPSs (access characteristics), management target virtual volumes are grouped such that concerning target response performances and IOPSs of virtual logical volumes, a relation in which, when one of the target response performances and the IOPSs increase, the other decrease is given. This makes it possible to efficiently allocate storage regions of storage devices and reduce storage cost.

In FIGS. 1 and 2, processing is performed to group plural virtual logical volumes arranged in one pool and arrange the virtual logical volumes belonging to each of groups in one of pools equivalent to the number of groups. However, it is also possible to group plural virtual logical volumes included in plural pools present in a system and rearrange virtual logical volumes belonging to each of groups in plural pools generated anew. In the former, attention is paid to only one pool and processing is performed without breaking arrangement of the other pools. Therefore, it is possible to determine arrangement of the virtual logical volumes at high speed. On the other hand, in the case of the latter, when attention is paid to all virtual logical volumes included in all the pools in the system (not all the pools but plural pools including processing target pools), the rearrangement processing takes longer time. However, it is possible to more efficiently arrange the virtual logical volumes in pools taking into account a balance of all the virtual logical volumes.

<System Configuration>

Figure 3:
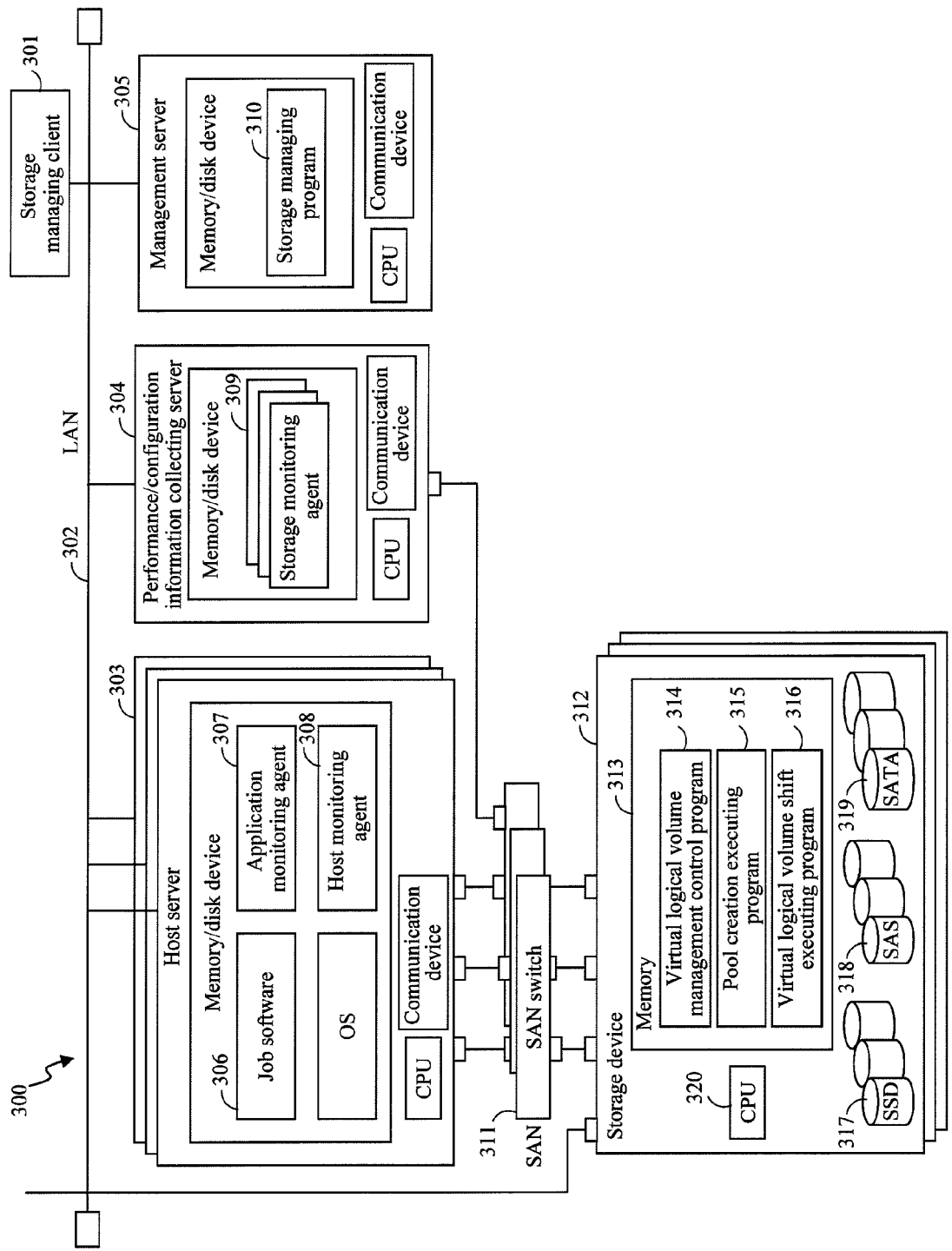
FIG. 3 is a diagram showing a schematic configuration of a storage system (a computer system) 300 according to the present invention.

FIG. 3 is a diagram showing a schematic configuration of a storage system (which can also be referred to as computer system) 300 according to the present invention.

The storage system 300 includes a storage managing client 301, at least one host server 303, a performance/configuration information collecting server 304, a management server 305, and at least one storage device (which can also be referred to as storage subsystem) 312, which are connected via a LAN (Local Area Network) 102. The host server 303, the performance/configuration information collecting server 304, and the storage device 312 are connected via an SAN (Storage Area Network) switch 311. In the configuration shown in FIG. 3, the storage managing client 301, the performance/configuration information collecting server 304, and the management server 305 are shown as separate computers. However, one computer may be configured to have the three functions. Therefore, not only when the functions of the storage managing client 301, the performance/configuration information collecting server 304, and the management server 305 are realized by one computer but also when the functions are realized by plural computers, the computers can be regarded as configuring one management system.

With the components explained above, the storage system 300 provides a job system in a storage area network (SAN) environment, a system which manages execution of the job system, and a system which manages storage in the SAN environment. Hardware included in the job system includes the at least one host server 303, the at least one SAN switch 311, the at least one storage device 312, and a LAN 302. Hardware included in the system for storage management in the SAN environment includes the storage managing client 301, the at least one performance/configuration information collecting server 304, and the management server 305.

The storage managing client 301 is a computer for a user to input various instructions and information to the host server 303, the performance/configuration information collecting server 304, the management server 305, and the storage device 312. Although not shown in the figure, the storage managing client 301 includes hardware (a CPU, a memory, a communication device, an input and output device, etc.) included in a normal computer. For example, as the instructions input from the storage managing client 301 to the management server 305, there are a target response performance value, a selection instruction for a shift target virtual logical volume, an instruction for addition and deletion of a volume, and the like. GUI information for pool information display is provided from the management server 305 to the storage managing client 301 and GUI display (see FIG. 19) is performed.

The host server 303 includes a CPU (Central Processor Unit: which can also be simply referred to as processor), a communication device, and a memory/disk device. In the memory/disk device, an OS (Operation System), job software 306, an application monitoring agent 307, a host monitoring agent 308, and the like are stored. The host server 303 issues an I/O request to the storage device 312 according to, for example, a request from a not-shown client terminal, acquires information from the storage device 312, and executes operations for, for example, providing the client terminal with acquired information. The job software 306 is software included in a job system and is, for example, a DB (database) managing program and a mail application. The application monitoring agent 307 is a program for monitoring an execution state of the job software 306. The host monitoring agent 308 is a program for monitoring an operation state of the host server 303.

Like a normal computer, the performance/configuration information collecting server 304 includes a CPU, a communication device, and a memory/disk device. In the memory/disk device, the storage monitoring agent 309 corresponding to the at least one storage device 312 is stored. The storage monitoring agent 309 is started at predetermined timing (e.g., timing periodically determined by a timer according to scheduling configuration) or started according to a request of storage managing software. The storage monitoring agent 309 is a program for acquiring configuration/capacity information and/or performance information from a monitoring target device, components, and software covered by the storage monitoring agent 309. As explained later, information acquired by the storage monitoring agent 309 is provided to the management server 305 and used for arrangement determination (rearrangement) processing for virtual logical volumes.

Like a normal computer, the management server 305 includes a CPU, a communication device, and a memory/disk device. In the memory/disk device, a storage managing program 310 is stored. The storage managing program 310 is a program for performing collection and monitoring of configuration information of an SAN, performance information, and application information and shifting a virtual logical volume to reduce cost according to a state of use of the storage devices 317 to 319. The storage managing program 310 uses dedicated agents for the configuration information, the performance information, and the application information in order to acquire the configuration information, the performance information, and the application information from hardware and software included in the SAN. An overview of processing executed by the storage managing program 310 is explained with reference to FIG. 4.

The storage device 312 includes a CPU 320, a memory 313, and SSDs (Solid State Disks) 317, SASs (Serial Attached SCSIs) 318, and SATAs (Serial ATAs) 319, which are plural kinds of storage devices. The CPU 320 functions as a control part which controls the operation of the storage device 312 using various programs stored in the memory 313. For example, the CPU 320 controls writing of data in and readout of data from the SSDs 317, the SASs 318, and the SATAs 319 according to a request received from the host server 303 or the like. The various programs for controlling the storage device 312 include at least a virtual logical volume management control program 314, a pool creation executing program 315, and a virtual logical volume shift executing program 316. The virtual logical volume management control program 314 provides a function for showing a storage region to the host server 303 or the like as a virtual logical volume. The SSDs 317, the SASs 318, and the SATAs 319, are plural storage device groups having different performances and may include storage device groups of types other than SSD, SAS, and SATA. The pool creation executing program 315 has a function of receiving a command from the storage managing program 310 and creating a pool. The virtual logical volume shift executing program 316 has a function of receiving a command from the storage managing program 310 and shifting a virtual logical volume.

<Function of the Storage Managing Program>

Figure 4:
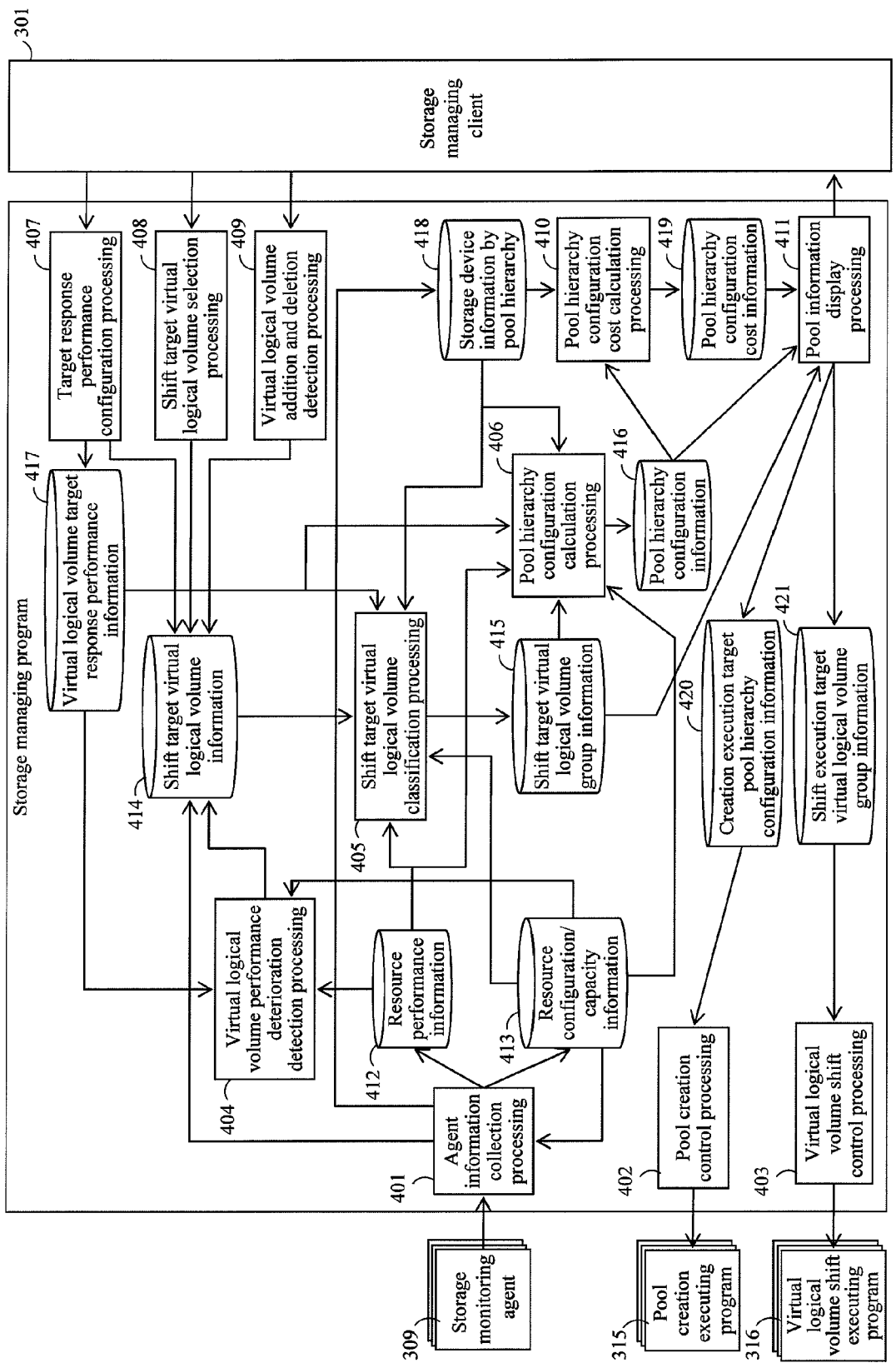
FIG. 4 is a block diagram for explaining functions of a storage managing program 310.

FIG. 4 is a block diagram for explaining functions of the storage managing program 310. Details of processing by the functions are explained with reference to flowcharts and the like (FIGS. 20 to 35) explained later.

The storage managing program 310 executes agent information collection processing 401, pool creation control processing 402, virtual logical volume shift control processing 403, virtual logical volume performance deterioration detection processing 404, shift target virtual logical volume classification processing 405, pool hierarchy configuration calculation processing 406, target response performance configuration processing 407, shift target virtual logical volume selection processing 408, virtual logical volume addition and deletion detection processing 409, pool hierarchy configuration cost calculation processing 410, and pool information display processing 411. The respective kinds of processing can be realized as program modules included in the storage managing program 310.

The storage managing program 310 executes the respective kinds of processing with reference to resource performance information 412, resource configuration/capacity information 413, shift target virtual logical volume information 414, shift target virtual logical volume group information 415, pool hierarchy configuration information 416, virtual logical volume target response performance information 417, storage device information by pool hierarchy 418, pool hierarchy configuration cost information 419, creation execution target pool hierarchy configuration information 420, and shift execution target virtual logical volume group information 421. The storage managing program 310 acquires the information from a memory or a disk device on the performance/configuration information collecting server 304 and uses the information for the various kinds of processing. Details of the various kinds of information are explained later.

The storage managing program 310 starts and executes the agent information collection processing 401 at predetermined timing (e.g., periodically according to scheduling configuration or according to an instruction from a user of the storage managing client or other processing), receives configuration/capacity information or performance information from devices, agents (programs), and components in an SAN environment collected by the storage monitoring agent 309, and stores the information as any one of the resource performance information 412 and the resource configuration/capacity information 413. A resource is a general term of hardware (a storage device, a host server, etc.) included in the SAN environment and physical or logical components (a parity group, a logical volume, etc.) of the hardware and programs (job software, a database managing system, a file managing system, volume managing software, etc.) executed on the hardware and logical components (a file system, a logical device, etc.) of the programs.

The resource performance information 412 is performance information of a registration target resource collected by the agent information collection processing 401. Specifically, page performance information 600 (see FIG. 6) and virtual logical volume performance information 700 (see FIG. 7) explained later correspond to the resource performance information 412. The resource configuration/capacity information 413 is configuration/capacity information of a registration target resource collected by the agent information collection processing 401. Specifically, page configuration information 800 (see FIG. 8), pool configuration information 900 (see FIG. 9), virtual logical volume configuration/capacity information 1000 (see FIG. 10), and storage device information by pool hierarchy 418 (see FIG. 11) explained later correspond to the resource configuration/capacity information 413.

The storage managing program 310 compares the information stored in the virtual logical volume configuration/capacity information 1000 during the last collection in the agent information collection processing 401 and information concerning a virtual logical volume acquired during the information collection. When addition or deletion of a virtual logical volume is detected, the storage managing program 310 stores, in the shift target virtual logical volume information 414 (see FIG. 13), a virtual logical volume group belonging to a hierarchical pool in which the virtual logical volume is arranged (generates shift target virtual logical volume information). A virtual logical volume group other than the virtual logical volume group may be included in the shift target virtual logical volume information 1300.

The storage managing program 310 starts and executes the volume performance deterioration detection processing 404 at predetermined timing (e.g., periodically according to scheduling configuration or according to an instruction from a user of a storage management software client), compares a value of a response performance space 702 of the virtual logical volume performance information 700 and values of a target response performance space 1202 or a target response performance space 1202 and an excess performance threshold space 1203 of the virtual logical volume target response performance information 417 (FIG. 12), and stores, in the shift target virtual logical volume information 414, a virtual logical volume group belonging to a hierarchical pool in which a virtual logical volume satisfying a condition is arranged (generates shift target volume information). A virtual logical volume group other than the virtual logical volume group may be included in the shift target virtual logical volume information 414. Details of a procedure of the volume performance deterioration detection processing 404 are explained later (see FIG. 22).

The storage managing program 310 executes the volume addition and deletion detection processing 409 in response to an instruction from the storage management software client and stores, in the shift target virtual logical volume information 414, a virtual logical volume group belonging to a hierarchical pool in which a virtual logical volume for which the user performs operation for addition or deletion is arranged (generates shift target volume information). A virtual logical volume group other than the virtual logical volume group may be included in the shift target virtual logical volume information 414. Details of the volume addition and deletion detection processing 409 are explained later (see FIG. 23).

The storage managing program 310 executes the target response performance configuration processing 407 in response to an instruction from the storage management software client, acquires target response performance or target response performance and an excess performance threshold to be set in a virtual logical volume from a user input, and stores the target response performance or the target response performance and the excess performance threshold in the virtual logical volume target response performance information 417 (generates volume target response performance information). When the target response performance is not set, for example, the target response performance can be regarded as the same as basic response performance of a storage device of a lowest hierarchy included in a pool or can be regarded as infinite. When the excess performance threshold is not set, the excess performance threshold can be regarded as absent (0). When the target response performance of the virtual logical volume is set anew, changed to a different value, or deleted, the storage managing program 310 stores, in the shift target virtual logical volume information 414, a virtual logical volume group belonging to a hierarchical pool in which the virtual logical volume is arranged (generates shift target volume information). A virtual logical volume group other than the virtual logical volume group may be included in the shift target virtual logical volume information 414. Details of the target response performance configuration information 407 are explained later (see FIG. 24).

Further, the storage managing program 310 starts and executes the shift target virtual logical volume selection processing 408 in response to an instruction from the storage management software client and stores, in the shift target virtual logical volume information 414, a virtual logical volume group selected as a shift target by the user (generates shift target volume information). Details of the shift target volume selection processing are explained later (see FIG. 25).

When the shift target virtual logical volume group stored in the shift target virtual logical volume information 414 by the shift target virtual logical volume classification processing 405 is arranged on a hierarchical pool, the storage managing program 310 classifies the shift target virtual logical volume group into groups which can satisfy target response performances at low cost and stores the shift target virtual logical volume group in the shift target volume group information 415 (see FIG. 14) (generates shift target volume group information). Details of the shift target volume classification processing 405 are explained later (see FIGS. 26, 33, and 35).

The storage managing program 310 calculates, according to the pool hierarchy configuration calculation processing 406, on the basis of the shift target virtual logical volume group information 415, the virtual logical volume target response performance information 417, the page performance information 600, the page configuration information 800, and the storage device information by pool hierarchy 418, a hierarchy configuration of a hierarchical pool necessary for virtual logical volumes to satisfy target response performances when virtual logical volume groups are arranged on the hierarchical pool and stores the hierarchy configuration in the pool hierarchy configuration information 416 (generates pool hierarchy configuration information). Details of the pool hierarchy configuration calculation processing are explained later (see FIG. 27).

The storage managing program 310 calculates cost information for each of pools from capacity information spaces 1503 to 1505 of hierarchies of the pool hierarchy configuration information 416 (see FIG. 15) and a capacity unit price space 1103 of the storage device information by pool hierarchy 418 (see FIG. 11) by the pool hierarchy configuration cost calculation processing 410 and stores the cost information in the pool hierarchy configuration cost information 419 (see FIG. 16) (generates pool hierarchy configuration cost information). Details of the pool hierarchy configuration cost calculation processing 410 are explained later (see FIG. 30).

The storage managing program 310 acquires, according to the pool information display processing 411, correspondence information of the capacity information spaces 1503 to 1505 of the hierarchies of the pool hierarchy configuration information 416, a cost space 1602 of the pool hierarchy configuration cost information 419, and a pool and a virtual logical volume of the shift target virtual logical volume group information 415 (see FIG. 14), generates information for GUI display, and provides the storage managing client with the information. A GUI display example is explained later (see FIG. 19). When the user instructs creation of the pool on the basis of a displayed GUI, the creation target pool is stored in the creation execution target pool hierarchy configuration information 420. When the user instructs the creation and arrangement of a virtual logical volume group, the creation target pool is stored in the creation execution target pool hierarchy configuration information 420 and the shift target virtual logical volume is stored in the shift execution target virtual logical volume group information 421. Details of the pool information display processing are explained later (see FIG. 31).

The storage managing program 310 issues, according to the pool creation control processing 402, on the basis of the creation execution target pool hierarchy configuration information 420, an execution command to the pool creation executing program 315 of the storage device 312. The storage managing program 310 issues, according to the virtual logical volume shift control processing 403, on the basis of the shift execution target virtual logical volume group information 421, an execution command to the virtual logical volume shift executing program.

<Logical Relation of Storage Regions in a Storage System>

Figure 5:
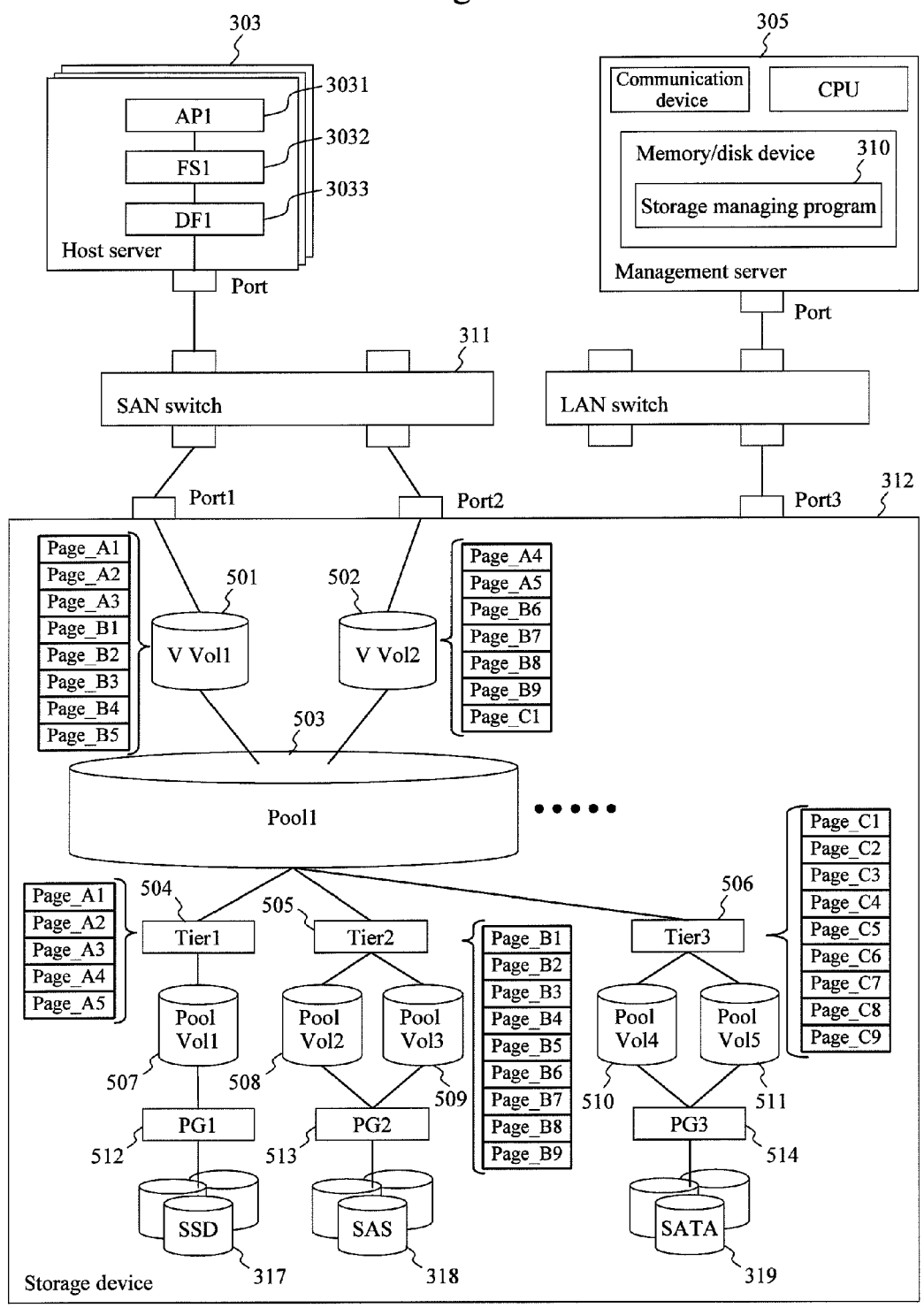
FIG. 5 is a diagram showing a specific example concerning a configuration of resources in an SAN environment, a relation among the resources, and an arrangement state of pages, which are allocated to virtual logical volumes, in a storage hierarchy.

FIG. 5 is a diagram showing a specific example concerning the configuration of resources in an SAN environment, a relation among the resources, and an arrangement state of pages allocated to virtual logical volumes in storage hierarchies.

In FIG. 5, only a single storage device is shown. However, a storage system may include plural storage devices. The management server 305 may be connected to the storage device 312 by the SAN switch 311. The storage managing program 310 may be present on the storage device 312.

It is assumed that an application "AP1_3031" is running on the host server 303. This AP1_3031 is any one of applications included in the job software 306 shown in FIG. 1. A file system "FS1_3032" and a device file "DF1_3033" are present in the host server 303. The FS1_3032 and the DF1_3033 are examples of resources from which the host monitoring agent 308 acquires information. The file system "FS1_3032" is a unit for the OS to provide an input and output service for data and is software for systematically managing a storage region to which data is input. The device file "DF1_3033" is software managed by the OS as a region for storing a file in an external storage device. As shown in FIG. 3, in the host server 303, the application monitoring agent 307 for acquiring configuration information and performance information of the application "AP1_3031" and the host monitoring agent 308 for acquiring configuration information and performance information of the file system "FS1_3032" and the device file "DF1_3033" are operating.)

In FIG. 5, it is indicated that a dependency relation by I/O is present between two resources connected by a line which connects the resources. For example, a line connecting the application "AP1_3031" and the file system "FS1_3032" represents a relation that the application "AP1_3031" issues I/O to the file system "FS1_3032". A line connecting the file system "FS1_3032" and the device file "DF1_3033" represents a relation that an I/O load to the file system "FS1_3032" is read or write of the device file "DF1_3033".

The device file "DF1_3033" of the host server 303 is allocated to virtual logical volumes 501 and 502 of the storage device 312. In FIG. 5, the device file "DF1_3033" is allocated to the virtual logical volumes 501 and 502. However, the device file "DF1_3033" may be allocated to an actual logical volume such as a pool volume. A correspondence relation between device files and virtual logical volumes can be acquired from the host monitoring agent 308 or the like.

Although not shown in FIG. 5, in order to acquire configuration information and performance information of the storage device 312, the storage monitoring agent 309 shown in FIG. 3 is running on a management system. Resources from which the storage monitoring agent 309 acquires information are at least virtual logical volumes "VVol1_501" and "VVol2_502", storage ports "port 1" and "port 2", a pool "Pool1_503", hierarchies of storage devices "Tier1_504" to "Tier3_506", parity groups "PG1_512" to "PG3_514", pages "Page_A1" to "Page_A5", "Page_B1" to "Page_B9", and "Page_C1" to "Page_C9", and pool volumes "Pool Vol1" to "Pool Vol5".

Each of the parity groups "PG1_512" to "PG3_514" is a high-speed and highly-reliable logical disk drive generated from the plural storage devices 317 to 319 by the storage device 312. The storage devices 317 to 319 include SSDs of semiconductor storage devices and SASs and SATAs of hard disk devices. In this example, a case in which types of storage devices included in storage hierarchies are three types of SSD, SAS, and SATA is explained. The types may be a combination of two types of SSD and SAS or a combination of three or more types.

The pool volumes "PoolVol1_507" to "PoolVol5_511" are logical disk drives (actual logical volumes) created by the storage device 312 dividing a parity group. As the pool volumes "Pool Vol1_507" to "Pool Vol5_511", storage regions equivalent to a defined capacity are secured on the parity groups "PG1_512" to "PG3_514" in advance during creation.

The storage hierarchies "Tier1_504" to "Tier3_506" are logical hierarchies of storage devices created for each of types of the storage devices such as SSD and SAS and include the plural pool volumes "Pool_Vol1_507" to "Pool Vol5_511" sliced from the parity groups "PG1_512" to "PG3_514" created for each of types of a HDD group. As a specific example, "Tier1_504" shown in FIG. 5 is an SSD, a storage hierarchy type of which is a semiconductor storage device, and "Tier2_505" is an SAS, a storage hierarchy type of which is a disk storage device, and "Tier3_506" is an SATA, a storage hierarchy type of which is a disk storage device. Therefore, "Tier1_504" has performance higher than that of "Tier2_505" and "Tier3_506". In the storage hierarchies, data of the virtual logical volumes 501 and 502 are allocated from the pool volumes 507 to 511 in a unit of page. The page is explained later.

The pool "Pool1_503" is a virtual mapping space in a memory for allocating storage regions to the virtual logical volumes "VVol1_501" to "VVol2_502" explained later. The pool "Pool1_503" includes the hierarchies "Tier1_504" to "Tier3_506" of the storage devices. The number of pools is not limited to one. Plural pools can be created. In that case, when pools are created once, concerning the pools, storage regions (forming a page) allocated to the pools are determined in advance. Storage regions are allocated to the virtual logical volumes 501 to 502 from one pool. Therefore, the number of unit storage regions (the number of pages) from hierarchies allocated to the virtual logical volumes from one pool is determined Like the pool volume "Pool Vol1_507", the virtual logical volumes "VVol1_501" to "VVol2_502" are recognized as logical disk drives by the host server 303 according to the function of the virtual logical volume management control program of the storage device 312. However, unlike the actual logical volume "Pool Vol1_507", when the virtual logical volumes "VVol1_501" to "VVol1_507" are created, only a capacity is defined and storage regions equivalent to the defined capacity are not secured. Thereafter, when a write request for new addresses of "VVol1_501" to "VVol2_502" is generated, storage regions are allocated by a necessary amount. The storage regions allocated to the virtual logical volumes 501 to 502 are allocated in a unit of page explained later. In the example shown in FIG. 5, it is seen that "Page_A1" to "Page_A3" are allocated from "Tier1_504" and "Page_B1" to "Page_B5" are allocated from "Tier2_505" to "VVol1_501" and "Page_A4" to "Page_A5" are allocated from "Tier1_504", "Page_B6" to "Page_B9" are allocated from "Tier2_505", and "Page_C1" is allocated from "Tier3_506" to "VVol2_502". A mechanism for allocating pages is explained later.

The pages "Page_A1" to "Page_C9" are storage regions which can be allocated to the virtual logical volumes 501 to 502. In the virtual logical volumes 501 to 502 belonging to a pool having storage hierarchies like the pool "Pool1_503", pages are arranged in higher-performance storage hierarchies in order from a page having a relatively high access characteristic (as a representative access characteristic, as explained above, the number of I/Os per unit time or Last Access Time) compared with the other pages in a single pool. A page having a relatively low access characteristic is arranged in a low-performance storage hierarchy. In the arrangement of the pages, the storage managing program 310 acquires configuration information (storage hierarchy information and page information) of the storage device 312 and information concerning an access characteristic in page unit from the storage device 312 and performs arrangement of pages according to the rule explained above. In the example shown in FIG. 5, for example, when an access characteristic to a page of "Page_B3" currently used by "VVol1_501" substantially increases, rearrangement of pages for allocating "Page_A4" of "Tier1_504" to "VVol1_501" and allocating "Page_B3" of "Tier2_505" to "VVol2_502" is performed.

The pool 503 provides the host server 303 with the virtual logical volumes 501 to 502. The pool 503 includes the storage devices 317 to 319 of plural types. The storage devices 317 to 319 provide the pool 503 with the pool volumes 507 to 511, which are actual regions formed by divided regions of the parity groups 512 to 514.

<Configuration Example of Various Kinds of Information>

FIGS. 6 to 18 are diagrams showing configuration examples of various kinds of information stored in the management server 305 and used by the storage managing program 310. In order to explain the information, a table format is adopted. However, a form of the information is not limited. Any form may be adopted as long as the form is a structure in which a relation of configuration items can be grasped.

(i) Page Performance Information (Table)

Figure 6:
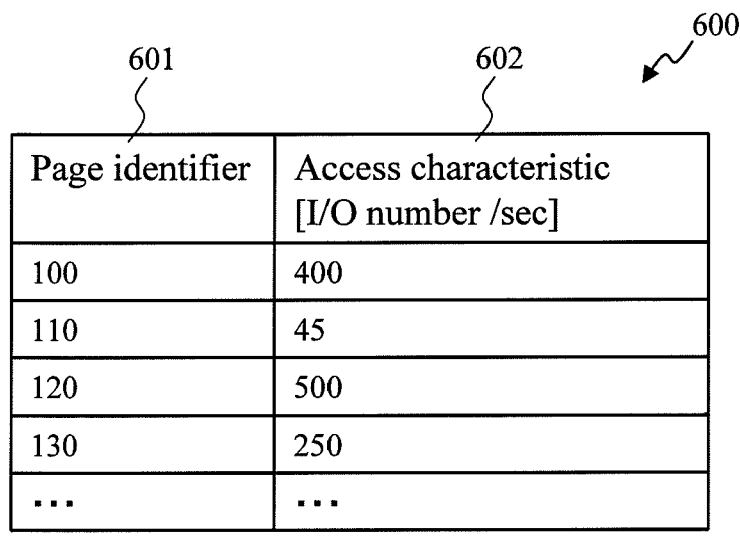
FIG. 6 is a diagram showing a configuration example of page performance information 600.

FIG. 6 is a diagram showing a configuration example of the page performance information 600. The page performance information 600 is information forming a part of the resource performance information 412.

The page performance information 600 includes a page identifier 601 and an access characteristic 602 as configuration items. When the storage monitoring agent 309 collects these kinds of information (the identifier and the access characteristic (in the figure, as an example, an average number of I/Os per unit time)) for each of pages. The storage managing program 310 acquires, according to the agent information collection processing 401, values collected by the storage monitoring agent 309.

The page identifier 601 is information for uniquely identifying and specifying a page, which is a unit of a storage region allocated to a virtual logical volume from a storage device.

The access characteristic 602 is information indicating an access characteristic to a pertinent page. Since this information is a measured value, the information changes periodically. A value measured at that point periodically may be written in the table or an average of values from the last table writing to the present measurement may be written.

(ii) Virtual Logical Volume Performance Information (Table)

Figure 7:
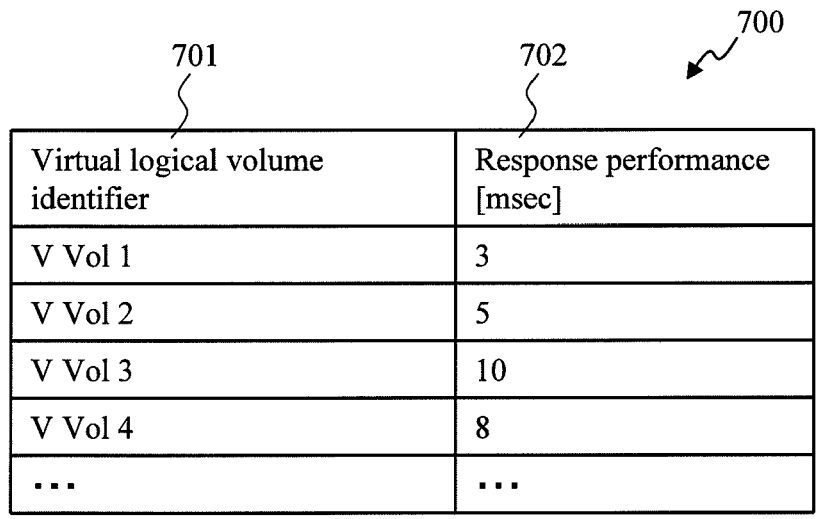
FIG. 7 is a diagram showing a configuration example of virtual logical volume performance information 700.

FIG. 7 is a diagram of a configuration example of the virtual logical volume performance information 700. The virtual logical volume performance information 700 is information forming a part of the resource performance information 412.

The virtual logical volume performance information 700 includes a virtual logical volume identifier 701 and response performance 702 as configuration items. The storage monitoring agent 309 collects an identifier and response performance for each of virtual logical volumes. The storage managing program 310 acquires, according to the agent information collection processing 401, a value collected by the storage monitoring agent 309.

The virtual logical volume identifier 701 is information for uniquely identifying and specifying a configured virtual logical volume.

The response performance 702 is information indicating a value of response performance displayed by a virtual logical volume corresponding thereto. This information is a measured value and represented as an average of response speed to I/O request made to plural pages included in virtual logical volumes. The information concerning the response performance 702 can be used to observe a shift between the response performance 702 and target response performance. When the response performance 702 as an actually measured value is deteriorated to be lower than the target response performance, arrangement of virtual logical volumes is reconfigured. Details are explained later. In addition to the average of response speed, a minimum and a maximum of response speed may be stored. Consequently, it is possible to allocate storage regions to the virtual logical volumes taking into account a degree of fluctuation in response speed.

(iii) Page Configuration Information (Table)

Figure 8:
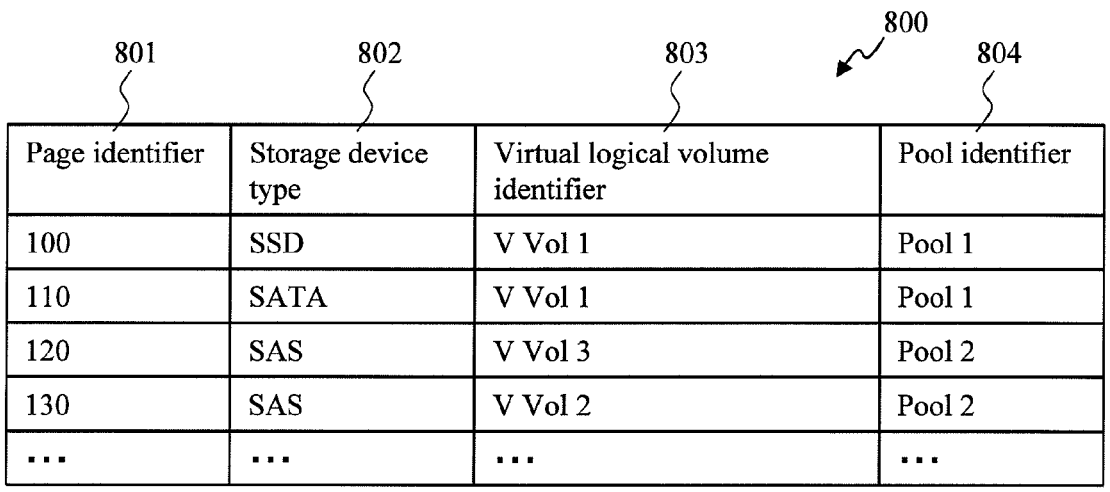
FIG. 8 is a diagram showing a configuration example of page configuration information 800.

FIG. 8 is a diagram showing a configuration example of the page configuration information 800. The page configuration information 800 is information forming a part of the resource configuration/capacity information 413. According to the page configuration information 800, it is seen from which storage device (Tier) each page is sliced as a storage region and to which virtual logical volume and via which pool the page is allocated.

The page configuration information 800 includes a page identifier 801, a storage device type 802, a virtual logical volume identifier 803, and a pool identifier 804 as configuration items. The storage monitoring agent 309 collects, for each of pages, an identifier, a hierarchy type of a storage device, an identifier of an allocated virtual logical volume, and an identifier of a pool to which the allocated virtual logical volume belongs. The storage managing program 310 acquires, according to the agent information collection processing 401, a value collected by the storage monitoring agent 309.

The page identifier 801 is information for uniquely identifying and specifying a page, which is a unit of a storage region allocated to a virtual logical volume from a storage device.

The storage device type 802 is information indicating which storage region of which storage device in which hierarchy a page belongs to.

The virtual logical volume identifier 803 is information for uniquely identifying and specifying a virtual logical volume to which the corresponding page is allocated.

The pool identifier 804 is information for uniquely identifying and specifying a pool for allocating the corresponding page to a virtual logical volume corresponding thereto.

(iv) Pool Configuration Information (Table)

Figure 9:
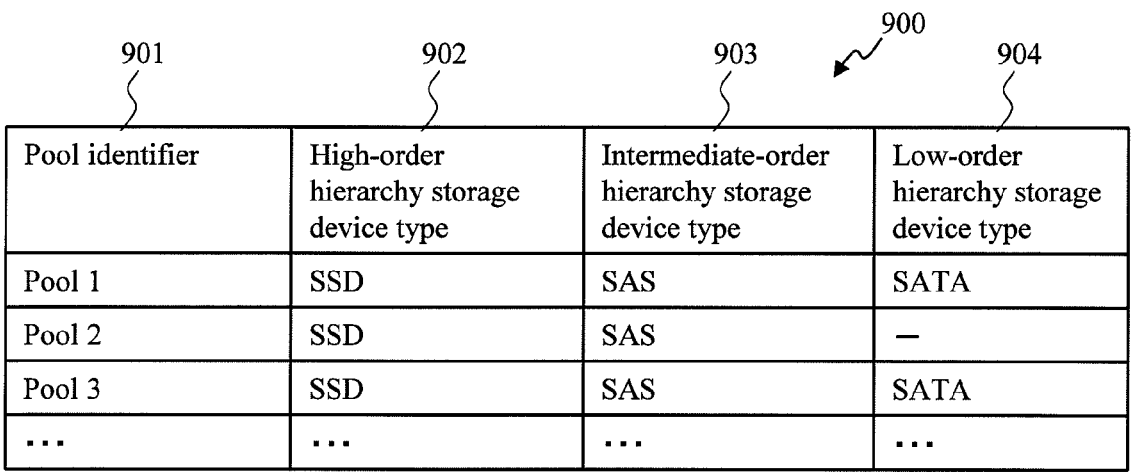
FIG. 9 is information indicating a configuration example of pool configuration information 900.

FIG. 9 is information showing a configuration example of the pool configuration information 900. The pool configuration information 900 is information forming a part of the resource configuration/capacity information 413. According to the pool configuration information 900, it is seen which storage region sliced from which storage device (Tier) each pool allocates to each virtual logical volume.

The pool configuration information 900 includes a pool identifier 901, a high-order hierarchy storage device type 902, an intermediate-order hierarchy storage device type 903, and a low-order hierarchy storage device type 904 as configuration items. The storage monitoring agent 309 collects, for each of pools, an identifier, a high-order hierarchy storage device type, an intermediate-order hierarchy storage device type, and a low-order hierarchy storage device type. The storage managing program 310 acquires, according to agent information collection processing, a value collected by the storage monitoring agent 309. A hierarchy of a pool does not always need to include three layers and may include two layers, four layers, or the like. The agent information collection processing 401 does not always need to be executed to acquire these kinds of information.

(v) Virtual Logical Volume Configuration/Capacity Information (Table)

Figure 10:
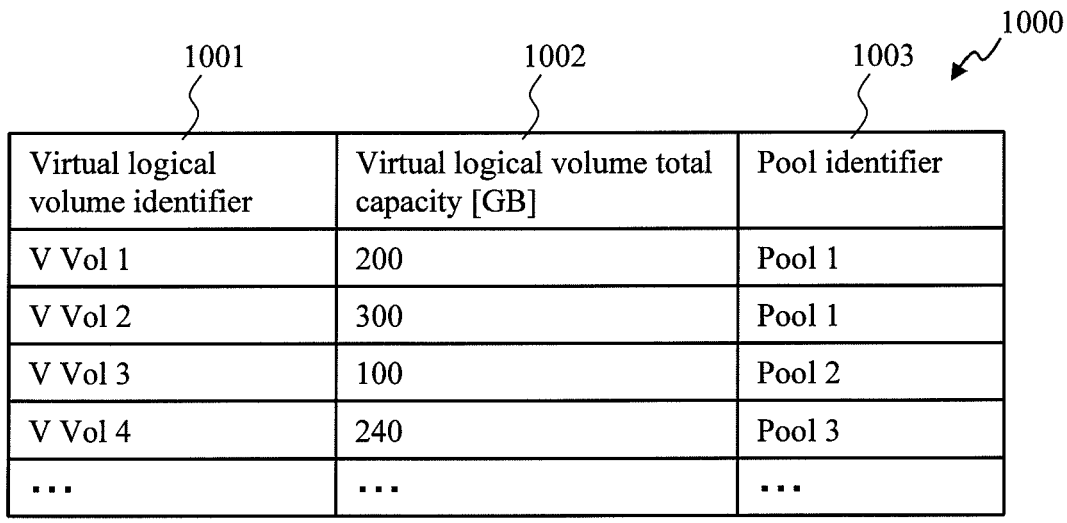
FIG. 10 is a diagram showing a configuration example of virtual logical volume configuration/capacity information 1000.

FIG. 10 is a diagram showing a configuration example of the virtual logical volume configuration/capacity information 1000. The virtual logical volume configuration/capacity information 1000 is information forming a part of the resource configuration/capacity information 413. According to the virtual logical volume configuration/capacity information 1000, a capacity of each virtual logical volume is seen and it is seen to which pool each virtual logical volume belongs.

The virtual logical volume information 1000 includes a virtual logical volume identifier 1001, a virtual logical volume total capacity 1002, and a pool identifier 1003 as configuration items. The storage monitoring agent 309 collects, for each of virtual logical volumes, an identifier, a total capacity, and an identifier of a pool to which the virtual logical volume belongs. The storage managing program 310 acquires, according to the agent information collection processing 401, a value collected by the storage monitoring agent 309.

(vi) Storage Device Information by Pool Hierarchy (Table)

Figure 11:
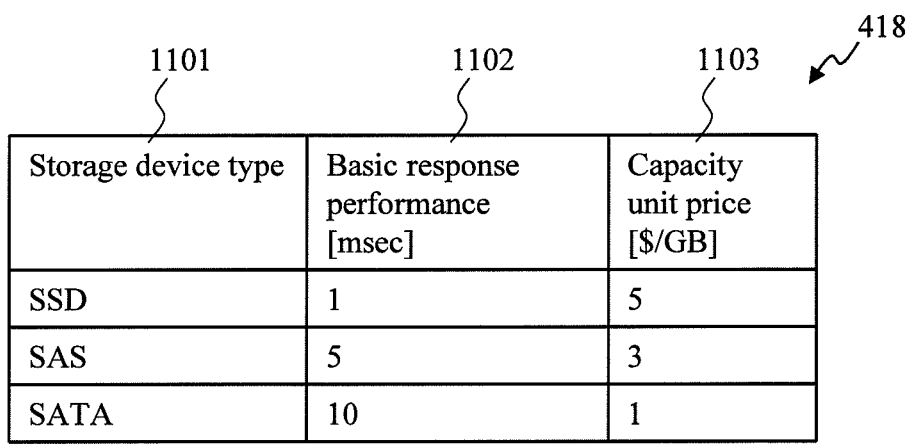
FIG. 11 is a diagram showing a configuration example of storage device information by pool hierarchy 418.

FIG. 11 is a diagram showing a configuration example of the storage device information by pool hierarchy 418. From the storage device information by pool hierarchy 418, it is possible to know basic response performance (design values) of storage devices and a capacity unit price per GB.

The storage device information by pool hierarchy 418 includes a storage device type 1101, basic response performance 1102, and a capacity unit price 1103 as configuration items. The storage monitoring agent 309 collects, for each of storage device types, basic response performance and a capacity unit price. The storage managing program 310 acquires, according to the agent information collection processing 401, a value acquired by the storage monitoring agent 309. The agent information collection processing 401 does not always need to be executed to acquire these kinds of information. For example, when the storage system 300 is built, the storage device information by pool hierarchy 418 may be acquired from basic information of storage devices configured in the system and stored in the system in advance.

(vii) Virtual Logical Volume Target Response Performance Information (Table)

Figure 12:
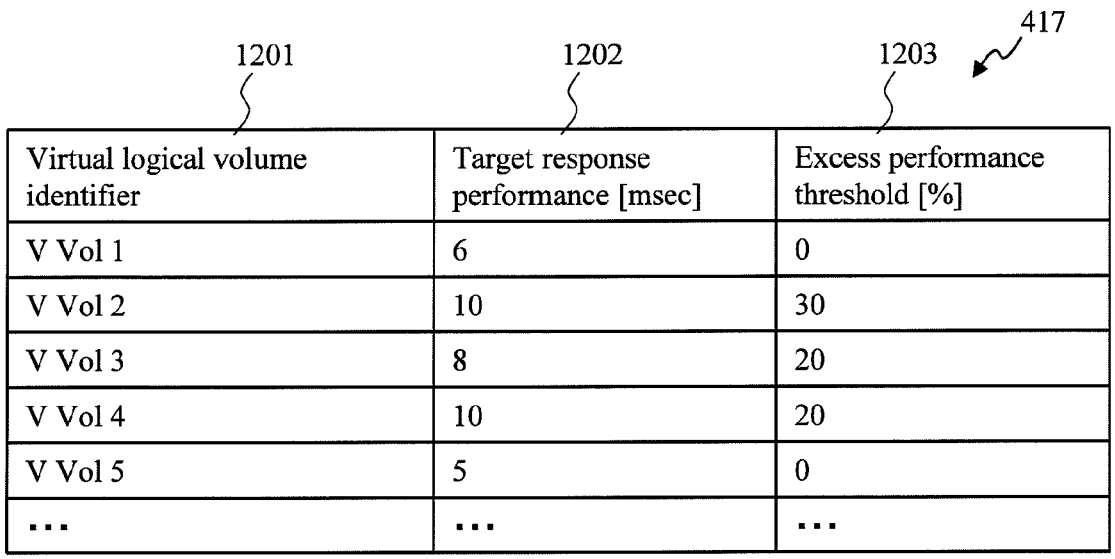
FIG. 12 is a diagram showing a configuration example of virtual logical volume target response performance information 417.

FIG. 12 is a diagram showing a configuration example of the virtual logical volume target response performance information 417. From the virtual logical volume target response performance information 417, it is possible to know target response performance and an excess performance threshold set by the user for virtual logical volumes.

The virtual logical volume target response performance information 417 includes a virtual logical volume identifier 1201, target response performance 1202, and an excess performance threshold 1203 as configuration items. The storage managing program 310 executes the target response performance configuration processing on the basis of a user input and acquires an identifier, target response performance, and an excess performance threshold for each of virtual logical volumes.

The virtual logical volume identifier 1201 is information for uniquely identifying and specifying a virtual logical volume.

The target response performance 1202 is information indicating target response performance of a virtual logical volume corresponding thereto (an average of response performance of pages) input by the user from the storage managing client 301.

The excess performance threshold 1203 is information indicating an excess performance threshold input by the user from the storage managing client 301. This excess performance threshold is a threshold for determining that actually measured response performance is deteriorated to be lower than target response performance. For example, if the target response performance is 10 msec and the excess performance threshold is 30%, when the actually measured response performance is speed equal to or lower than 10×(1−0.3)=7 msec, it is determined that response performance is deteriorated. Rearrangement processing for virtual logical volumes is started. In other words, the excess performance threshold functions as an adjustment parameter for making it possible to start the rearrangement processing for virtual logical volumes before actual response performance is deteriorated to be lower than the target response performance. The excess performance threshold does not always need to be acquired from a user input. For example, a constant defined in the system may be stored.

(viii) Shift Target Virtual Logical Volume Information (Table)

Figure 13:
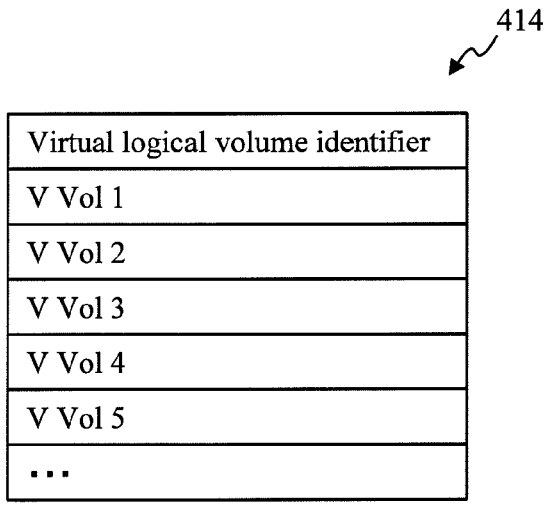
FIG. 13 is a diagram showing a configuration example of shift target virtual logical volume information 414.

FIG. 13 is a diagram showing a configuration example of the shift target virtual logical volume information 414. The shift target virtual logical volume information 414 stores an identifier of a virtual logical volume to be shifted, i.e., a virtual logical volume to which a storage region should be reallocated. "Shift" means that a virtual logical volume is shifted among pools according to the grouping processing for virtual logical volumes (the shift target virtual logical volume classification processing 405). The "shift" can be rephrased as "rearrangement of virtual logical volumes". The shift includes a form for moving, in a state in which plural pools are present, a virtual logical volume among the pools and a form in which only one pool is present and, after the grouping processing, pools equivalent to the number of groups are created and the virtual logical volume is moved.

The identifier of the virtual logical volume to be shifted is acquired when it is found that a virtual volume is added or deleted in the storage device 312 by the agent information collection processing 401, when a virtual logical volume in which actually measured response performance is deteriorated to be lower than the target response performance is detected by the volume performance deterioration detection processing 404, when target response performance is set anew, added, or deleted by the target response performance configuration processing 407, when a virtual logical volume to be shifted is designated by the shift target virtual logical volume selection processing 408, or when the user instructs addition or deletion of a virtual logical volume according to the virtual logical volume addition and deletion detection processing 409. The identifier is registered as a shift target virtual logical volume.

(ix) Shift Target Virtual Logical Volume Group Information (Table)

FIG. 14 is a diagram showing a configuration example of the shift target virtual logical volume group information 415. From the shift target virtual logical volume group information 415, it is possible to know in which pool a shift target virtual logical volume is arranged anew.

The shift target virtual logical volume group information 415 includes a virtual logical volume identifier 1401 and an arrangement destination pool identifier 1402 as configuration items. The storage managing program 310 executes the shift target volume classification processing 405 on the basis of the shift target virtual logical volume information 414, the virtual logical volume target response performance information 417, the resource configuration/capacity information 413, the resource performance information 412, and the storage device information by pool hierarchy 418 and calculates a set of an identifier of a virtual logical volume to be shifted and an identifier of a pool in which the virtual logical volume is arranged.

The virtual logical volume identifier 1401 is information for uniquely identifying and specifying a virtual logical volume registered in the shift target virtual logical volume information 414 as a virtual logical volume to be shifted.

The arrangement destination pool identifier 1402 is information for uniquely identifying and specifying a pool in which the virtual logical volume to be shifted as a result of the shift target virtual logical volume classification processing 405 should be arranged. The pool in which the virtual logical volume is arranged could be changed concerning virtual logical volumes or could be the same as a pool before the rearrangement processing (the shift target virtual logical volume classification processing). Actual shift (rearrangement) may be executed when instructed by the user (explained later) or may be automatically executed.

(x) Pool Hierarchy Configuration Information (Table)

FIG. 15 is a diagram showing a configuration example of the pool hierarchy configuration information 416. The pool hierarchy configuration information 416 indicates a total capacity of the pools after the shift and details of capacities from hierarchy storage devices which configure the pools.

The pool hierarchy configuration information 416 includes a pool identifier 1501, a total capacity of pools 1502, a high-order hierarchy capacity 1503, an intermediate-order hierarchy capacity 1504, and a low-order hierarchy capacity 1505 as configuration items. The storage managing program 310 executes the pool hierarchy configuration calculation processing 406 on the basis of shift target volume group information, resource performance information, volume target response performance information, and storage device information by pool hierarchy and calculates, for each of arrangement destination pools, an identifier, a total capacity, a high-order hierarchy capacity, an intermediate-order hierarchy capacity, and a low-order hierarchy capacity.

The pool identifier 1501 is information for uniquely identifying and specifying a pool configured anew by rearrangement processing.

The total capacity of pools 1502 is information indicating a total capacity of pools corresponding thereto. The high-order hierarchy capacity 1503 is information indicating a capacity of a storage region allocated from a storage device in a high-order hierarchy in the corresponding pools. The intermediate-order hierarchy capacity 1504 is information indicating a capacity of a storage region allocated from a storage device in an intermediate-order hierarchy in the corresponding pools. The low-order hierarchy capacity 1505 is information indicating a capacity of a storage region allocated from a storage device in a low-order hierarchy in the corresponding pools.

(xi) Pool Hierarchy Configuration Cost Information (Table)

FIG. 16 is a diagram showing a configuration example of the pool hierarchy configuration cost information 419. The pool hierarchy configuration cost information 419 indicates cost of pools configured anew.

The pool hierarchy configuration cost information 419 includes a pool identifier 1601 and cost 1602 as configuration items.

Like the pool identifier 1501 shown in FIG. 15, the pool identifier 1601 is information for uniquely identifying and specifying a pool configured anew by the rearrangement processing.

The cost 1602 is information indicating cost of the pools calculated from the pool hierarchy configuration information 416 and the storage device information by pool hierarchy 418. The storage managing program 310 executes the pool hierarchy configuration cost calculation processing 410 with reference to pool hierarchy configuration information and storage device information by pool hierarchy and calculates an identifier and cost for each of arrangement destination pools. For example, concerning a pool 10, cost of a high-order hierarchy (300×5)+cost of an intermediate-order hierarchy (600×3), +cost of a low-order hierarchy (300×1)=3600.

(xii) Creation Execution Target Pool Hierarchy Configuration Information (Table)

FIG. 17 is a diagram showing a configuration example of the creation execution target pool hierarchy configuration information 420.

The creation execution target pool hierarchy configuration information 420 includes a pool identifier 1701, a total capacity of pools 1702, a high-order hierarchy capacity 1703, an intermediate-order hierarchy capacity 1704, and a low-order hierarchy capacity 1705 as configuration items. These kinds of information are acquired by being extracted from the pool hierarchy configuration information 416 by the user instructing pool creation in a GUI (see FIG. 19) generated by pool information display processing and displayed in the storage managing client 31. In the example shown in FIG. 17, a state in which creation of pools 10 and 11 is instructed via the GUI (FIG. 19) is shown.

(xiii) Shift Execution Target Virtual Logical Volume Group Information (Table)

Figure 18:
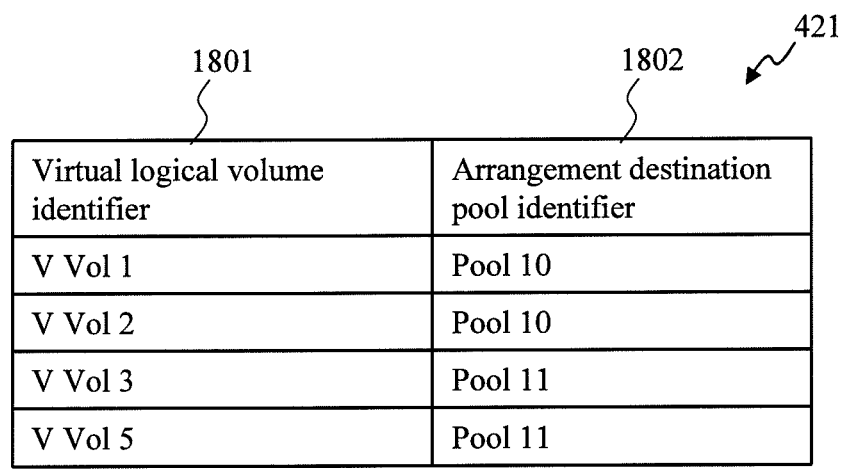
FIG. 18 is a diagram showing a configuration example of shift execution target virtual logical volume group information 421.

FIG. 18 is a diagram showing a configuration example of a shift execution target virtual logical volume group information 421.

The shift execution target virtual logical volume group information 421 includes a virtual logical volume identifier 1801 and an arrangement destination pool identifier 1802 as configuration items. These kinds of information are acquired by being extracted from the shift target virtual logical volume information 415 by the user instructing arrangement execution selection in a GUI (see FIG. 19) generated by pool information display processing and displayed in the storage managing client 301. In the example shown in FIG. 18, a state in which virtual logical volumes belonging to the pools 10 and 11 are subjected to rearrangement via the GUI (FIG. 19) is shown.

<GUI Display Example>

Figure 19:
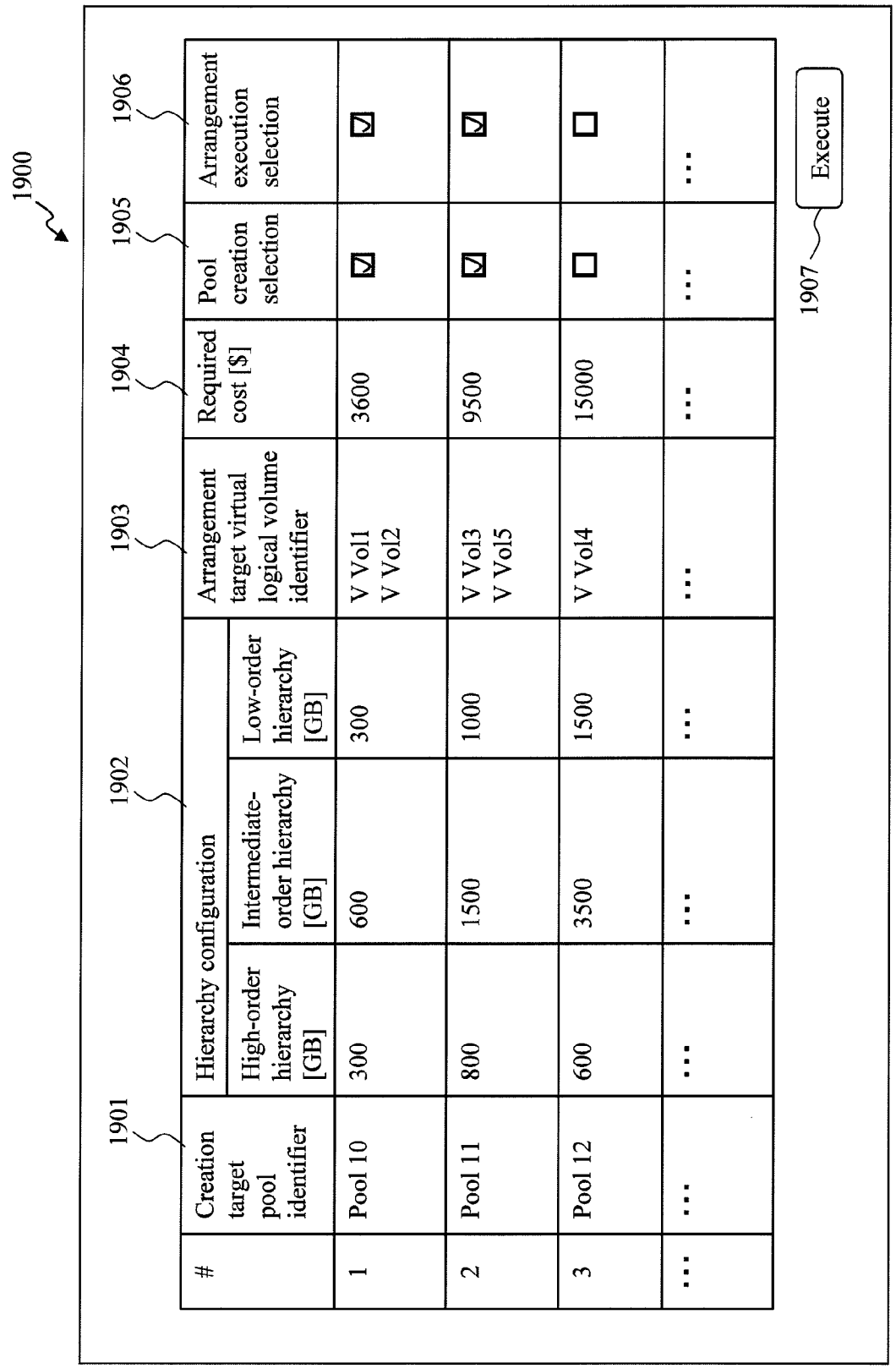
FIG. 19 is a diagram showing a configuration example of a GUI (Graphical User Interface) screen displayed on a display device of a storage managing client 301.

FIG. 19 is a diagram showing a GUI (Graphical User Interface) screen generated after the storage managing program 310 executes the shift target virtual logical volume classification processing 405, the pool hierarchy configuration calculation processing 406, and the pool hierarchy configuration cost calculation processing 410 and displayed on the display device of the storage managing client 301. The GUI screen is a configuration example of GUI screen 1900 which displays information for cost reduction.

Items shown in FIG. 19 are acquired by the storage managing program 310 executing the pool information display processing 411 with reference to the pool hierarchy configuration information 416, the pool hierarchy configuration cost information 419, and the shift target virtual logical volume group information 415.

As shown in FIG. 19, the GUI screen includes a region 1901 in which an identifier of a creation target pool is displayed, a region 1902 in which a hierarchy configuration of a storage device of a pool is displayed, a region 1903 in which identifiers of a virtual logical volume group arranged on the pool are displayed, a region 1904 in which required cost for pool creation is displayed, a selecting section 1905 for determining possibility of execution of pool creation, a selecting section 1906 for determining possibility of execution of arrangement of the virtual logical volume group on the pool, and an execution button 1907.

<Overview of Shift (Rearrangement) Processing for a Virtual Logical Volume>

Figure 20:
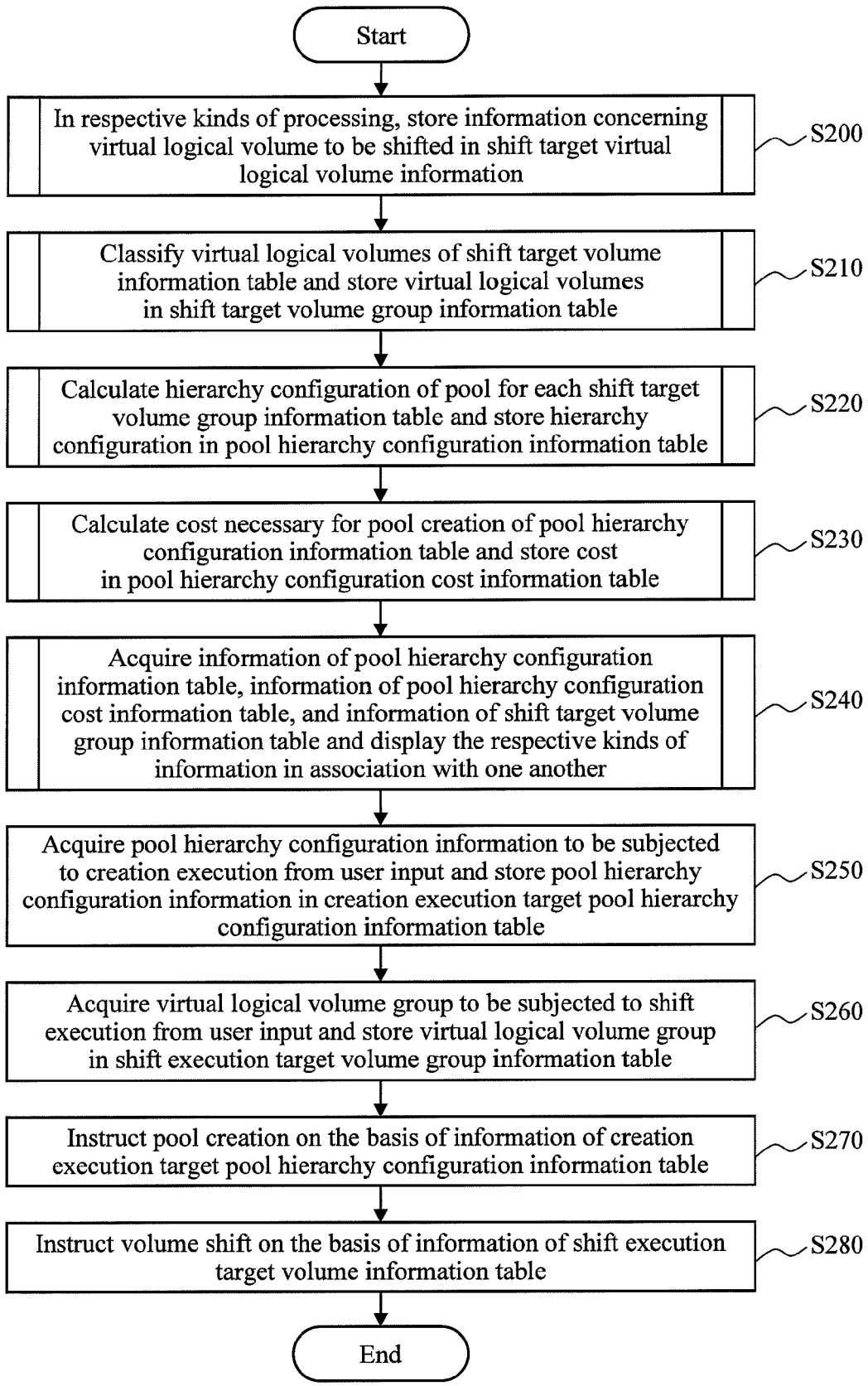
FIG. 20 is a flowchart for explaining an overview of shift (rearrangement) processing for virtual logical volume.

FIG. 20 is a flowchart for explaining an overview of shift (rearrangement) processing for a virtual logical volume.

In S200, the storage managing program 310 executes the agent information collection processing 401, the virtual logical volume performance deterioration detection processing 404, the volume addition and deletion detection processing 409, the target response performance configuration processing 407, and the shift target virtual logical volume selection processing 408 and registers virtual logical volumes to be shifted (subjected to rearrangement processing) in the shift target virtual logical volume information 414 (see FIG. 13). The virtual logical volumes to be shifted are all virtual logical volumes belonging to a pool in which a volume, performance deterioration of which is detected, an added or deleted volume, a selected volume, or a volume, target response performance of which is set is arranged. These virtual logical volumes are registered in the shift target virtual logical volume information 414. Details of the respective kinds of processing are explained later (see FIGS. 21 to 25).

In S210, the storage managing program 310 executes the shift target virtual logical volume classification processing 405 (FIG. 26) and determines a group of the virtual logical volumes to be shifted from the shift target virtual logical volume information 414. The storage managing program 310 registers grouped virtual logical volume groups to be shifted in the shift target virtual logical volume group information 415. The virtual logical volumes included in each of the determined groups are included in one pool. Details of the shift target virtual logical volume classification processing 405 are explained later (see FIG. 26).

In S220, the storage managing program 310 executes the pool hierarchy configuration calculation processing 406 to thereby calculate, for each of the shift target volume groups in the shift target virtual logical volume group information 415, a pool hierarchy configuration which satisfies requirements of all the virtual logical volumes. The calculated pool hierarchy configuration is registered in the pool hierarchy configuration information 416. Details of the pool hierarchy configuration calculation processing 406 are explained later (see FIGS. 27 to 29).

In S230, the storage managing program 310 executes the pool hierarchy configuration cost calculation processing 410 to thereby calculate cost necessary for creating the pools registered in the pool hierarchy configuration information 416 and registers the cost in the pool hierarchy configuration cost information 419. Details of the pool hierarchy configuration cost calculation processing 410 are explained later (see FIG. 30).

In S240, the storage managing program 310 acquires information from the pool hierarchy configuration information 416, the pool hierarchy configuration cost information 419, and the shift target virtual logical volume group information 415 and executes the pool information display processing 411 on the basis of the information to thereby generate data for GUI display. The generated GUI display data is provided to the storage managing client 301. Details of the pool information display processing 411 are explained later (see FIG. 31).

In S250, the storage managing program 310 waits for a user input and registers (stores) selected information in the creation execution target pool hierarchy configuration information 420 according to a user instruction (selection).

In S260, the storage managing program 310 waits for a user input and registers (stores) selected information in the shift execution target virtual logical volume group information 421 according to a user instruction (selection). In S250 and 260, creation of all pools and arrangement of all virtual logical volumes may be instructed. The system can automatically execute the creation and the arrangement without a user input.

In S270, the storage managing program 310 executes the pool creation control processing 402 on the basis of the creation execution target pool hierarchy configuration information 420 and instructs the pool creation executing program 315 of the storage device 312 to create a pool.

In S280, the storage managing program 310 executes the volume shift control processing 403 on the basis of information of the shift execution target volume group information 421 and instructs the virtual logical volume shift executing program 316 of the storage device 312 to shift a virtual logical volume.

The shift (rearrangement) processing for virtual logical volumes ends.

<Agent Information Collection Processing (Details of S200)>

Figure 21:
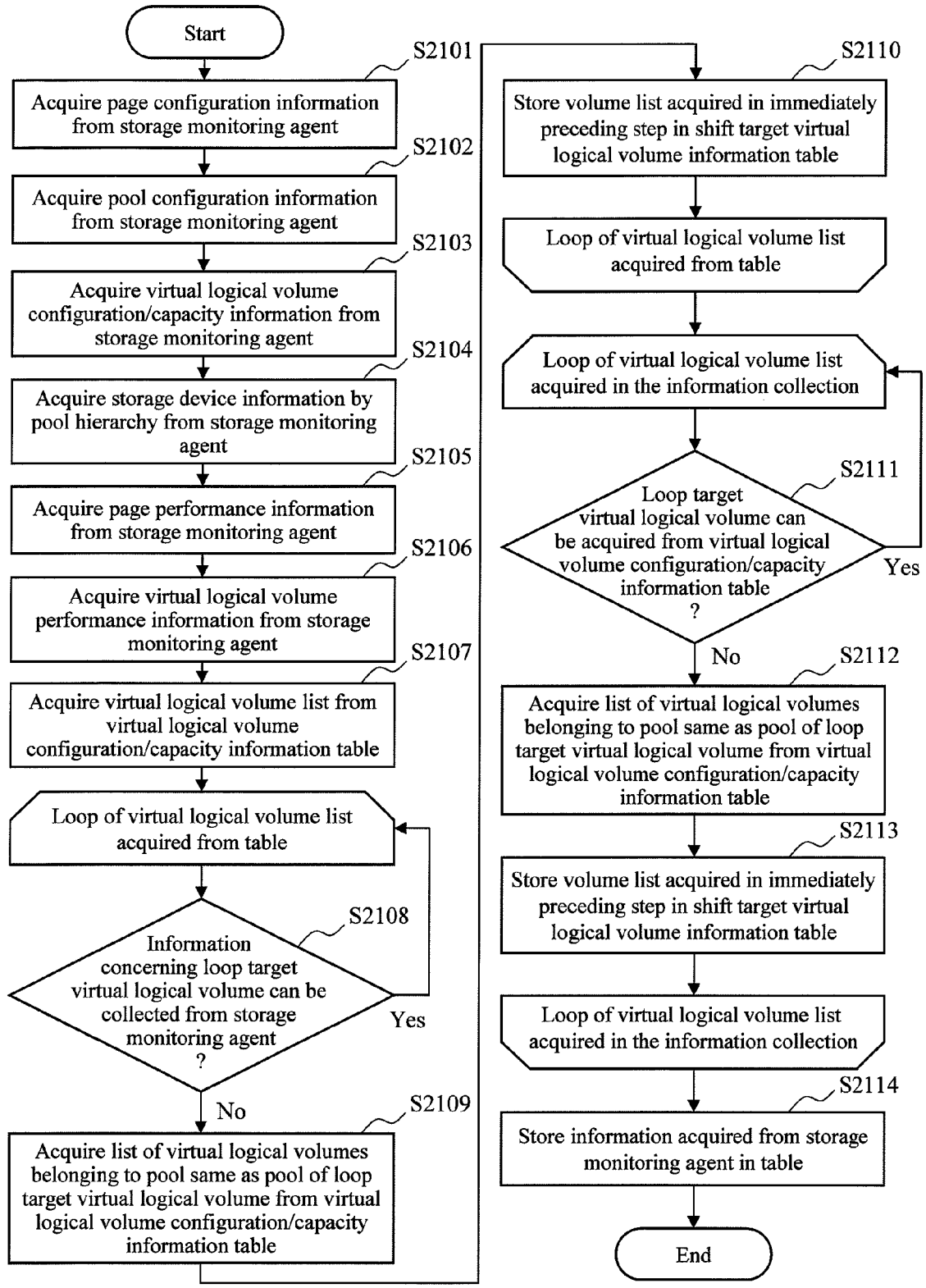
FIG. 21 is a flowchart for explaining details of agent information collection processing forming a part of S200.

FIG. 21 is a flowchart for explaining details of agent information collection processing forming a part of S200. The agent information collection processing is executed at predetermined timing (e.g., periodically) as explained above.

First, the storage managing program 310 sequentially acquires page configuration information, pool configuration information, virtual logical volume configuration/capacity information, storage device information by pool hierarchy, page performance information, and virtual logical volume performance information at a point when processing is started anew (S2101 to S2106). Order of processing in S2101 to S2106 is arbitrary.

In S2107, the storage managing program 310 acquires a virtual logical volume list from the virtual logical volume configuration/capacity information (table) 1000 originally included in the storage managing program 310.

Subsequently, the storage managing program 310 performs repetition processing (S2108 to S2110) concerning the virtual logical volume list acquired in S2107.

In S2108, the storage managing program 310 determines whether one virtual logical volume (a virtual logical volume to be subjected to pool processing) included in the list of virtual logical volumes (the table 1000) acquired in S2107 is included in the information acquired in S2103, i.e., whether the virtual logical volume is present in virtual logical volumes (a group) included in the virtual logical volume configuration/capacity information acquired this time from the storage monitoring agent 309. When the virtual logical volume is included in the information acquired in S2103 (Yes in S2108), the storage managing program 310 changes the virtual logical volume to be subjected to the repetition processing and continues the processing. When the virtual logical volume is not included in the information acquired in S2103 (No in S2108), the processing shifts to S2109. When the virtual logical volume is not included in the information acquired in S2103, it is seen that the virtual logical volume is deleted.

In S2109, the storage managing program 310 acquires, from the virtual logical volume configuration/capacity information (table) 1000, a list of virtual logical volumes belonging to a pool same as a pool of the virtual logical volume to be subjected to the repetition processing.

In S2210, the storage managing program 310 stores the virtual logical volumes in the shift target virtual logical volume information 414. When a virtual logical volume to be stored is already stored in the shift target virtual logical volume information 414, the storage managing program 310 does not store identifier information of the virtual logical volume (does not redundantly store the information).

When the processing up to S2110 ends concerning the target virtual logical volume, the storage managing program 310 changes the target of the repetition processing and continues the repetition processing concerning the virtual logical volume list. If the processing in S2108 to S2110 ends concerning all the virtual logical volumes included in the virtual logical volume list, the repetition processing ends.

The storage managing program 310 repeatedly executes processing in S2111 to S2113 concerning the virtual logical volume list acquired from the storage monitoring agent 309 in S2103.

In S2111, the storage managing program 310 determines whether one virtual logical volume (a processing target) included in the virtual logical volume configuration/capacity information (the virtual logical volume list) acquired in S2103 is already present in the virtual logical volume configuration/capacity information (table) 1000. When the virtual logical volume is already present in the table (Yes in S2111), the storage managing program 310 changes the target of the repetition processing and continues the repetition processing concerning the virtual logical volume list. When the virtual logical volume is not present in the table (No in S2111), the processing shifts to S2112. When the virtual logical volume is not present in the table, it is seen that the virtual logical volume is added.

In S2112, the storage managing program 310 acquires, from the virtual logical volume configuration/capacity information (table) 1000, a list of virtual logical volumes belonging to a pool same as a pool of the virtual logical volume to be subjected to the repetition processing.

In S2113, the storage managing program 310 stores the virtual logical volume included in the list acquired in S2112 in the shift target virtual logical volume information (table) 414. When information concerning a virtual logical volume to be stored is already stored in the shift target virtual logical volume information (table) 414, the storage managing program 310 does not store the information (does not redundantly store the information). The storage managing program 310 may store a virtual logical volume group other than the virtual logical volume group in the shift target virtual logical volume information (table) 414. In other words, when at least one virtual logical volume is added, virtual logical volumes included in plural or all pools may be subjected to the rearrangement processing.

The storage managing program 310 changes the target of the repetition processing and continues the repetition processing concerning the virtual logical volume list. If the processing ends concerning all the virtual logical volumes to be subjected to the processing in S2111 to S2113, the repetition processing ends.

Further, in S2114, the storage managing program 310 stores the page configuration information acquired from the storage monitoring agent 309 in the page configuration information (table) 800, stores the pool configuration information in the pool configuration information (table) 900, stores the virtual logical volume configuration/capacity information in the virtual logical volume configuration/capacity information (table) 1000, stores the storage device information by pool hierarchy in the storage device information by pool hierarchy (table) 418, stores the page performance information in the page performance information (table) 600, and stores the virtual logical volume performance information in the virtual logical volume performance information (table) 700 and ends the agent information collection processing.

To further facilitate understanding, a specific example of the agent information collection processing is explained below. It is assumed that virtual logical volumes originally registered in the virtual logical volume configuration/capacity information (table) 1000 of the management server 305 are VVol1, VVol2, and VVol3 and virtual logical volumes included in the virtual logical volume configuration/capacity information acquired from the storage monitoring agent 309 during the execution of the agent information collection processing are VVol1, VVol2, and VVol4. In this case, since it is detected that VVol3 is deleted by the processing in S2108 to S2110, all virtual logical volumes included in a pool to which VVol3 belongs are stored in the shift target virtual logical volume information (table) 414. Since it is detected that VVol4 is added by the processing in S2111 to S2113, all virtual logical volumes included in a pool to which VVol4 belongs are stored in the shift target virtual logical volume information (table) 414. In this way, according to the agent information collection processing, a virtual logical volume added and/or deleted between the last processing and the present processing is detected and a pool to which the virtual logical volume belongs is set as the rearrangement processing for virtual logical volumes.

<Virtual Logical Volume Performance Deterioration Detection Processing>

Figure 22:
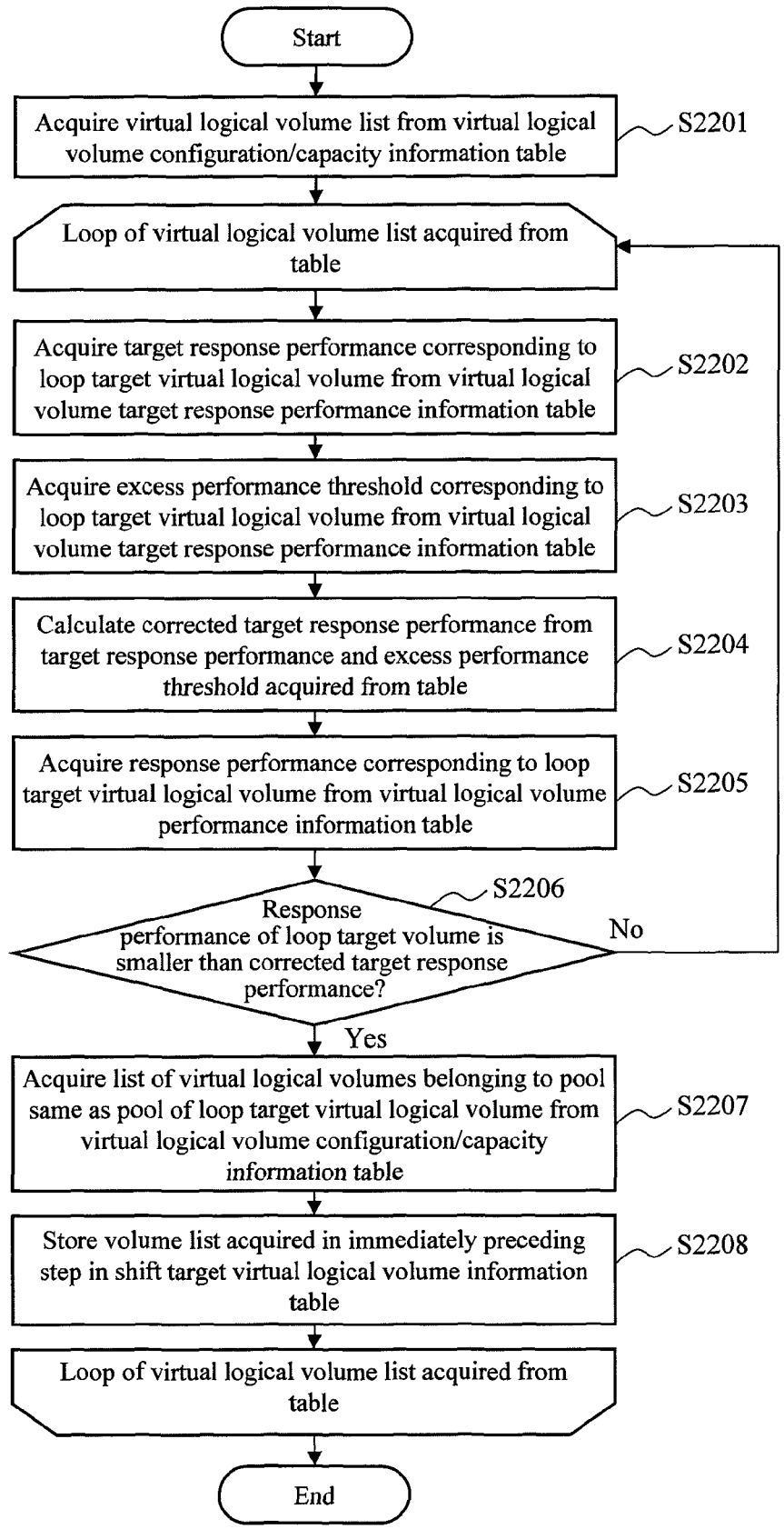
FIG. 22 is a flowchart for explaining details of virtual logical volume performance deterioration detection processing forming a part of S200.

FIG. 22 is a flowchart for explaining details of virtual logical volume performance deterioration detection processing forming a part of S200. The virtual logical volume performance deterioration detection processing is periodically started according to scheduling configuration, started after the virtual logical volume target response performance configuration processing, started after the agent information collection processing, or started according to a request from the storage managing client triggered by instruction operation of the user.

First, in S2201, the storage managing program 310 acquires a list of virtual logical volumes from the virtual logical volume configuration/capacity information (table) 1000 as the processing target. Concerning the virtual logical volumes included in this list, processing in S2202 to S2208 is repeatedly executed.

In S2202, the storage managing program 310 acquires, from the virtual logical volume target response performance information (table) 417, information concerning target response performance corresponding to the virtual logical volume to be subjected to the repetition processing. When the target response performance cannot be acquired (the target response performance is not set), the target response performance can be regarded as the same as basic response performance of a storage device in a lowest-order hierarchy included in a pool or a value slower than the basic response performance.

In S2203, the storage managing program 310 acquires, from the virtual logical volume target response performance information (table) 417, an excess performance threshold corresponding to the virtual logical volume to be subjected to the repetition processing. When the excess performance threshold cannot be acquired (the excess performance threshold is not set), the excess performance threshold can be regarded as 0.

In S2204, the storage managing program 310 calculates corrected target response performance from the acquired target response performance and the acquired excess performance threshold. The storage managing program 310 calculates the corrected target response performance as explained below. This step can be omitted. When the step is omitted, a value of the target response performance is used instead of corrected target response performance after that.

Corrected target response performance=target response performance×(100−excess performance threshold)÷100

In S2205, the storage managing program 310 acquires, from the virtual logical volume performance information (table) 700, a value (a measured value) of response performance corresponding to the virtual logical volume to be subjected to the repetition processing.

In S2206, the storage managing program 310 compares, concerning the virtual logical volume to be subjected to the repetition processing, the corrected target response performance calculated in S2204 and the response performance (the measured value). When the actual response performance is worse (slower) than the corrected target response performance (Yes in S2206), the processing shifts to S2207, When the actual response performance is better (faster) than the corrected target response performance (No in S2206), the storage managing program 310 changes the virtual logical volume to be subjected to repetition processing and shifts the processing to S2202.

In S2207, the storage managing program 310 acquires, from the virtual logical volume configuration/capacity information (table) 1000, virtual logical volumes (a group) belonging to a pool same as a pool of the virtual logical volume to be subjected to the repetition processing determined as deteriorated in performance.

In S2208, the storage managing program 310 stores the virtual logical volumes in the shift target virtual logical volume information (table) 414. When information concerning a virtual logical volume to be stored is already stored in the shift target virtual logical volume information (table) 414, the storage managing program 310 does not store the information (does not redundantly store the information). The storage managing program 310 may store a virtual logical volume group other than the virtual logical volume group in the shift target virtual logical volume information (table) 414. In other words, when at least one virtual logical volume is added, virtual logical volumes included in plural or all pools may be subjected to the rearrangement processing.

The storage managing program 310 changes the target of the repetition processing and continues the repetition processing concerning the virtual logical volume list. If the processing ends concerning all the virtual logical volumes to be subjected to the processing in S2202 to S2208, the virtual logical volume performance deterioration processing ends.

<Virtual Logical Volume Addition and Deletion Detection Processing>

Figure 23:
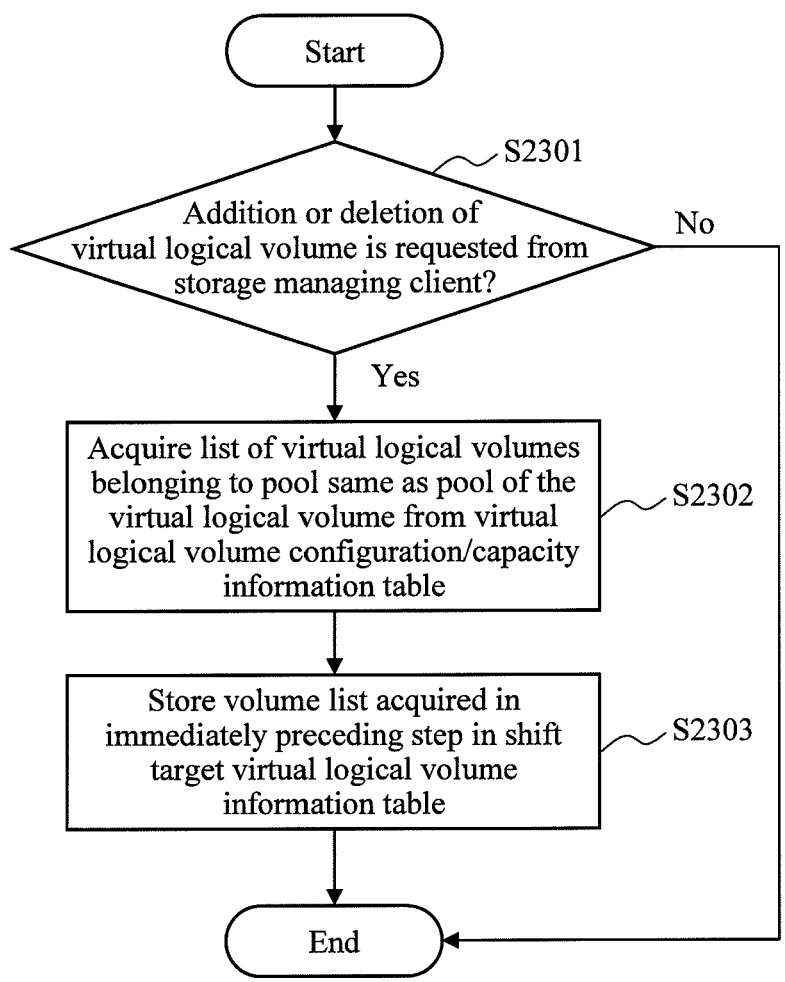
FIG. 23 is a flowchart for explaining details of virtual logical volume addition and deletion detection processing forming a part of S200.

FIG. 23 is a flowchart for explaining details of virtual logical volume addition and deletion detection processing forming a part of S200. The processing is started according to a request from the storage managing client 301 triggered by instruction operation of the user.

First, in S2301, the storage managing program 310 monitors whether a request for adding or deleting a virtual logical volume is received from the storage managing client 301.

When a request for adding or deleting a virtual logical volume is detected (Yes in S2301), in S2302, the storage managing program 310 acquires, from the virtual logical volume configuration/capacity information (table) 1000, all virtual logical volumes belonging to a pool same as a pool of the virtual logical volume instructed to be added or deleted.

In S2303, the storage managing program 310 stores the virtual logical volume group acquired in S2302 in the shift target virtual logical volume information (table) 414 and ends the virtual logical volume addition and deletion detection processing. When information concerning a virtual logical volume to be stored is already stored in the shift target virtual logical volume information (table) 414, the storage managing program 310 does not store the information (does not redundantly store the information). The storage managing program 310 may store a virtual logical volume group other than the virtual logical volume group in the shift target virtual logical volume information table. In other words, when at least one virtual logical volume is added, virtual logical volumes included in plural or all pools may be subjected to the rearrangement processing.

<Target Response Performance Configuration Processing>

Figure 24:
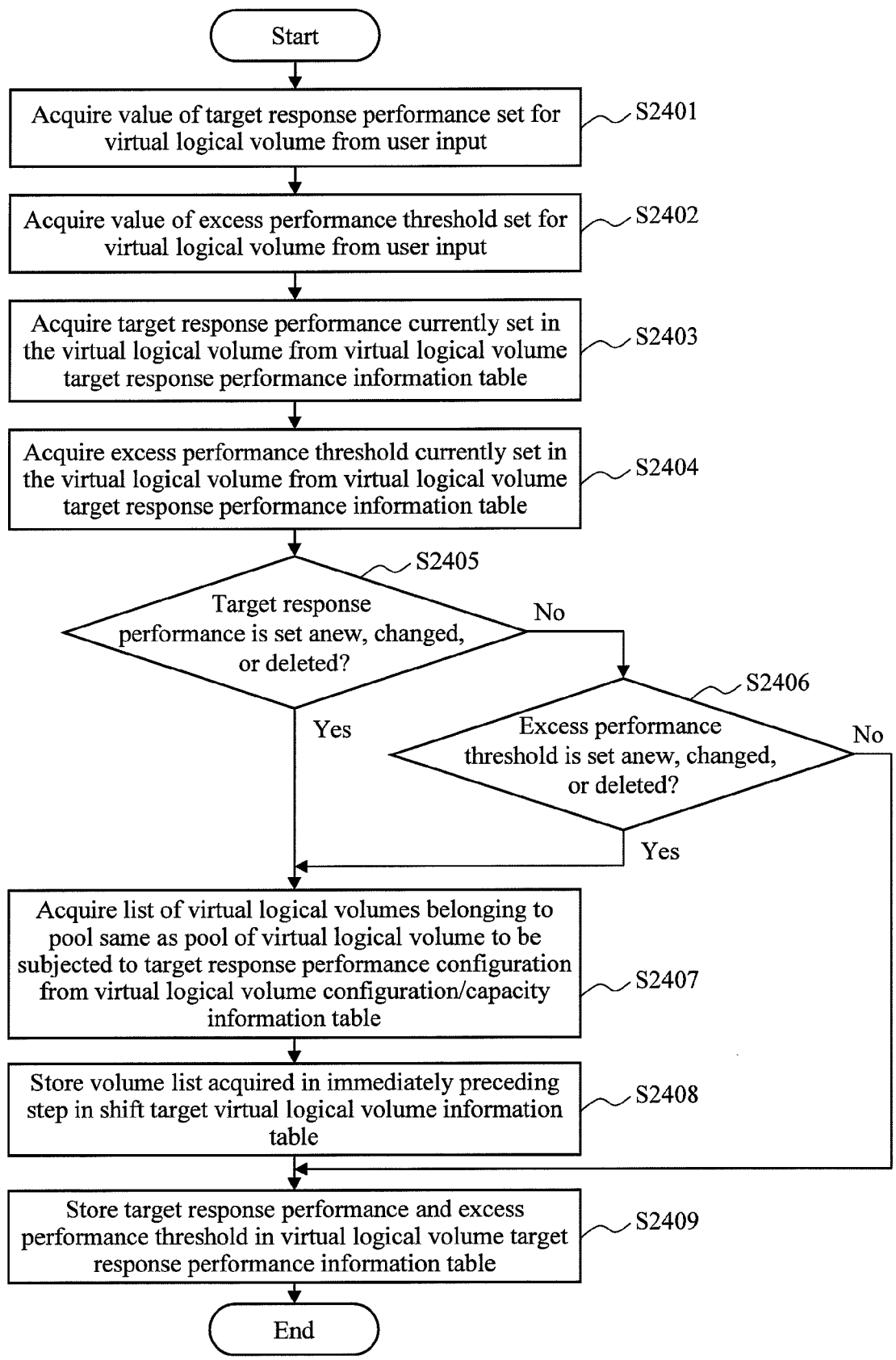
FIG. 24 is a flowchart for explaining details of target response performance configuration processing forming a part of S200.

FIG. 24 is a flowchart for explaining details of target response performance configuration processing forming a part of S200. The processing is started according to a request from the storage managing client 301 triggered by instruction operation of the user.

First, the storage managing program 310 acquires, from a user input, target response performance and an excess performance threshold set for a virtual logical volume (S2401 and S2402). Concerning the excess performance threshold, the storage managing program 310 does not always have to acquire the excess performance threshold from a user input and may use a constant defined in the system.

The storage managing program 310 acquires, from the virtual logical volume target response performance (table) 417, target response performance and an excess performance threshold corresponding to the virtual logical volume (S2403 and S2404).

Subsequently, the storage managing program 310 compares the target response performance and the excess performance threshold acquired from the user input and the target response performance and the excess performance threshold acquired from the virtual logical volume target response performance table and determines whether target response performance or an excess performance threshold is set anew, changed, or deleted (no user input value) (S2405 and S2406). When new configuration, change, or deletion of target response performance or an excess performance threshold is detected (Yes in S2405 or S2406), the processing shifts to S2407. When new configuration, change, or deletion of target response performance or an excess performance threshold is not detected (No in S2405 and S2406), the processing shifts to S2409.

In S2407, the storage managing program 310 acquires, from the virtual logical volume configuration/capacity information (table) 1000, identification information of all virtual logical volumes included in a pool to which a virtual logical volume to be subjected to target response performance configuration belongs.

In S2408, the storage managing program 310 stores (registers) the identification information of the virtual logical volume group acquired in S2407 in the shift target virtual logical volume information (table) 414. When information concerning a virtual logical volume to be stored is already stored in the shift target virtual logical volume information (table) 414, the storage managing program 310 does not store the information (does not redundantly store the information). The storage managing program 310 may store a virtual logical volume group other than the virtual logical volume group in the shift target virtual logical volume information table.

Finally, in S2409, the storage managing program 310 stores the target response performance and the excess performance threshold acquired from the user input in the virtual logical volume target response performance information (table) 417 and ends the processing.

<Shift Target Virtual Logical Volume Selection Processing>

Figure 25:
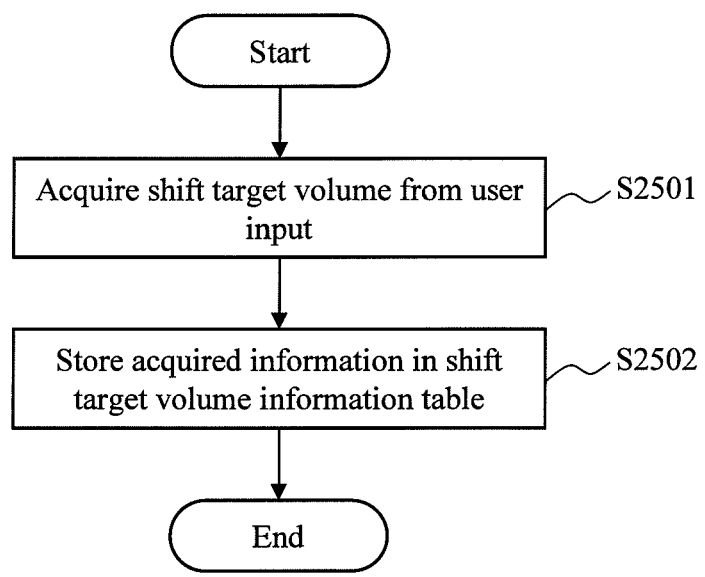
FIG. 25 is a flowchart for explaining details of shift target virtual logical volume selection processing forming a part of S200.

FIG. 25 is a flowchart for explaining details of shift target virtual logical volume selection processing forming a part of S200. The processing is started according to a request from the storage managing client 301 triggered by instruction operation of the user.

In S2501, the storage managing program 310 acquires, from a user input, identification information of a virtual logical volume to be shifted.

In S2502, the storage managing program 310 stores the virtual logical volume acquired in S2501 in the shift target virtual logical volume information (table) 414 and ends the processing. When information concerning a virtual logical volume to be stored is already stored in the shift target virtual logical volume information table, the storage managing program 310 does not store the information (does not redundantly store the information).

When a virtual logical volume is selected as a shift target, the storage managing program 310 applies grouping (classification) processing (the shift target virtual logical volume classification processing 405) only to the selected virtual logical volume and configures a pool anew. A virtual logical volume is deleted from a pool, to which the selected virtual logical volume originally belongs, by the selection processing. Therefore, rearrangement processing for virtual logical volumes (grouping virtual logical volumes and arranging the virtual logical volumes in a new pool) is performed even in the pool at the deletion source.

The rearrangement processing is executed only in the selected virtual logical volume. However, all virtual logical volumes included in a pool to which the selected virtual logical volume belongs may be subjected to the rearrangement processing.

<Shift Target Virtual Logical Volume Classification Processing>

Figure 26:
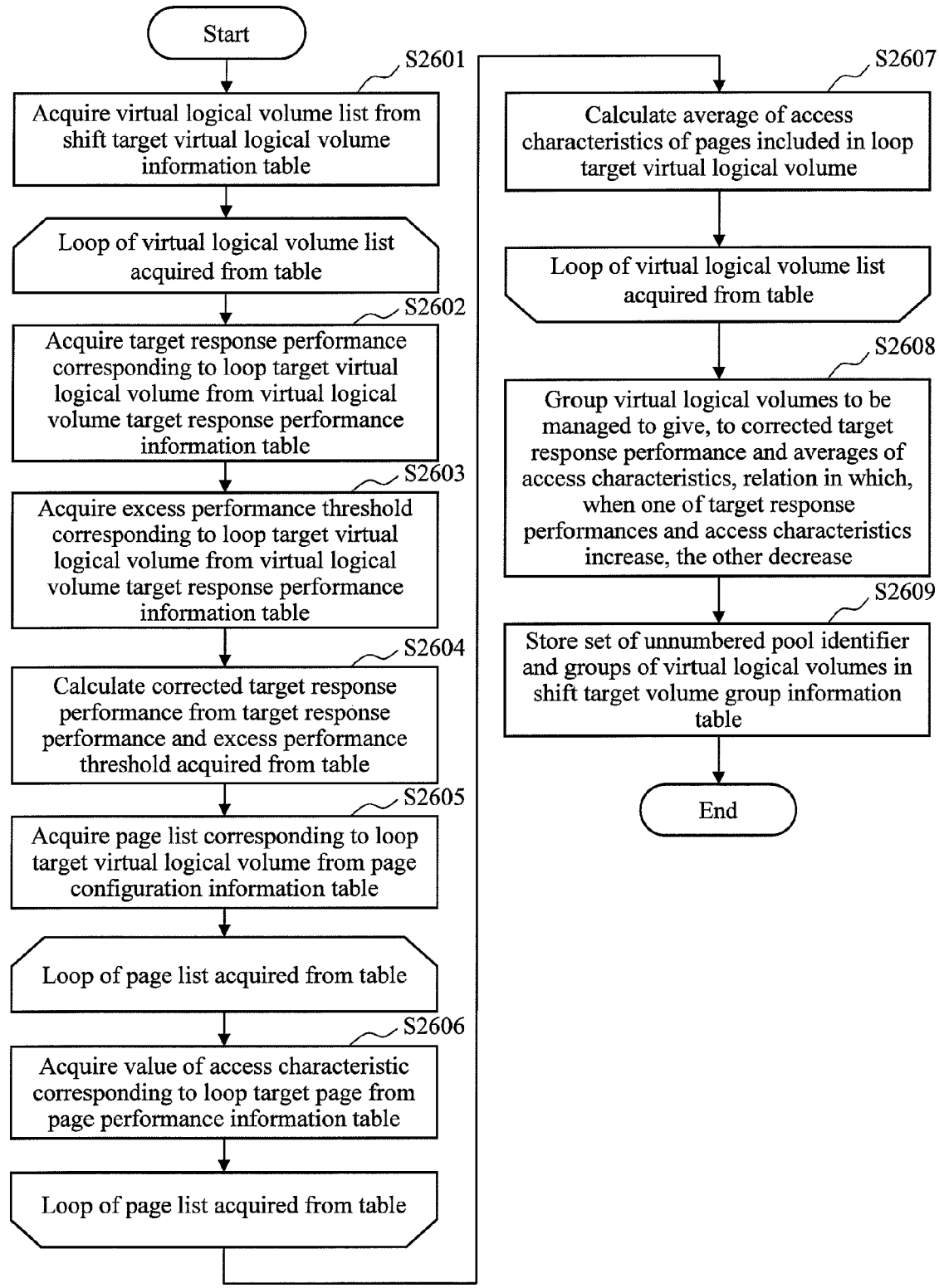
FIG. 26 is a flowchart for explaining details of shift target virtual logical volume classification processing 405 (S210 in FIG. 20).

FIG. 26 is a flowchart for explaining details of the shift target virtual logical volume classification processing 405 (S210 in FIG. 20). The processing is periodically started according to scheduling configuration, started after the agent information collection processing 401 (FIG. 21), the virtual logical volume performance deterioration detection processing 404 (FIG. 22), the virtual logical volume addition and deletion detection processing 409 (FIG. 23), the target response performance configuration processing 407 (FIG. 24), or the shift target virtual logical volume selection processing 408 (FIG. 25), or started according to a request from the storage managing client 301 triggered by instruction operation of the user.

First, in S2601, the storage managing program 310 acquires, from the shift target virtual logical volume information (table) 414, information concerning a list of virtual logical volumes to be subjected to the classification processing. The storage managing program 310 repeatedly execute the processing in S2602 to S2607 concerning the acquired virtual logical volume.

In S2602, the storage managing program 310 acquires, from the virtual logical volume target response performance information (table) 417, a value of target response performance corresponding to the virtual logical volume to be subjected to the repetition processing. When the target response performance cannot be acquired (the target response performance is not set), the target response performance can be regarded as the same as basic response performance of a storage device included in a lowest-order hierarchy included in a pool or a value slower than the basic response performance.

In S2603, the storage managing program 310 acquires, from the virtual logical volume target response performance information (table) 417, an excess performance threshold corresponding to the virtual logical volume to be subjected to the repetition processing. When the excess performance threshold cannot be acquired (the excess performance threshold is not set), the excess performance threshold can be regarded as 0.

In S2604, the storage managing program 310 calculates corrected target response performance from the target response performance and the excess performance threshold. The storage managing program 310 calculates the corrected target response performance as explained below. This step can be omitted. When the step is omitted, a value of the target response performance is used as corrected target response performance after that.

Corrected target response performance=target response performance×(100−excess performance threshold)÷100

In S2605, the storage managing program 310 acquires, from the page configuration information (table) 800, a list of pages allocated to the virtual logical volume to be subjected to the repetition processing. Processing in S2606 concerning the acquired page list is repeatedly executed.

In S2606, the storage managing program 310 acquires, from the page performance information (table) 600, an access characteristic corresponding to the pages to be subjected to the repetition processing. The storage managing program 310 changes the target of the repetition processing and continues the repetition processing concerning the page list. In S2606, access characteristics (IOPSs) are acquired concerning all pages included in the virtual logical volume to be processed.

In S2607, the storage managing program 310 calculates an average of the access characteristics to the pages included in the virtual logical volume to be subjected to the repetition processing.

When the repletion processing in S2602 to S2607 ends, the storage managing program 310 acquires, concerning all virtual logical volumes to be processed, averages of corrected or uncorrected target response performances and access characteristics.

In S2608, the storage managing program 310 groups the virtual logical volume group acquired from the shift target virtual logical volume (table) 414 to give, to the averages of the corrected target response performances and the access characteristics, a relation in which, when one of the target response performances and the access characteristics increase, the other decrease. More specifically, the grouping is performed as explained below. A concept is as explained with reference to FIGS. 1 and 2.

(i) The storage managing program 310 defines an xy plane (an access characteristic—target response performance plane) in which an x axis represents an average of the access characteristics and a y axis represents the corrected target response performance.

(ii) The storage managing program 310 defines and plots two-dimensional vectors $v_i$=(the average of the access characteristics, the corrected target response performance) of the virtual logical volumes (i=1 . . . n, n=the number of virtual logical volumes) on the access characteristic—target response performance plane.

(iii) The storage managing program 310 defines two-dimensional vector s=(a maximum of the averages of the access characteristics in all $v_i$, a fastest value of the corrected target response performances in all v) on the access characteristic—target response performance plane.

(iv) The storage managing program 310 selects a vector t having a Euclidian distance closest to s out of $v_i$. If there is no selectable vector, the storage managing program 310 ends the step (S2608).

(v) The storage managing program 310 selects a vector which satisfies the following conditions out of $v_i$.
  (a) An average of access characteristics is lower than t.
  (b) Corrected target response performance is slower than t.
  (c) An Euclidian distance to t is the closest among vectors which satisfy the conditions (a) and (b).

(vi) With t used in the processing (v) replaced with the vector selected in (v), the processing (v) is repeated until no selectable vector remains.

(vii) A set of vectors selected by the processing (iv) to (vi) is grouped.

(viii) The vectors grouped in the processing (vii) are excluded from $v_i$ defined in the processing (ii).

(ix) The processing (iv) to (viii) is repeated.

In S2609, the storage managing program 310 stores, in the shift target virtual logical volume group information (table) 415, a set of an unnumbered pool identifier and the groups of the virtual logical volumes specified in S2608 and ends the shift target virtual logical volume classification processing.

<Pool Hierarchy Configuration Calculation Processing>

Figure 27:
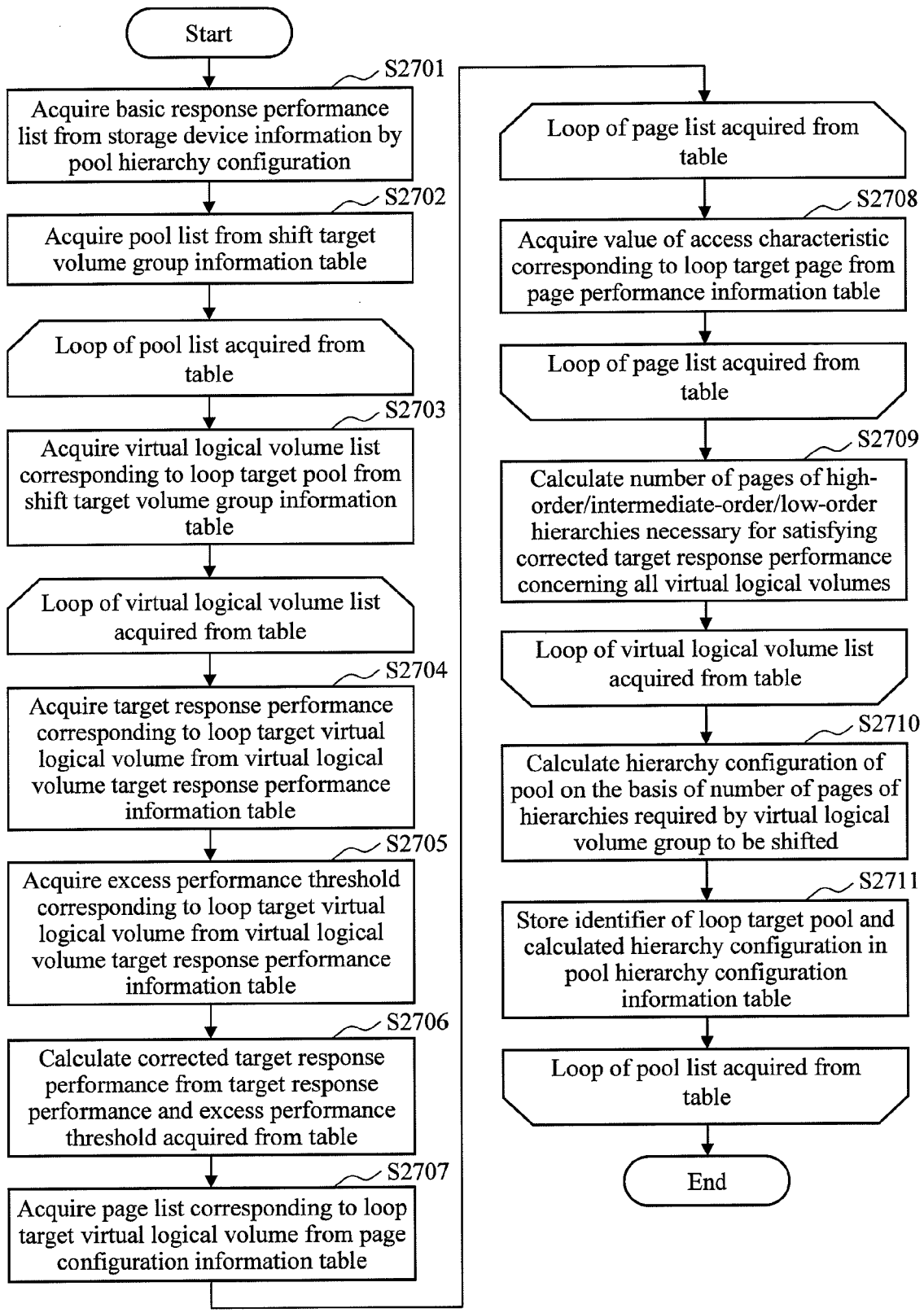
FIG. 27 is a flowchart for explaining details of pool hierarchy configuration calculation processing 406 (S220 in FIG. 20).

FIG. 27 is a flowchart for explaining details of the pool hierarchy configuration calculation processing 406 (S220 in FIG. 20). The processing is periodically started according to scheduling configuration, started after processing by a shift target volume classifying part, or started according to a request from the storage managing client triggered by instruction operation of the user.

First, in S2701, the storage managing program 310 acquires a basic response performance list of storage devices included in hierarchies from the storage device information by pool hierarchy configuration (table) 418.

In S2702, the storage managing program 310 acquires a pool list from the shift target virtual logical volume group information (table) 415. Processing in S2703 to S2711 concerning the acquired pool list is repeatedly executed.

In S2703, the storage managing program 310 acquires, from the shift target volume group information (table) 415, identifier information of all virtual logical volumes which should be arranged in the pools to be subjected to the repetition processing. Processing in S2704 to S2709 is repeatedly executed concerning the acquired virtual logical volumes.

In S2704, the storage managing program 310 acquires, from the virtual logical volume target response performance information (table) 417, target response performance corresponding to the virtual logical volume to be subjected to the repetition processing. When the target response performance cannot be acquired (the target response performance is not set), the target response performance can be regarded as the same as basic response performance of a storage device in a lowest-order hierarchy included in a pool or a value slower than the basic response performance.

In S2705, the storage managing program 310 acquires, from the virtual logical volume target response performance information (table) 417, an excess performance threshold corresponding to the virtual logical volume to be subjected to the repetition processing. When the excess performance threshold cannot be acquired (the excess performance threshold is not set), the excess performance threshold can be regarded as 0.

In S2706, the storage managing program 310 calculates corrected target response performance from the target response performance and the excess performance threshold acquired in S2704 and S2705. The storage managing program 310 calculates the corrected target response performance as explained below. This step can be omitted. When the step is omitted, a value itself of the target response performance is used instead of the corrected target response performance after that.

Corrected target response performance=target response performance×(100−excess performance threshold)÷100

In S2707, the storage managing program 310 acquires, from the page configuration information (table) 800, a list of pages allocated to the virtual logical volume to be subjected to the repetition processing. Processing in S2708 is repeatedly executed concerning the acquired page list.

In S2708, the storage managing program 310 acquires, from the page performance information (table) 600, an access characteristic corresponding to the pages to be subjected to the repetition processing. Since the processing in S2708 is repeatedly executed, access characteristics are acquired concerning all pages included in the virtual logical volume to be processed.

In S2709, the storage managing program 310 calculates, concerning each of all the virtual logical volumes included in the pool to be subjected to the repetition processing, the numbers of pages of storage devices in high-order, intermediate-order, and low-order hierarchies necessary for satisfying the corrected target response performance. The storage managing program 310 calculates the numbers of pages by calculating parameters ($C_1$, $C_2$, $C_3$) which satisfy the following expressions. Since plural parameters which satisfy the following expressions F1 to F3 are present, after calculating the numbers of pages concerning all combinations of the parameters, the storage managing program 310 selects the parameter with lowest cost. To further facilitate understanding, a specific example of the calculation of the parameters ($C_1$, $C_2$, $C_3$) is explained later (see FIG. 28).

[Expression 1]

$$\frac{C_1 \times T_1 + C_2 \times T_2 + C_3 \times T_3}{N \times C_p} \leq S \quad \text{(Expression F1)}$$

$$C_1 + C_2 \leq N \times C_p \quad \text{(Expression F2)}$$

$$C_3 = N \times C_p - (C_1 + C_2) \quad \text{(Expression F3)}$$

The respective parameters have meanings explained below.

S=Corrected target response performance [msec] of the virtual logical volume: Acquired in S2706

$T_1$=Basic response performance [msec] of a high-order hierarchy: Acquired in S2701

$T_2$=Basic response performance [msec] of an intermediate-order hierarchy: Acquired in S2701

$T_3$=Basic response performance [msec] of a low-order hierarchy: Acquired in S2701

N=Total number of pages include in the virtual logical volume: Acquired in S2707

$C_P$=Capacity [GB] per one page: known (set value)

$C_1$=Capacity [GB] of a storage device in the high-order hierarchy necessary for the virtual logical volume to satisfy the corrected target response performance: calculation target $C_2$=Capacity [GB] of a storage device in the intermediate-order hierarchy necessary for the virtual logical volume to satisfy the corrected target response performance: calculation target $C_3$=Capacity [GB] of a storage device in the low-order hierarchy necessary for the virtual logical volume to satisfy the corrected target response performance: calculation target The storage managing program 310 changes the target of the repetition processing and repeatedly executes the processing in S2704 to S2709. If ($C_1$, $C_2$, $C_3$) is calculated concerning all the virtual logical volumes included in the pool to be processed, the processing shifts to S2710.

In S2710, the storage managing program 310 calculates a hierarchy configuration of the pool on the basis of the numbers of pages of the storage devices in the hierarchies required by a virtual logical volume group to be shifted. The storage managing program 310 performs the calculation of the hierarchy configuration of the pool as explained below. To further facilitate understanding, a specific example of the calculation of the pool hierarchy configuration is explained later (see FIG. 29).

(i) The storage managing program 310 creates a list in which a page group included in the shift target virtual logical volume group is sorted in order from the page having a highest access characteristic.

(ii) The storage managing program 310 calculates, in the high-order hierarchy, for each of the virtual logical volumes to be shifted, in which order counted from the top of the sorted page list a page having a lowest access characteristic required by the virtual logical volume is located.

(iii) The storage managing program 310 calculates, in the intermediate-order hierarchy, for each of the virtual logical volumes to be shifted, in which order counted from the top of the sorted page list a page having a lowest access characteristic required by the virtual logical volume is located.

(iv) The storage managing program 310 calculates a capacity of the storage device in the high-order hierarchy necessary for allocating the page in the high-order hierarchy to a page located in the lowest order (a page having a lowest access characteristic) among the pages calculated in (ii).

(v) After allocating the capacity of the storage device in the high-order hierarchy calculated in the processing (iv) to the pool, the storage managing program 310 calculates a capacity of the storage device in the intermediate-order hierarchy necessary for allocating the page in the intermediate-order hierarchy to a page located in the lowest order (a page having a lowest access characteristic) among the pages calculated in (iii).

(vi) The storage managing program 310 calculates, as a capacity of the storage device in the low-order hierarchy, a capacity obtained by subtracting the capacity of the storage device in the high-order hierarchy calculated in the processing (iv) and the capacity of the storage device in the intermediate-order hierarchy calculated in the processing (v) from the total capacity of the shift target virtual logical volumes.

In S2711, the storage managing program 310 stores, in the pool hierarchy configuration information (table) 900, a set of an identifier of the pool to be subjected to the repetition processing and the calculated hierarchy configuration of the pool. The storage managing program 310 changes the pool to be subjected to the repetition processing and repeatedly executes the processing in S2703 to S2711 concerning a new pool. If the processing ends concerning all target pools, the pool hierarchy configuration calculation processing 406 ends.

<Specific Example of the Calculation of the Parameters ($C_1, C_2, C_3$)>

FIG. 28 is a diagram for explaining a specific example of the number of pages calculation processing (S2709) for the hierarchies necessary for the virtual logical volume to satisfy the target response performance.

As explained above, if the parameters ($C_1, C_2, C_3$) are calculated, the numbers of pages corresponding to $C_1, C_2,$ and $C_3$ are calculated by dividing the parameters by the capacity Cp per one page.

Parameters 2801 are assumed to be S=4 (msec), $T_1=1$ (msec), $T_2=5$ (msec), $T_3=10$ (msec), N=250, $C_P=0.04$ (GB).

When the specific parameter values are substituted in the expressions (see Expressions (1) to (3) in FIG. 28) to transform the expressions,

[Expression 2]

$$C_2 \geq -\frac{9}{5}C_1 + 12 \quad \text{(Expression (1)')}$$

$$C_2 \leq 10 - C_1 \quad \text{(Expression (2)')}$$

are obtained.

Therefore, a parameter with the lowest cost among plural parameters (a range indicated by a region 2803 of a graph 2802 of FIG. 28) which satisfy Expressions (1)' and (2)' is selected. Cost is calculated by multiplication of capacity unit prices of the storage device information by pool hierarchy (table) 418 corresponding to ($C_1, C_2, C_3$).

<Specific Example of Calculation of a Pool Hierarchy Configuration>

Figure 29:
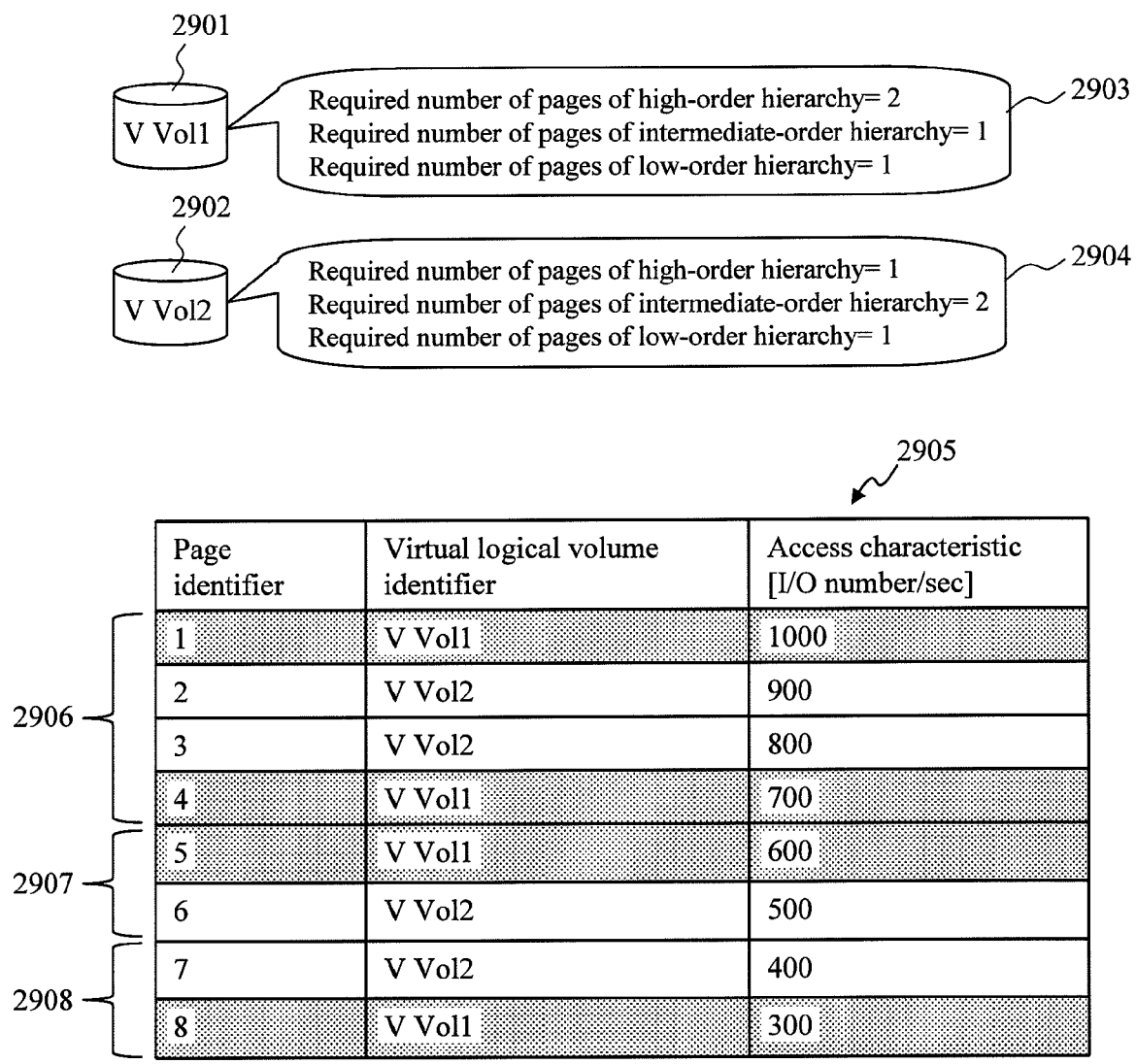
FIG. 29 is a diagram for explaining a specific example of calculation processing for a pool hierarchy configuration which satisfies target response performances of all virtual logical volumes (S2710).

FIG. 29 is a diagram for explaining a specific example of the calculation processing (S2710) for a pool hierarchy configuration which satisfies the target response performances of all the virtual logical volumes. Concerning the processing (i) to (vi) of the pool hierarchy configuration calculation processing (S2710), an example in which shift target virtual logical volumes VVol1_2901 to VVol2_2902 are processed is shown.

Concerning VVol1_2901 and VVol2_2902, required number of pages of the hierarchies are calculated by dividing the parameters ($C_1, C_2, C_3$) calculated in S2709 by the capacity Cp per one page. It is assumed that the numbers of pages of the hierarchies required for VVol1_2901 and VVol2_2902 are calculated as necessary numbers of pages 2903 and 2904.

Processing (i)

With reference to the page configuration information (table) 800 and the page performance information (table) 600, a list table 2905 in which the pages included in the virtual logical volumes are sorted in order from one having the highest access characteristic (IOPS) is generated.

Processing (ii)

Determining from the necessary number of pages 2903 and 2904, pages in the high-order hierarchy required by VVol1_2901 are pages 1 and 4 and a page in the high-order hierarchy required by VVol2_2902 is only a page 2. Therefore, it is seen that, according to the processing (ii), the page 4 is selected concerning VVol1_2901, the page 2 is selected concerning VVol2_2902, and the pages 4 and 2 are respectively located in the fourth and the second among the sorted pages.

A storage region only has to be allocated to the page 3 of VVol2 from the intermediate-order hierarchy. However, an access characteristic of the page 3 is higher than that of the page 4 of VVol1 (a page to which a storage region needs to be allocated from the high-order hierarchy). Therefore, if capacities of the hierarchies necessary in the pool are calculated using only the capacities ($C_1, C_2, C_3$) of the hierarchies calculated in S2709, the target response performance cannot be guaranteed. In other words, since the number of pages to which storage regions are originally allocated from the high-order hierarchy is three (two pages in VVol1 and one page in VVol2), a storage region is allocated from the intermediate-order hierarchy to the page 4 to which a storage region originally should be allocated from the high order hierarchy.

Therefore, it is seen that storage regions for four pages have to be secured from the high-order hierarchy.

Processing (iii)

Originally, it is necessary to allocate storage regions for two pages to VVol2_2902 from the intermediate-order hierarchy. However, according to the processing (ii), a storage region is allocated to the page 3 from the high-order hierarchy. Therefore, it is sufficient to allocate storage regions for two pages from the intermediate-order hierarchy.

Therefore, a page in the intermediate-order hierarchy required by VVol1_2901 is a page 5 and a page in the intermediate-order hierarchy required by VVol2_2902 is only a page 6. It is seen that, according to processing (iii), the page 5 is selected concerning VVol1_2901 and the page 6 is selected concerning VVol2_2902 and the pages 5 and 6 are respectively located in the fifth and the sixth among the sorted pages.

Processing (iv)

Among the pages calculated by the processing (ii), a page located in the lowest order of pages which should be allocated to the high-order hierarchy is the page 4 (the page allocated to VVol1). Therefore, allocation of a storage region from the high-order hierarchy has to be guaranteed for this page as well.

Therefore, in order to surely allocate a storage region in the high-order hierarchy up to the page 4, a required storage capacity allocated from the storage device in the high-order hierarchy is calculated by increasing the number of pages allocated from the high-order hierarchy. In the example shown in FIG. 29, a necessary capacity of the high-order hierarchy is the capacity $C_P$ per one page×4 pages. This is different from the initially-calculated total value of the capacity $C_1$ in the high-order hierarchy of the virtual logical volumes. However, the target response performance can be guaranteed by this processing.

According to the processing (ii) and (iii), pages included in the range 2906 are pages calculated as a capacity of the storage device in the high-order hierarchy. Pages included in the range 2907 are pages calculated as a capacity of the storage device in the intermediate-order hierarchy. Further, pages included in the range 2908 are pages calculated as a capacity of the storage device in the low-order hierarchy.

Processing (v)

Among the pages calculated by the processing (iii), a page in the lowest order is a page 6. In the example shown in FIG. 29, since a storage region allocated from the intermediate-order hierarchy is present for two pages, a necessary capacity of the intermediate-order hierarchy is the capacity $C_P$ per one page×2 pages.

Processing (vi)

A capacity of the storage device in the low-order hierarchy is calculated by subtracting the capacities of the storage devices in the high-order hierarchy and the intermediate-order hierarchy calculated in the processing (iv) and (v) from a total capacity required in VVol1_2901 and VVol2_2902.

<Pool Hierarchy Configuration Cost Calculation Processing>

Figure 30:
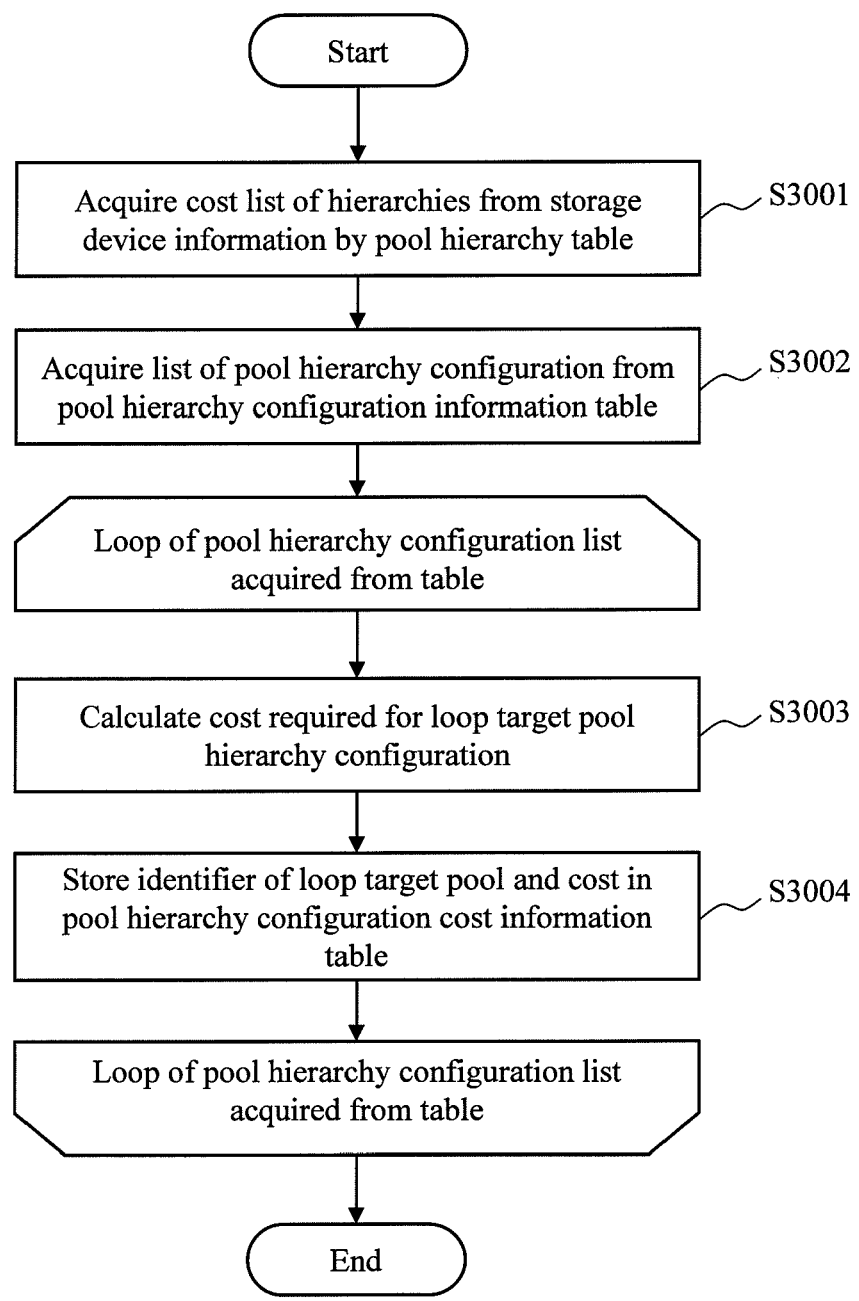
FIG. 30 is a flowchart for explaining details of pool hierarchy configuration cost calculation processing 410 (S230 in FIG. 20).

FIG. 30 is a flowchart for explaining details of the pool hierarchy configuration cost calculation processing 410 (S230 in FIG. 20). The processing is periodically started according to scheduling configuration, started after the pool hierarchy configuration calculation processing 406, or started according to a request from the storage managing client 301 triggered by instruction operation of the user.

First, in S3001, the storage managing program 310 acquires, from the storage device information by pool hierarchy configuration (table) 418, a list of cost information of the storage devices included in the hierarchies.

In S3002, the storage managing program 310 acquires a list of pool hierarchy configurations from the pool hierarchy configuration information (table) 416 obtained by the pool hierarchy configuration calculation processing 406. Processing in S3003 and S3004 is repeatedly executed concerning the respective pool hierarchy configurations included in the acquired pool hierarchy configuration list.

In S3003, the storage managing program 310 calculates, on the basis of the cost list of the hierarchies acquired in S3001, cost required for a pool hierarchy configuration for which cost is calculated.

In S3004, the storage managing program 310 stores, in the pool hierarchy configuration cost information (table) 419, a set of an identifier of the pool to be subjected to the cost calculation processing and the calculated cost.

The storage managing program 310 changes the target of the repetition processing and continues the repetition processing concerning the pool hierarchy configuration list. If the cost calculation ends concerning all targets, the pool hierarchy configuration cost calculation processing 410 ends.

<Pool Information Display Processing>

Figure 31:
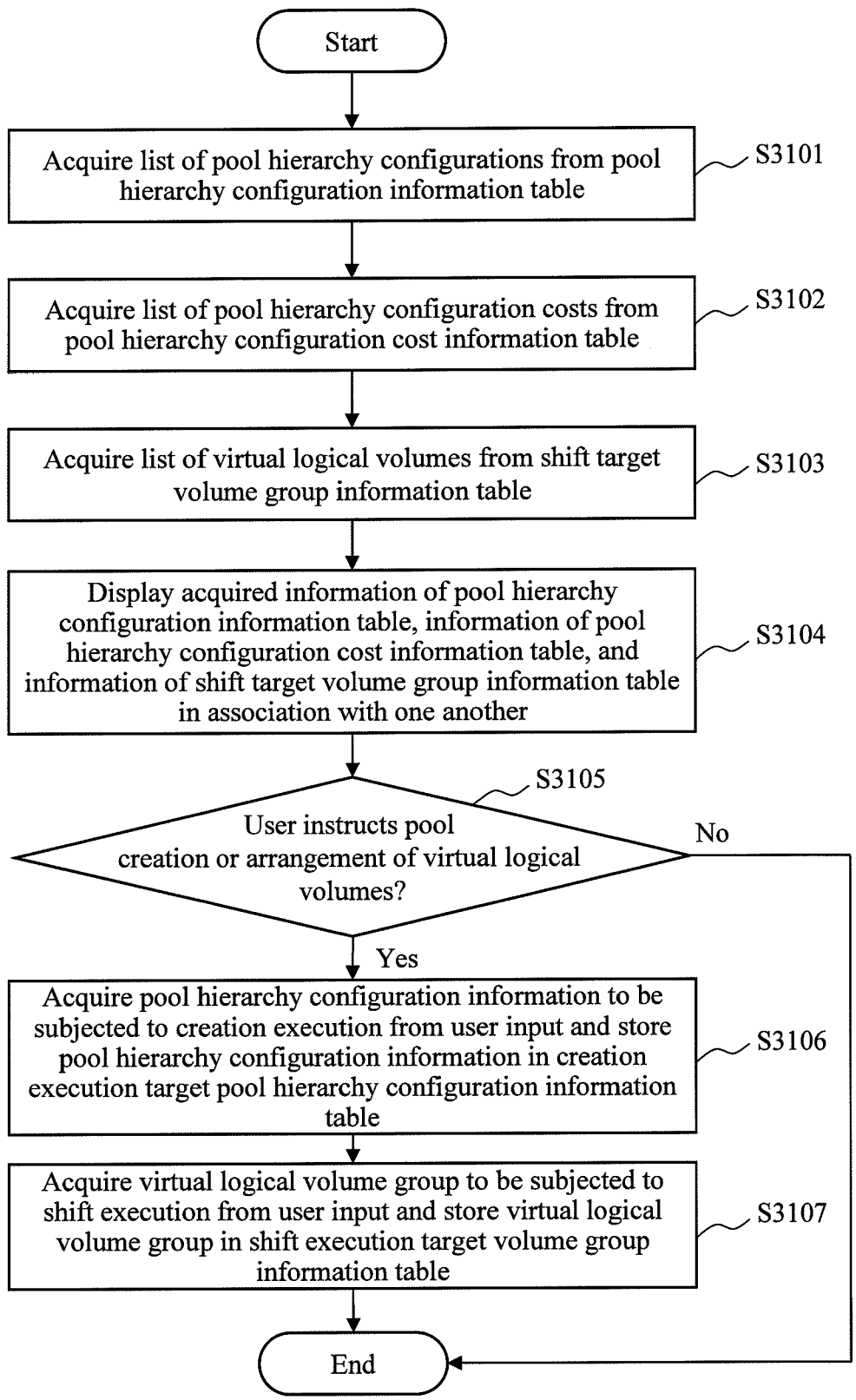
FIG. 31 is a flowchart for explaining details of pool information display processing 411 (S240 in FIG. 20).

FIG. 31 is a flowchart for explaining details of the pool information display processing 411 (S240 in FIG. 20). The processing is periodically started according to scheduling configuration, started after the pool hierarchy configuration cost calculation processing 410, or started according to a request from the storage managing client 301 triggered by instruction operation of the user.

In S3101, the storage managing program 310 acquires a list of pool hierarchy configuration from the pool hierarchy configuration information (table) 416.

In S3102, the storage managing program 310 acquires a list of pool hierarchy configuration cost from the pool hierarchy configuration cost information (table) 419.

In S3103, the storage managing program 310 acquires a virtual logical volume group list from the shift target virtual logical volume group information (table) 415.

In S3104, the storage managing program 310 associates, using a pool identifier, information acquired from the pool hierarchy configuration information (table) 416, the pool hierarchy configuration cost information (table) 419, and the shift target volume group information (table) 415 and displays a GUI (see FIG. 19) on a terminal of the storage managing client 301.

In S3105, the storage managing program 310 waits for a user input and determines whether the user instructs pool creation 1905 and/or arrangement 1906 of virtual logical volumes. When the user instructs the pool creation 1905 and/or the arrangement 1906 of virtual logical volumes (Yes in S3105), the processing shifts to S3106.

In S3106, the storage managing program 310 acquires pool hierarchy configuration information to be created and virtual logical volume group information to be shifted, stores the pool hierarchy configuration information and the virtual logical volume group information respectively in the creation execution target pool hierarchy configuration information (table) 420 and the shift execution target virtual logical volume group information (table) 421, and ends the pool information display processing.

When the user does not instruct the pool creation or the arrangement of virtual logical volumes in S3105 (No in S3105), the pool information display processing 411 ends.

The system can also automatically execute creation of all pools and arrangement processing for all virtual logical volumes without a user input.

(2) Second Embodiment

A second embodiment provides a method of dividing a value of target response performance of a virtual logical volume into plural regions and grouping (classifying) plural virtual logical volumes included in a pool on the basis of the divided regions. The second embodiment is different from the first embodiment only in shift target virtual logical volume classification processing. A system configuration, contents of various kinds of information (tables), and other various processing contents are the same. Therefore, only differences are explained below.

<Overview>

Figure 32:
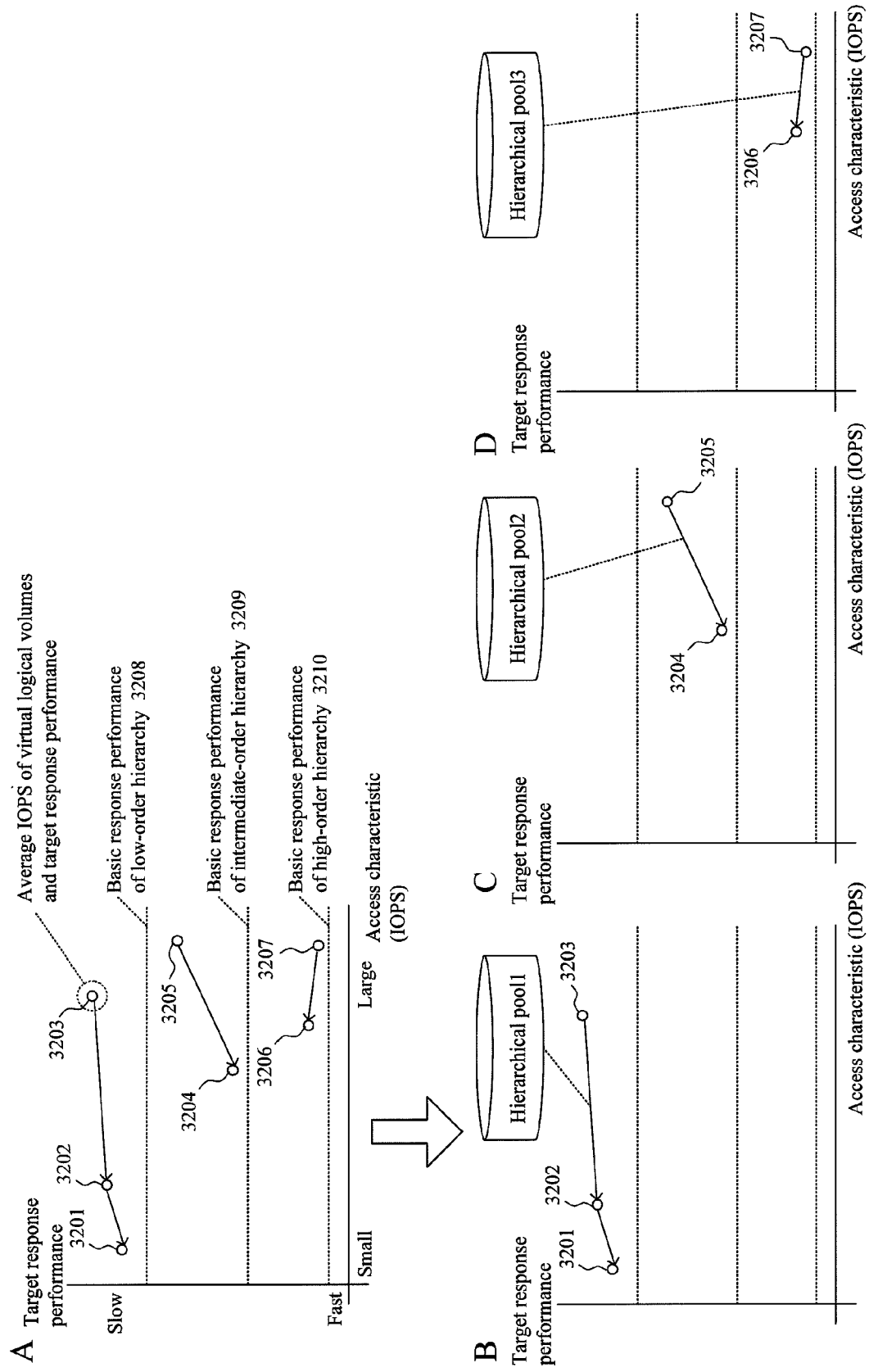
FIG. 32 is a diagram for explaining a basic concept of processing according to a second embodiment (determination of arrangement of virtual logical volumes).

FIG. 32 is a diagram for explaining a basic concept of processing (determination of arrangement of virtual logical volumes) according to the second embodiment.

As shown in FIG. 32A, as in the first embodiment, plural virtual logical volumes 3201 to 3207 included in one pool are grasped and plotted in a two-dimensional plane (an access characteristic—target response performance plane) including an access characteristic and target response performance as actually measured values. Values of access characteristics in virtual logical volumes 3201 to 3207 are averages of access characteristics to pages included in the virtual logical volumes. Values of target response performances of the virtual logical volumes are, for example, values set by a user as desired values. In the embodiments, processing and operations are explained using an IO number (IOPS) as an example access characteristic. However, the access characteristics are not limited to this. The access characteristics are a concept including a data transfer amount, access time (a volume accessed recently is a maximum access load and a volume not accessed for a while is a low load), and a level of a cache access load.

In the access characteristic—target response performance plane, as shown in FIG. 32A, maximum values 3208 to 3210 of basic response performance which can be provided by storage devices in hierarchies are shown. Then, virtual logical volumes can be divided into groups of virtual logical volumes in which target responsive performances respectively match the storage devices in the low-order hierarchy, the intermediate-order hierarchy, and the high-order hierarchy. In other words, the virtual logical volumes 3201 to 3203 are classified in the low-order hierarchy, the virtual logical volumes 3204 and 3205 are classified in the intermediate-order hierarchy, and the virtual logical volumes 3206 and 3207 are classified in the high-order hierarchy. As shown in FIG. 32B to 32D, it is seen that the respective groups only have to configure pools.

It is possible to reduce storage cost by determining a virtual logical volume allocated to a pool for each region in this way. In particular, in an example shown in FIG. 32, it is possible to generate a pool in which target response performance can be satisfied only by a storage device in a lowest-order hierarchy and realize minimum use cost concerning this group.

<Shift Target Virtual Logical Volume Classification Processing>

Figure 33:
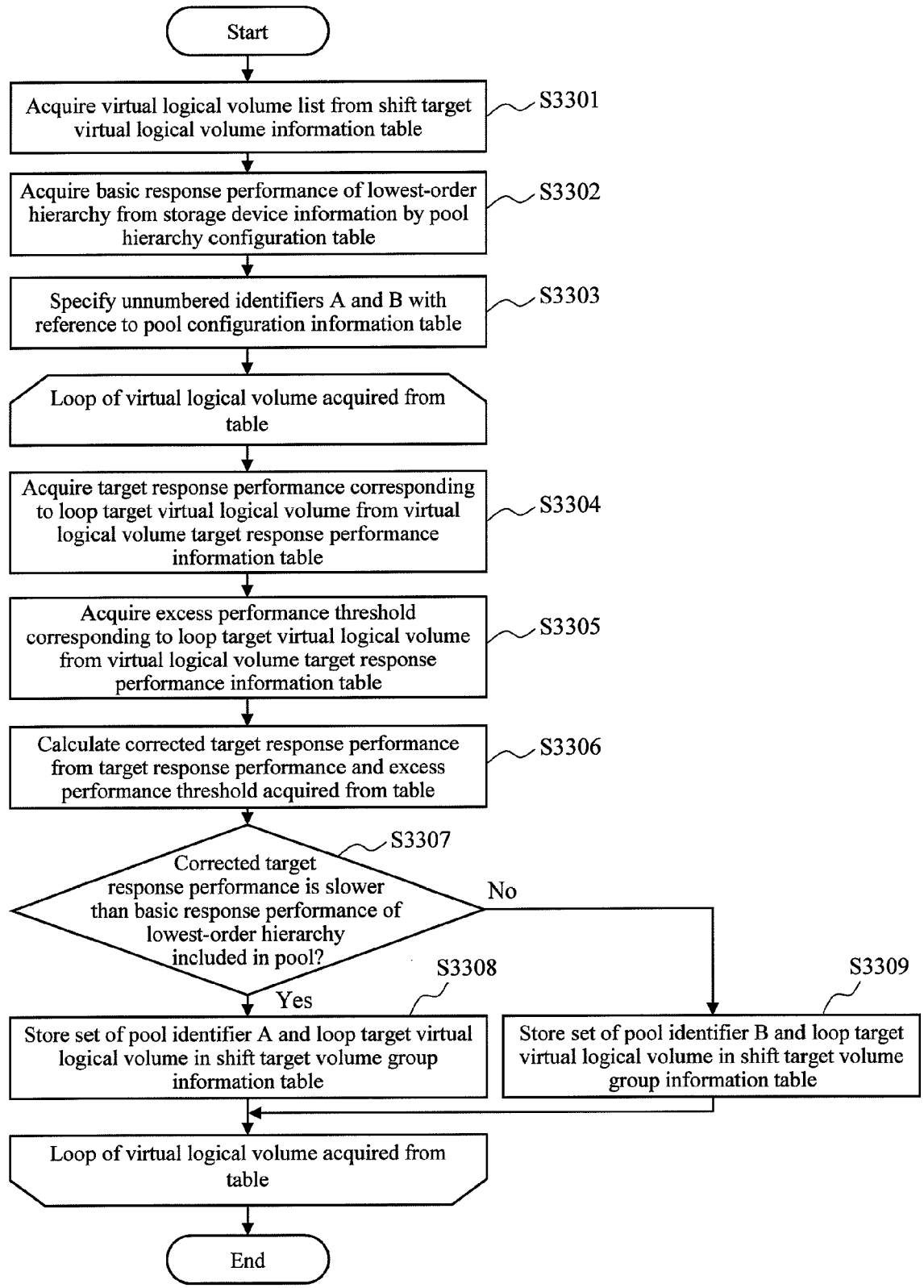
FIG. 33 is a flowchart for explaining details of shift target virtual logical volume classification processing 405 according to the second embodiment (S210 in FIG. 20).

FIG. 33 is a flowchart for explaining details of the shift target virtual logical volume classification processing 405 (S210 in FIG. 20) according to the second embodiment. The processing is periodically started according to scheduling configuration, started after the agent information collection processing 401, the virtual logical volume performance deterioration detection processing 404, the target response performance configuration processing 407, the shift target virtual logical volume selection processing 408, or the virtual logical volume addition and deletion detection processing 409, or started according to a request from the storage managing client 301 triggered by instruction operation of the user.

In S3301, the storage managing program 310 acquires a list of virtual logical volumes from the shift target virtual logical volume information (table) 414.

In S3302, the storage managing program 310 acquires basic response performance of a lowest-order hierarchy from the storage device information by pool hierarchy configuration (table) 418. Instead of the basic response performance of the lowest-order hierarchy, basic response performance of an intermediate-order hierarchy or other values of response performance may be used.

In S3303, the storage managing program 310 specifies unnumbered pool identifiers A and B with reference to the pool configuration information (table) 900. Concerning each of virtual logical volumes acquired in S3303, processing in S3304 to S3309 is repeatedly executed.

In S3304, the storage managing program 310 acquires, from the virtual logical volume target response performance information (table) 417, target response performance corresponding to the virtual logical volume to be subjected to the repetition processing. When the target response performance cannot be acquired (the target response performance is not set), the target response performance can be regarded as the same as basic response performance of a storage device in a lowest-order hierarchy included in a pool or a value slower than the basic response performance.

In S3305, the storage managing program 310 acquires, from the virtual logical volume target response performance information (table) 417, an excess performance threshold corresponding to the virtual logical volume to be subjected to the repetition processing. When the excess performance threshold cannot be acquired (the excess performance threshold is not set), the excess performance threshold can be regarded as 0.

In S3306, the storage managing program 310 calculates corrected target response performance from the target response performance and the excess performance threshold. The corrected target response performance can be calculated as explained below. This step can be omitted. When the step is omitted, a value of the target response performance is used as it is instead of corrected target response performance after that.

Corrected target response performance=target response performance×(100−excess performance threshold)÷100

In S3307, the storage managing program 310 compares the corrected target response performance and the basic response performance of the lowest-order hierarchy included in the pool. When the corrected target response performance is slower than the basic response performance of the lowest-order hierarchy included in the pool (Yes in S3307), the processing shifts to S3308. On the other hand, when the corrected target response performance is faster than the basic response performance of the lowest-order hierarchy included in the pool (No in S3307), the processing shifts to S3309.

In S3308, the storage managing program 310 stores, in the shift target volume group information (table) 415, a set of the pool identifier A and the virtual logical volume to be subjected to the repetition processing.

In S3309, the storage managing program 310 stores, in the shift target volume group information (table) 415, a set of the pool identifier B and the virtual logical volume to be subjected to the repetition processing.

The storage managing program 310 changes the target of the repetition processing and continues the repetition processing concerning the virtual logical volume list. When the processing in S3304 to S3309 is executed concerning all virtual logical volumes to be processed, the shift target virtual logical volume classification processing 405 ends.

(3) Third Embodiment

A third embodiment provides grouping processing for virtual logical volumes for minimizing storage cost. The third embodiment is different from the first embodiment only in the shift target virtual logical volume classification processing 405 and the pool hierarchy configuration calculation processing 406. A system configuration, contents of various kinds of information (tables), and other various processing contents are the same. In the third embodiment, it is unnecessary to execute S2710 of the pool hierarchy configuration calculation processing. This is because, although S2710 is processing executed to guarantee achievement of target response performance in the first and second embodiments, in the third embodiment, the grouping processing for virtual logical volumes is executed to guarantee achievement of target response performance. Only differences are explained below.

<Overview>

Figure 34:
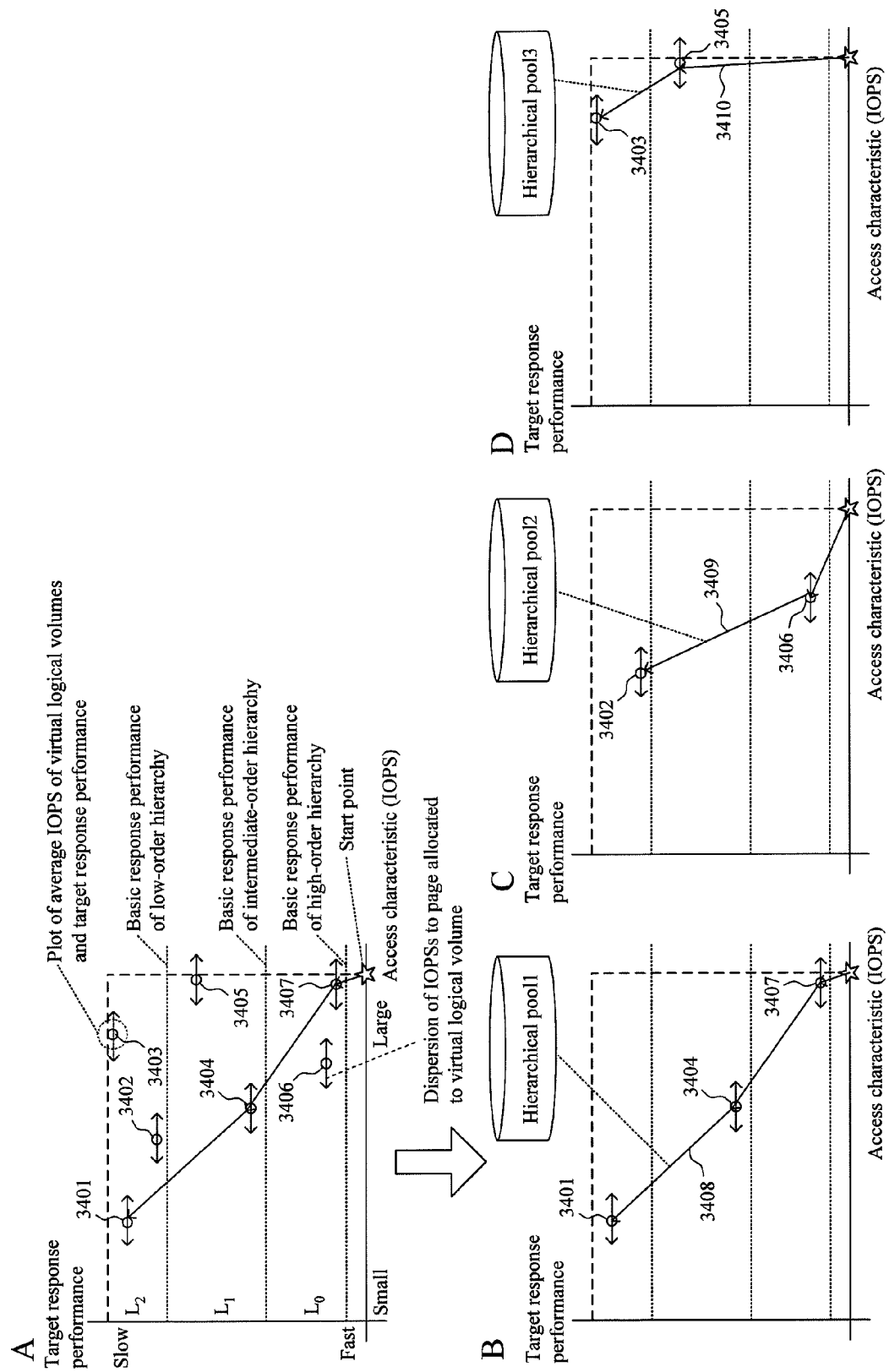
FIG. 34 is a diagram for explaining a basic concept of processing according to a third embodiment (determination of arrangement of virtual logical volumes).

FIG. 34 is a diagram for explaining a basic concept of processing (determination of arrangement of virtual logical volumes) according to a third embodiment.

As shown in FIG. 34A, as in the first embodiment, plural virtual logical volumes 3401 to 3407 included in one pool are grasped and plotted in a two-dimensional plane (an access characteristic—target response performance plane) including an access characteristic and target response performance as actually measured values.

Concerning the virtual logical volumes 3401 to 3407, averages of access characteristics to pages included in the virtual logical volumes are indicated by plots. Dispersions (IOPS minimums and maximums) of access characteristics (IOPSs) to pages allocated to the virtual logical volumes are indicated by arrows. Values of target response performances of the virtual logical volumes are, for example, values set by a user as desired values. In the embodiments, processing and operations are explained using an IO number (IOPS) as an example access characteristic. However, the access characteristics are not limited to this. The access characteristics are a concept including a data transfer amount, access time (a volume accessed recently is a maximum access load and a volume not accessed for a while is a low load), and a level of a cache access load.

In the access characteristic—target response performance plane, a maximum IOPS value and a fastest settable target response performance value are set as a start point (a point indicated by a star in FIG. 34) of grouping processing for virtual logical volumes. First, a plot point (the virtual logical volume 3407) present at a shortest distance from the start point is selected (processing 1). Among plots having IOPSs smaller than and target response performance values slower than those of the plot (the virtual logical volume 3407) selected in the processing 1, plots which do not have overlap in the dispersions of IOPSs (widths between minimums and maximums of IOPSs) of the virtual logical volume 3407 indicated by arrows and are present in regions of different hierarchies are selected and, among the plots, a plot points having a shortest distance is selected next (processing 2). Processing same as the processing 2 is repeated until no selectable plot point remains (processing 3). The points selected in order by the processing 1 to 3 form a group 3408 of virtual logical volumes included in one hierarchy pool 1. When the processing 1 to 3 is repeated among other volumes excluding the virtual logical volumes included in the group 3408, groups 3409 and 3410 are generated. The group 3409 configures a hierarchical pool 2 and the group 3410 configures a hierarchical pool 3. Finally, in the groups, storage regions are allocated from storage devices included in the hierarchies to the virtual logical volumes in the same groups in order of IOPSs. In this way, in a hierarchical pool in which storage regions are allocated in order from one having highest performance to pages having high IOPSs (access characteristics) management target virtual volumes are grouped such that, concerning target response performances and IOPSs of virtual logical volumes, a relation in which, when one of the target response performances and the IOPSs increase, the other decrease is given and that there is no overlap in dispersions of IOPS values and the virtual logical volumes belong to regions in different hierarchies. This makes it possible to efficiently allocate storage regions of storage devices and minimize storage cost.

<Shift Target Virtual Logical Volume Classification Processing>

Figure 35:
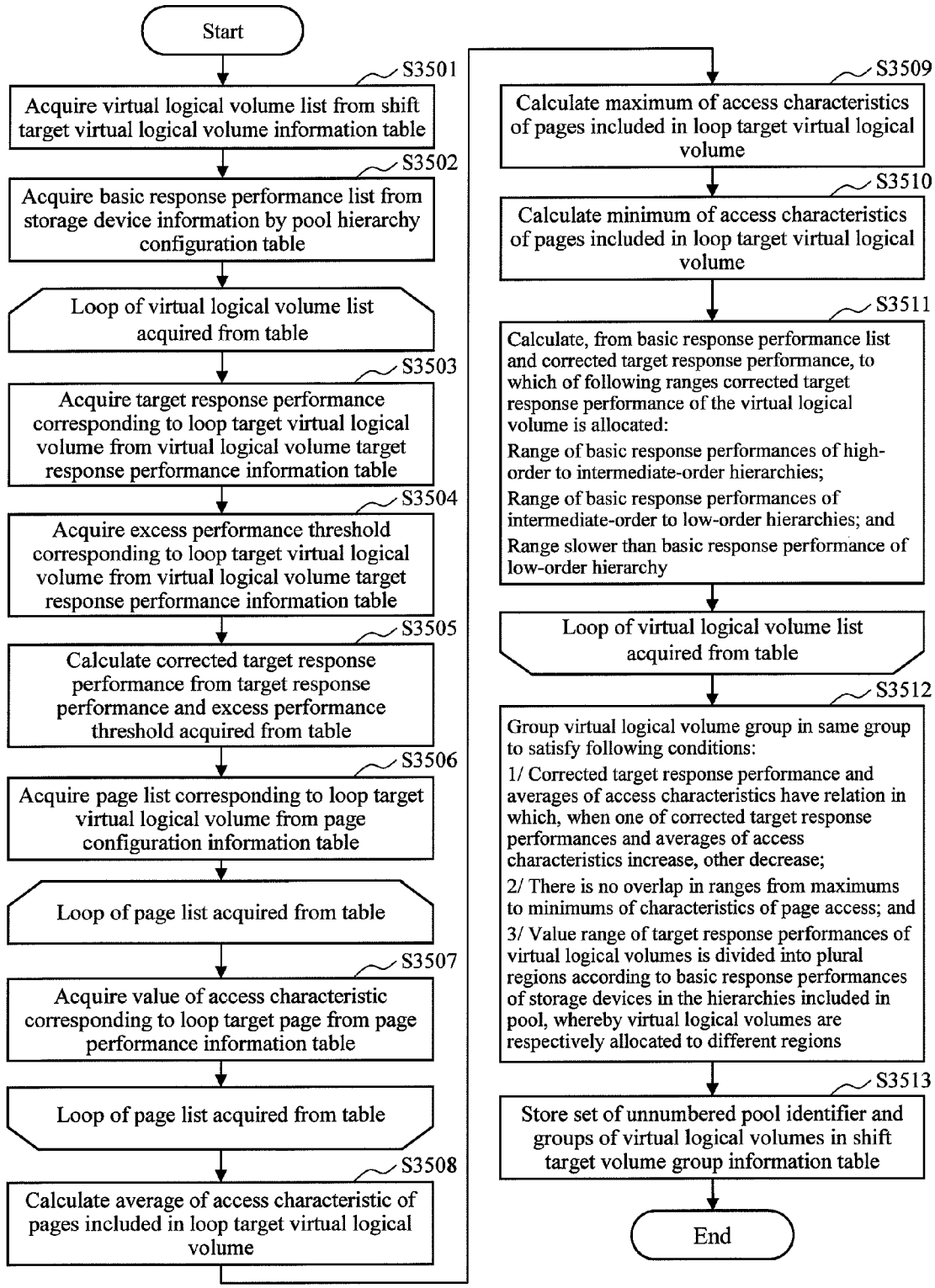
FIG. 35 is a flowchart for explaining details of shift target virtual logical volume classification processing 405 according to the third embodiment (S210 in FIG. 20).

FIG. 35 is a flowchart for explaining details of the shift target virtual logical volume classification processing 405 (S210 in FIG. 20) according to the third embodiment. The processing is periodically started according to scheduling configuration, started after the agent information collection processing 401, the virtual logical volume performance deterioration detection processing 404, the target response performance configuration processing 407, the shift target virtual logical volume selection processing 408, or the virtual logical volume addition and deletion detection processing 409, or started according to a request from the storage managing client 301 triggered by instruction operation of the user.

First, in S3501, the storage managing program 310 acquires, from the shift target virtual logical volume information (table) 414, information concerning a list of virtual logical volumes to be subjected to the classification processing.

In S3502, the storage managing program 310 acquires a basic response performance list of the hierarchies from the storage device information by pool hierarchy configuration (table) 418. Processing in S3503 to 3511 concerning the virtual logical volumes acquired in S3501 is repeatedly executed.

In S3503, the storage managing program 310 acquires, from the virtual logical volume target response performance information (table) 417, a value of target response performance corresponding to a virtual logical volume to be subjected to the repetition processing. When the target response performance cannot be acquired (the target response performance is not set), the target response performance can be regarded as the same as basic response performance of a storage device in a lowest-order hierarchy included in a pool or a value slower than the basic response performance.

In S3504, the storage managing program 310 acquires, from the virtual logical volume target response performance information (table) 417, an excess performance threshold corresponding to the virtual logical volume to be subjected to the repetition processing. When the excess performance threshold cannot be acquired (the excess performance threshold is not set), the excess performance threshold can be regarded as 0.

In S3505, the storage managing program 310 calculates corrected target response performance from the target response performance and the excess performance threshold. The storage managing program 310 calculates the corrected target response performance as explained below. This step can be omitted. When the step is omitted, a value of the target response performance is used as it is as corrected target response performance after that.

Corrected target response performance=target response performance×(100−excess performance threshold)÷100

In S3506, the storage managing program 310 acquires, from the page configuration information (table) 800, a list of pages allocated to the virtual logical volume to be subjected to the repetition processing. Processing in S3507 concerning the acquired page list is repeatedly executed.

In S3507, the storage managing program 310 acquires, from the page performance information (table) 600, an access characteristic corresponding to the pages to be subjected to the repetition processing. The storage managing program 310 changes the target of the repetition processing and continues the repetition processing concerning the page list. In S3507, access characteristics (IOPSs) are acquired concerning all pages included in the virtual logical volume to be processed.

In S3508, the storage managing program 310 calculates an average of the access characteristics to the pages included in the virtual logical volume to be subjected to the repetition processing.

In S3509, the storage managing program 310 acquires a maximum of the access characteristics to the pages included in the virtual logical volume to be subjected to the repetition processing.

In S3510, the storage managing program 310 acquires a minimum of the access characteristics to the pages included in the virtual logical volume to be subjected to the repetition processing.

In S3511, the storage managing program 310 calculates, from a basic response performance list and corrected or uncorrected target response performance of the virtual logical volume to be subjected to the repetition processing, to which range of ranges explained below the corrected or uncorrected target response performance is allocated.

Range of basic response performance of the high-order hierarchy to the intermediate-order hierarchy (range 1)

Range of basic response performance of the intermediate-order hierarchy to the low-order hierarchy (range 2)

Range smaller than basic response performance of the low-order hierarchy (range 3)

When the repetition processing in S3503 to S3511 ends, the storage managing program 310 grasps, concerning all the virtual logical volumes to be processed, to which range of the ranges 1 to 3 corrected or uncorrected target response performance is allocated and further grasps IOPS averages, minimums, and maximums of pages of the virtual logical volumes.

In S3512, the storage managing program 310 groups virtual logical volumes into the same group to satisfy the following conditions:

Condition 1: the corrected target response performance and the averages of the access characteristics have a relation in which, when one of the corrected target response performances and the averages of the access characteristics increase, the other decrease;

Condition 2: among the virtual logical volumes, there is no overlap in ranges from maximums to minimums of access characteristics of pages included in the virtual logical volumes; and Condition 3: a range of target response performances of the virtual logical volumes is divided into plural regions according to basic response performances of storage devices in the hierarchies included in the pool, whereby the virtual logical volumes are respectively allocated to different regions.

To explain more in detail, in S3212, grouping processing is executed as explained below. A concept is as explained with reference to FIG. 34.

(i) The storage managing program 310 defines an xy plane (an access characteristic—target response performance plane) in which an x axis represents an average of the access characteristics and a y axis represents the corrected target response performance.

(ii) The storage managing program 310 defines and plots two-dimensional vectors $v_i$=(the average of the access characteristics, the corrected target response performance) of the virtual logical volumes (i=1 . . . n, n=the number of virtual logical volumes) on the access characteristic—target response performance plane.

(iii) The storage managing program 310 defines two-dimensional vector s=(a maximum of the averages of the access characteristics in all $v_i$, a fastest value of the corrected target response performances in all v) on the access characteristic—target response performance plane.

(iv) The storage managing program 310 selects a vector t having a Euclidian distance closest to s out of $v_i$. If there is no selectable vector, the storage managing program 310 ends the step (S3212).

(v) The storage managing program 310 selects a vector which satisfies the following conditions out of $v_i$.
  (a) A maximum of access characteristics to pages is smaller than a minimum access characteristics to a page of t.
  (b) Corrected target response performance is slower than t.
  (c) The corrected target response performance is allocated to a range different from corrected target response performance of t
  (d) An Euclidian distance to t is the closest among vectors which satisfy the conditions (a) to (c).

(vi) With t used in the processing (v) replaced with the vector selected in (v), the processing (v) is repeated until no selectable vector remains.

(vii) A set of vectors selected by the processing (iv) to (vi) is grouped.

(viii) The vectors grouped in the processing (vii) are excluded from $v_i$ defined in the processing (ii).

(ix) The processing (iv) to (viii) is repeated.

In S3513, the storage managing program 310 stores, in the shift target virtual logical volume group information (table) 415, a set of an unnumbered pool identifier and the groups of the virtual logical volumes specified in S3512 and ends the shift target virtual logical volume classification processing.

(4) Conclusion (i) In the present invention explained above, on the basis of information concerning target response performances set to respective virtual logical volumes included in at least one pool already present in a storage device (a storage subsystem), plural virtual logical volumes are classified into plural groups such that the plural virtual logical volumes satisfy the target response performances of the virtual logical volumes. A new pool is allocated to the groups obtained by this classification. GUI information indicating a correspondence relation between the pool and the virtual logical volumes included in the groups is generated and outputs in, for example, a storage managing client. The virtual logical volumes are rearranged in the pool in this way. This makes it possible to provide a user (an administrator) with the configuration of a pool which satisfies the target response performances of the virtual logical volumes.

More specifically, in the first to third embodiments, processing for virtual logical volume grouping is performed such that, concerning a combination of target response performances and access characteristics of plural virtual logical volumes, a virtual logical volume having a relation in which when one of the target response performance and the access characteristic increases, the other decreases (see FIGS. 2 and 34), is included in one group. In the present invention, a configuration plan of a pool is provided. When, according to a level of access characteristics (e.g., IOPSs), storage regions (pages) are allocated from storage devices included in hierarchies to virtual logical volumes included in a pool configuration created by the present invention, allocation of pages which always satisfies the target response performances set in the virtual logical volumes is guaranteed.

In the first embodiment, as shown in FIG. 2, in a two-dimensional plane of access characteristic (e.g., IOPS)-target response performance, virtual logical volumes included in one or plural pools are plotted. A processing start point (the start point in FIG. 2) is determined in this two-dimensional plane. This start point is a point indicating a maximum access characteristic and fastest target response performance and is not a plot point of a virtual logical volume. A plot point (202) present at a shortest distance from the start point is selected (first plot selection processing). Further, among plots (other than 201) having smaller access characteristics and slower target response performances than the selected plot point (202), another plot point (204) present at a shortest distance from the selected plot point (202) is selected (second plot selection processing). The second plot selection processing is repeated excluding the already-selected plot points (202 and 204) until no selectable plot point remains. Consequently, a group of virtual logical volumes which should be arranged in one pool is determined In the third embodiment, as shown in FIG. 34, as in the first embodiment, a plot point (3407) present at a shortest distance from a processing start point (the start point in FIG. 34) is selected (first plot selection processing). Among plots (other than 3405) having smaller access characteristics and slower target response performances than the plot 3407, which are plot points (3404, 3402, and 3401) which do not have overlap in dispersion values specified by maximums and minimums of access characteristics and which should be included in different hierarchies when target response performances are taken into account, another plot point present at a shortest distance from the selected plot (3407) point is selected (second plot selection processing). The second plot selection processing is repeated excluding the already-selected plot points until no selectable plot point remains. A group in which plural virtual logical volumes selected in the processing are rearranged in one pool is configured. Consequently, it is possible to generate a group of virtual logical volumes configured at minimum cost.

On the other hand, in the second embodiment, as shown in FIG. 32, irrespective of access characteristics, virtual logical volumes are simply classified according to values of target response performances. Specifically, each of a group of virtual logical volumes to which storage regions are allocated only from a low-order hierarchy, a group of virtual logical volumes to which storage regions are allocated only from an intermediate-order hierarchy, and a group of virtual logical volumes to which storage regions are allocated from only a high-order hierarchy is rearranged in one pool. Consequently, a group of virtual logical volumes which can satisfy target response performances only with storage devices in a lowest-order hierarchy can be configured according to deviation of target response performances. Therefore, it is possible to reduce use cost.

The first embodiment and the second embodiment may be combined to create a group of virtual logical volumes. The second embodiment and the third embodiment may be combined to create a group of virtual logical volumes. In other words, for example, a group of virtual logical volumes to which storage regions are allocated only from a storage device in a lowest-order hierarchy may be configured according to the method of the second embodiment and virtual logical volumes other than the virtual logical volumes may be classified using the method of the first embodiment or the third embodiment.

(ii) In the embodiments, the classification processing for virtual logical volumes only has to be executed when addition and/or deletion of a virtual logical volume is detected (when information collected from a storage device and information of a management server are collated and addition and/or deletion of a volume is detected and when addition and/or deletion of a volume is instructed from a user), when deterioration in response performance of a virtual logical volume is detected, when target response performance is set according to an instruction, or when configuration of a virtual logical volume allocated to a new pool is instructed or only has to be periodically executed according to scheduling configuration. Consequently, when target response performances of virtual logical volumes in a pool cannot be attained or when a balance of the target response performances is lost, it is possible to immediately take measures. By performing the classification processing according to scheduling, it is possible to prevent occurrence of a state in which target response performances of virtual logical volumes cannot be attained in a pool.

(iii) As a value of target response performance used in the classification processing for virtual logical volumes, a set value may be used as it is. However, target response performance set using an excess performance threshold may be corrected and the corrected target response performance may be used. Consequently, rather than starting the classification processing for virtual logical volumes when set target response performance is exceeded because of performance deterioration, it is possible to execute the classification processing in a state close to performance deterioration to some extent. Consequently, set target response performance is not exceeded even in a short period and it is possible to determine a group of virtual logical volumes included in a pool. Therefore, it is possible to always guarantee achievement of set target response performance.

(iv) In the embodiments, storage capacities ($C_1, C_2, \ldots, C_n$) from storage devices in the hierarchies which satisfy Expressions F1 to F3 are calculated. This calculation result (a result of the pool hierarchy configuration calculation processing) is output as a GUI together with a result of the classification processing for virtual logical volumes. In the first and second embodiments, classification of virtual logical volumes is not performed taking into account overlap of access characteristics in the virtual logical volumes (dispersion widths specified by maximums and minimums of the access characteristics). Therefore, when an access characteristic of a page to which a storage region should be allocated from a low-order hierarchy exceeds an access characteristic of a page to which a storage region should be allocated from a higher-order hierarchy, a situation occurs in which a storage region cannot be surely allocated to the latter from a high-order hierarchy. Therefore, when storage regions are allocated to pages, if the storage regions are allocated on the basis of access characteristics, processing is performed such that storage regions in hierarchies which should be allocated are allocated even when order of allocation is changed. Specifically, pages of virtual logical volumes are sorted in order from one having a highest access characteristic and, even when a page from a lower-order hierarchy has a larger access characteristic than a page from a higher-order hierarchy, a larger capacity is allocated to the higher-order hierarchy. Consequently, although it is likely that initial cost is not guaranteed, set target response performance can be surely guaranteed.

Cost required for configuring a virtual logical volume to be processed is calculated on the basis of a result of the pool hierarchy configuration calculation processing and information concerning a capacity unit price. A result of the calculation is output as a GUI together with a result of classification processing pool hierarchy configuration calculation. Consequently, it is possible to inform the user (the administrator) of cost required when rearrangement of virtual logical volumes is performed. The user can determine, looking at this information, whether rearrangement is actually executed.

A storage managing system is characterized as explained above.

(v) The present invention can also be realized by a program code of software which realizes the functions of the embodiments. In this case, a storage medium having the program code recorded therein is provided to a system or an apparatus and a computer (or a CPU or an MPU) of the system or the apparatus reads out the program code stored in the storage medium. In this case, the program code itself read out from the storage medium realizes the functions of the embodiments. The program code itself and the storage medium having the program code stored therein comprise the present invention. As the storage medium for supplying such a program code, for example, a flexible disk, a CD-ROM, a DVD- ROM, a hard disk, an optical disk, a magneto-optical disk, a CD-R, a magnetic tape, a nonvolatile memory card, or a ROM is used.

An OS (operating system) or the like running on a computer may perform a part or all of actual processing on the basis of an instruction of the program code and the functions of the embodiments may be realized by the processing. Further, after the program code read out from the storage medium is written in a memory on the computer, the CPU or the like of the computer perform a part or all of the actual processing on the basis of an instruction of the program code and the functions of the embodiments may be realized by the processing.

Further, the program code of the software which realizes the functions of the embodiments may be stored in storing section such as a hard disk or a memory of the system or the apparatus or a storage medium such as a CD-RW or a CD-R by being distributed via a network and, when the program code is used, the computer (or the CPU or the MPU) of the system or the apparatus may read out and execute the program code stored in the storing section or the storage medium.

Lastly, it should be understood that the process and the technique explained herein are not essentially related to any specific apparatus and can also be implemented by any suitable combination of components. Further, general-purpose devices of various types can be used according to the teaching described herein. It may be understood that it is useful to build a dedicated apparatus to execute the steps of the method explained herein. Various inventions can be formed by an appropriate combination of the plural components disclosed in the embodiments. For example, several components may be deleted from all the components explained in the embodiments. Further, the components explained in the different embodiments may be combined as appropriate. The present invention is explained in relation to the specific examples. However, the specific examples are not for limitation but for explanation in every aspect. Those having skill in the art would understand that there are a large number of combinations of hardware, software, and firmware suitable for carrying out the present invention. For example, the software explained above can be implemented by programs or script languages in a wide range such as assembler, C/C++, perl, Shell, PHP, and Java (R).

Further, in the embodiments, control lines and information lines considered to be necessary for explanation are shown. All control lines and information lines are not always shown in terms of a product. All the components may be connected to one another.

In addition, other implementations of the present invention are made apparent to those having ordinary knowledge in the technical field from the examination of the specification and the embodiments of the present invention disclosed herein. The explained various forms and/or components of the embodiments can be used independently or in any combination in a computerized storage system having a function of managing data. The specification and the specific examples are merely typical ones and the scope and the spirit of the present invention are indicated by claims.

Reference Signs List

| | |
|---|---|
| 300 | computer system (storage system) |
| 301 | storage managing client |
| 302 | LAN |
| 303 | host server |
| 304 | performance/configuration information collecting server |

-continued

Reference Signs List

| | |
|---|---|
| 305 | management server |
| 306 | job software |
| 307 | application monitoring agent |
| 308 | host monitoring agent |
| 309 | storage monitoring agent |
| 310 | storage managing program |
| 311 | SAN switch |
| 312 | storage device (storage subsystem) |
| 313 | memory |
| 314 | virtual logical volume management control program |
| 315 | pool creation executing program |
| 316 | virtual logical volume shift executing program |
| 317 | SSD (storage device in a high-order hierarchy) |
| 318 | SAS (storage device in an intermediate-order hierarchy) |
| 319 | SATA (storage device in a low-order hierarchy) |

The invention claimed is:

1. A storage managing system which manages a storage subsystem that comprises a pool using plural storage devices having different performances and provides plural virtual logical volumes from the pool, the storage management system comprising:
   a memory which stores information concerning target response performance concerning each of the plural virtual logical volumes; and
   a processor which reads out the information concerning the target response performance from the memory, classifies, on the basis of the information concerning the target response performance, the plural virtual logical volumes into plural groups such that the plural virtual logical volumes satisfy target response performances of the respective virtual logical volumes, allocates a new pool to each of the plural groups, executes classification processing for generating information indicating a correspondence relation between the pool and the virtual logical volumes included in the groups, and outputs a result of the classification processing.

2. A storage managing system according to claim 1, wherein
   the memory further stores information concerning access characteristics of the plural virtual logical volumes, and
   the processor executes the classification processing such that, concerning a combination of the target response performances and the access characteristics of the plural virtual logical volumes, a virtual logical volume having a relation in which when one of the target response performance and the access characteristic increases, the other decreases, is included in one group.

3. A storage managing system according to claim 2, wherein the processor determines a group of virtual logical volumes which should be arranged in one pool, by executing, in the classification processing, in a two-dimensional plane comprising the access characteristics and the target response performances, (i) plot processing for plotting a set of the access characteristic and the target response performance of each of the plural virtual logical volumes, (ii) first plot selection processing for determining a start point indicating a largest access characteristic and fastest target response performance in the two-dimensional plane and selecting a plot point present at a shortest distance from the start point, (iii) second plot selection processing for selecting, among plots having the access characteristics smaller than and the target response performances slower than the selected plot point, another plot point present at a shortest distance from the selected plot point, and (iv) repetition processing for repeating the second plot selection processing excluding the already-selected plot points until no selectable plot point remains.

4. A storage managing system according to claim 2, wherein
the memory further stores information concerning an average of access characteristics of each of the plural virtual logical volumes and information concerning a maximum and a minimum of the access characteristics, and
the processor determines a group of virtual logical volumes which should be arranged in one pool, by executing, in the classification processing, in a two-dimensional plane comprising the access characteristics and the target response performances, (i) plot processing for plotting a set of the average of the access characteristics and the target response performance of each of the plural virtual logical volumes, (ii) first plot selection processing for determining a start point indicating a largest access characteristic and fastest target response performance in the two-dimensional plane and selecting a plot point present at a shortest distance from the start point, (iii) second plot selection processing for selecting, among plots having the access characteristics smaller than and the target response performances slower than the selected plot point, which are plot points which do not have overlap in dispersion values specified by the maximum and the minimum of the access characteristics and should be included in a storage device included in another hierarchy determined from the target response performances, another plot point present at a shortest distance from the selected plot point, and (iv) repetition processing for repeating the second plot selection processing excluding the already-selected plot points until no selectable plot point remains.

5. A storage managing system according to claim 1, wherein the processor executes the classification processing after executing any one of processing for detecting addition and/or deletion of the virtual logical volume, processing for monitoring response performances of the virtual logical volumes and detecting deterioration in the response performances, processing for configuration target response performance according to an instruction, and processing for configuring a virtual logical volume allocated to a new pool according to an instruction, or periodically executes the classification processing according to scheduling configuration.

6. A storage managing system according to claim 1, wherein
the memory further stores an excess performance threshold for correcting a value of the target response performance, and
the processor corrects the target response performance using the excess performance threshold, generates corrected target response performance, and executes the classification processing using the corrected target response performance.

7. A storage managing system according to claim 1, wherein
the memory further stores a value of basic response performance of each of the plural storage devices and N indicating a value of a total number of pages included in the plural virtual logical volumes, and
when the basic response performance is represented by a vector $T(T_1, T_2, \ldots, T_n)$ and a storage capacity from the plural storage devices which should be allocated to a virtual logical volume to be processed is represented by a vector $C(C_1, C_2, \ldots, C_n)$, the processor executes pool hierarchy configuration calculation processing for calculating the vector C such that evaluation response performance indicated by an inner product value of the vector C and the vector T is faster than the target response performance set in the virtual logical volume to be processed and outputs a result of the pool hierarchy configuration calculation processing together with the result of the classification processing.

8. A storage managing system according to claim 7, wherein
the memory further stores information concerning a capacity unit price of each of the plural storage devices, and
the processor executes, based on the result of the pool hierarchy configuration calculation processing concerning the virtual logical volume to be processed and the information concerning the capacity unit price, pool hierarchy configuration cost calculation processing for calculating a cost required for configuring the virtual logical volume to be processed and outputs a result of the pool hierarchy configuration cost calculation processing together with the result of the classification processing.

9. A storage managing system according to claim 1, wherein the processor executes the classification processing by generating plural groups according to levels of values of the target response performances of the virtual logical volumes, classifying the virtual logical volumes into the groups, and allocating the new pool to the groups.

10. A storage managing system according to claim 9, wherein the processor generates groups equivalent to a number of the storage devices set in the storage subsystem and executes the classification processing.

11. A computer system comprising: a storage managing system according to claim 1; at least one storage subsystem; and at least one host computer which communicates an I/O request to the storage subsystem and executes processing for reading information from and writing information in the storage subsystem, wherein
in the storage subsystem, plural hierarchies include plural storage devices having the different performances, and
the storage subsystem allocates storage regions respectively from the plural hierarchies to create plural pools, configures the virtual logical volumes with the storage regions allocated to each of the plural pools, and provides the host computer with the virtual logical volumes.

12. A computer system according to claim 11, wherein the storage managing system acquires, from the storage subsystem, information concerning configurations and capacities of the plural virtual logical volumes, configuration information of the plural pools, information concerning storage devices included in the plural hierarchies, and information concerning the storage region allocated to each of the plural pools from the plural hierarchies and stores the information in the memory.

13. A storage managing method for managing, using a storage managing system including a processor and a memory, a storage subsystem comprising a pool using plural storage devices having different performances and providing plural virtual logical volumes from the pool, the storage managing method comprising:
the processor reading out, from the memory, information concerning target response performance concerning each of the plural virtual logical volumes;
the processor classifying, on the basis of the information concerning the target response performance, the plural virtual logical volumes into plural groups such that the plural virtual logical volumes satisfy target response performances of the virtual logical volumes;
allocating a new pool to each of the plural groups;

generating information indicating a correspondence relation between the new pool and the virtual logical volumes included in the groups; and outputting the information indicating the correspondence relation.

14. A storage managing method according to claim 13, further comprising the processor reading out, from the memory, information concerning access characteristics of the plural virtual logical volumes, wherein in the classifying the plural virtual logical volumes into plural groups, the processor classifies the virtual logical volumes such that, concerning a combination of the target response performances and the access characteristics of the plural virtual logical volumes, a virtual logical volume having a relation in which when one of the target response performance and the access characteristic increases, the other decreases, is included in one group.

15. A storage managing method according to claim 14, wherein, in the classifying the plural virtual logical volumes into plural groups, the processor determines a group of virtual logical volumes which should be arranged in one pool, by executing, in a two-dimensional plane comprising the access characteristics and the target response performances, (i) plot processing for plotting a set of the access characteristic and the target response performance of each of the plural virtual logical volumes, (ii) first plot selection processing for determining a start point indicating a largest access characteristic and fastest target response performance in the two-dimensional plane and selecting a plot point present at a shortest distance from the start point, (iii) second plot selection processing for selecting, among plots having the access characteristics smaller than and the target response performances slower than the selected plot point, another plot point present at a shortest distance from the selected plot point, and (iv) repetition processing for repeating the second plot selection processing excluding the already-selected plot points until no selectable plot point remains.

* * * * *